United States Patent
Yomo et al.

(10) Patent No.: US 10,222,453 B2
(45) Date of Patent: Mar. 5, 2019

(54) RADAR DEVICE AND INTERFERENCE PREVENTION METHOD

(71) Applicant: Panasonic Intellectual Property Management Co., Ltd., Osaka (JP)

(72) Inventors: Hidekuni Yomo, Kanagawa (JP); Hirohito Mukai, Kanagawa (JP); Tomohiro Yui, Kanagawa (JP); Yoshito Hirai, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 339 days.

(21) Appl. No.: 15/156,319

(22) Filed: May 16, 2016

(65) Prior Publication Data

US 2016/0349354 A1    Dec. 1, 2016

(30) Foreign Application Priority Data

May 27, 2015   (JP) .................................. 2015-107464
Dec. 11, 2015   (JP) .................................. 2015-242372

(51) Int. Cl.
*G01S 7/02*   (2006.01)
*G01S 15/93*   (2006.01)
(Continued)

(52) U.S. Cl.
CPC ................ *G01S 7/023* (2013.01); *G01S 7/36* (2013.01); *G01S 7/52* (2013.01); *G01S 13/867* (2013.01);
(Continued)

(58) Field of Classification Search
CPC ...... G01S 13/42; G01S 13/867; G01S 13/931; G01S 15/025; G01S 15/87; G01S 15/931;
(Continued)

(56) References Cited

U.S. PATENT DOCUMENTS

2003/0147247 A1*   8/2003   Koike .................... B60Q 1/484
                                                    362/464
2005/0086100 A1*   4/2005   Yanagisawa ........... G01C 21/26
                                                    705/13
(Continued)

FOREIGN PATENT DOCUMENTS

JP    2007-263915    10/2007
JP    2010-048716    3/2010

OTHER PUBLICATIONS

Panasonic Corporation, "Development of "Light ID" usable with Smartphone", Press Relase, Dec. 11, 2014.
(Continued)

*Primary Examiner* — Timothy X Pham
(74) *Attorney, Agent, or Firm* — Seed IP Law Group LLP

(57) ABSTRACT

In a radar device mounted in a host vehicle, a radar transmitting unit transmits a radar signal; a light detection unit detects ON or OFF of a light of another vehicle in which the radar device is mounted; and a timing control unit sets a transmission timing of the radar signal and a light ON timing of a light of the host vehicle, the light ON timing is synchronized with the transmission timing on basis of detected ON or OFF of the light of the other vehicle. The set transmission timing is different from a transmission timing of a radar signal of the radar device mounted in the other vehicle.

22 Claims, 34 Drawing Sheets

(51) Int. Cl.
*G01S 15/02* (2006.01)
*G01S 7/52* (2006.01)
*G01S 13/86* (2006.01)
*G01S 13/93* (2006.01)
*G01S 15/87* (2006.01)
*G01S 7/36* (2006.01)
*G01S 13/42* (2006.01)

(52) U.S. Cl.
CPC .......... *G01S 13/931* (2013.01); *G01S 15/025* (2013.01); *G01S 15/87* (2013.01); *G01S 15/931* (2013.01); *G01S 13/42* (2013.01); *G01S 2013/9353* (2013.01); *G01S 2013/9364* (2013.01); *G01S 2013/9375* (2013.01); *G01S 2015/932* (2013.01); *G01S 2015/938* (2013.01)

(58) Field of Classification Search
CPC ..... G01S 2013/9353; G01S 2013/9364; G01S 2013/9375; G01S 2015/932; G01S 2015/938; G01S 7/023; G01S 7/36; G01S 7/52

USPC ......................................................... 342/70
See application file for complete search history.

(56) References Cited

U.S. PATENT DOCUMENTS

2005/0094410 A1* 5/2005 Stephan ................ G01S 17/107
362/510
2008/0106458 A1 5/2008 Honda et al.
2015/0083921 A1* 3/2015 Ooyabu .................. G01S 7/481
250/341.8

OTHER PUBLICATIONS

Katsuhiro Sasaki et al., "A System for Simultaneous Measurement of Distance Using Multiple Ultrasonic Wave Signals", Toyama Industrial Technology Center Research Report, No. 25, pp. 37-38, 2011.

* cited by examiner

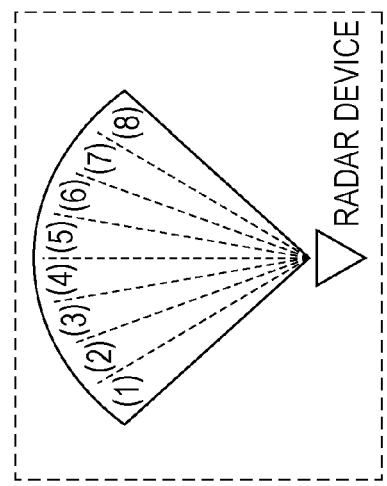
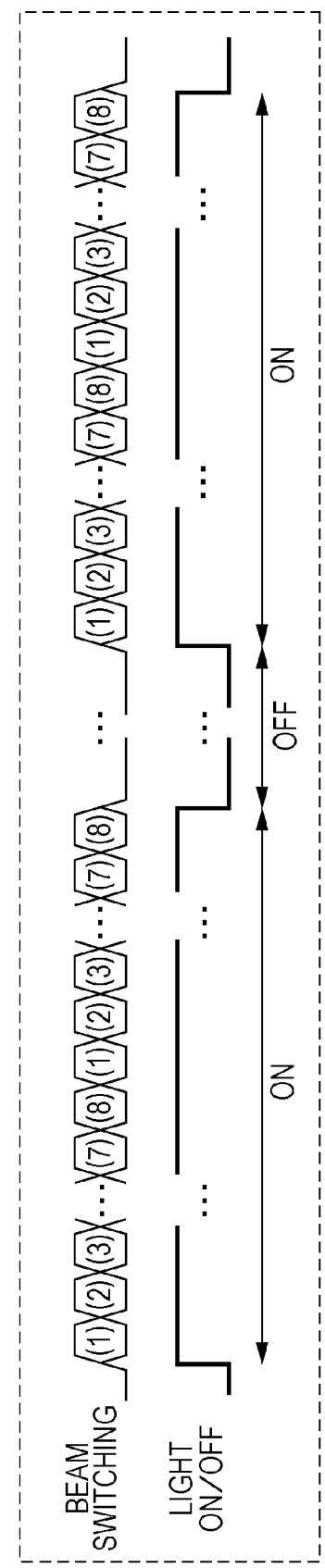
FIG. 13A
FIG. 13B

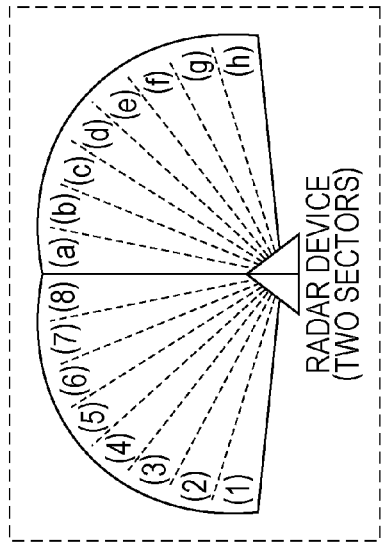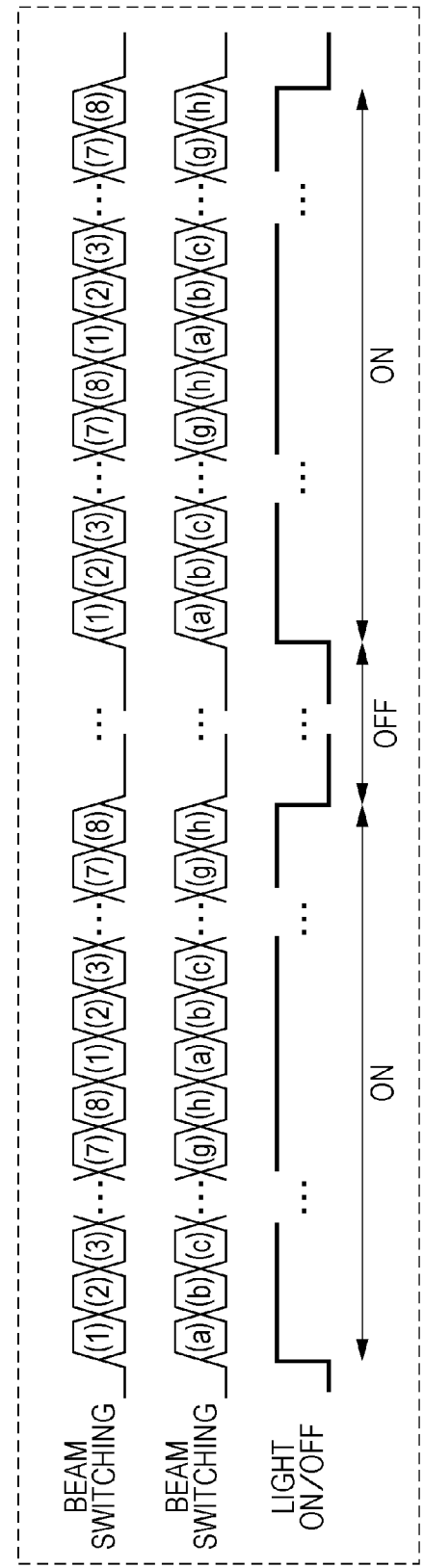

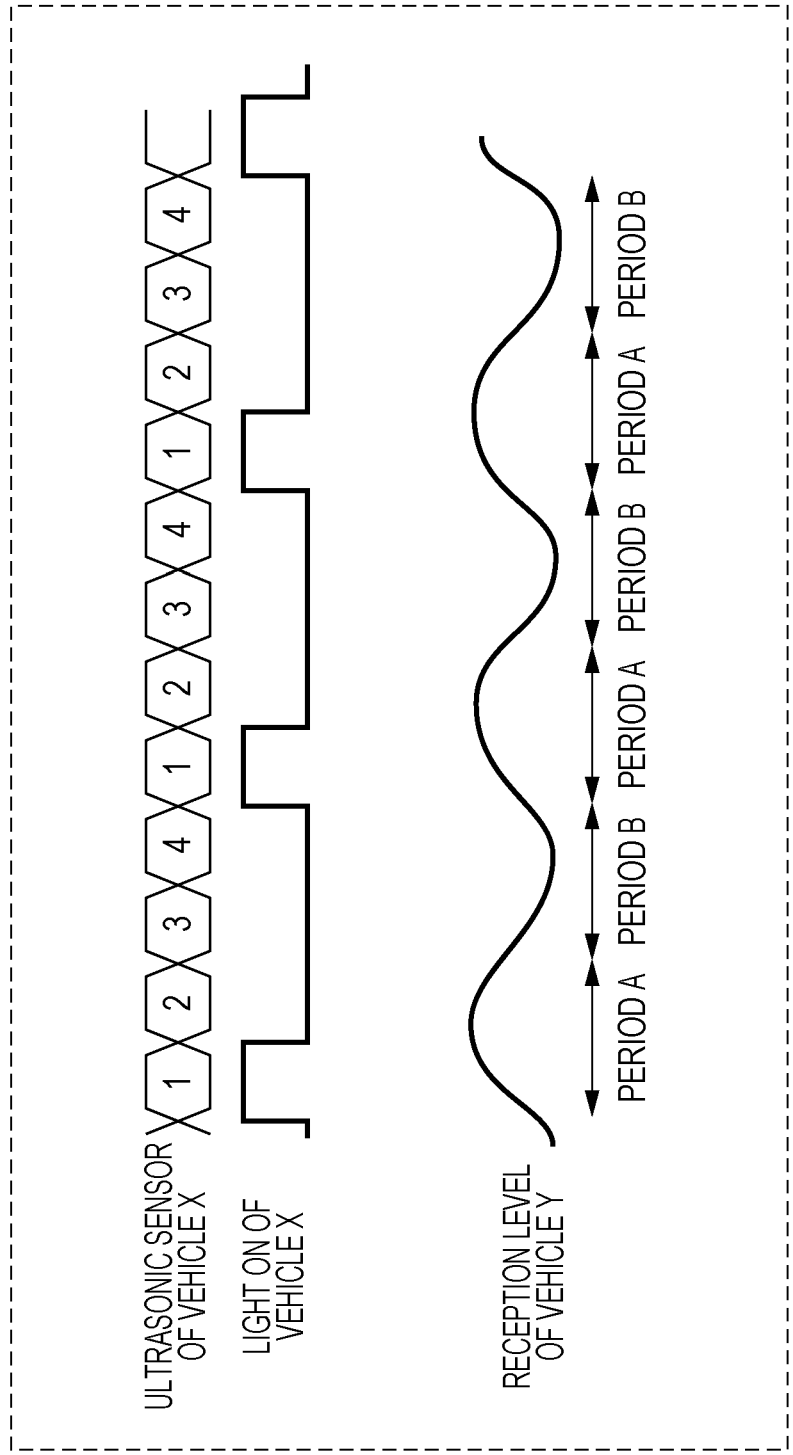

RADAR DEVICE AND INTERFERENCE PREVENTION METHOD

BACKGROUND

1. Technical Field

The present disclosure relates to a radar device using a millimeter waveband or the like and an interference suppression method. More specifically, the present disclosure relates to a technique for preventing or suppressing radio wave interference that occurs in a case where a radar device mounted in a host vehicle and a radar device mounted in another vehicle that is present around the host vehicle use the same radio frequency band (frequency channel).

2. Description of the Related Art

One example of a conventional radar interference prevention method is a method for preventing interference by determining whether or not a host vehicle and another vehicle are positioned so as to interfere with each other through exchange of information, such as a running position or a used radio frequency, between the host vehicle and the other vehicle and then switching the used radio frequency in a case where it is determined that the host vehicle and the other vehicle are positioned so as to interfere with each other (see, for example, Japanese Unexamined Patent Application Publication No. 2010-48716).

Another example of a radar interference prevention method is a method for alternating transmission of a signal (priority order signal) indicative of a priority order relative to another station and transmission of a radar signal (see, for example, Japanese Unexamined Patent Application Publication No. 2007-263915). In this method, in a case where interference is detected by transmission of a priority order signal from another station, a priority order is extracted by specifying an instantaneous frequency on the other station side, and interference is prevented by shifting a frequency band or a transmission timing in accordance with the extracted priority order.

In Japanese Unexamined Patent Application Publication No. 2010-48716, it is necessary to acquire positional information of a host vehicle and another vehicle in order to determine whether or not the host vehicle and the other vehicle are positioned so as to interfere with each other. However, there are places (e.g., an indoor parking lot) where it is difficult to acquire positional information. Furthermore, in Japanese Unexamined Patent Application Publication No. 2010-48716, a radio transceiver unit or the like need be provided in addition to a radar transceiver unit in order to transmit information such as positional information or a used radio frequency. This results in an increase in cost.

In Japanese Unexamined Patent Application Publication No. 2007-263915, interference temporarily occurs because an interference preventing process is started after interference is detected by transmission of a priority order signal from another station. Furthermore, Japanese Unexamined Patent Application Publication No. 2007-263915 assumes that interference can be properly detected even in a complicated radio propagation environment in which an enormous number of multipath waves are present, and therefore requires high interference detection performance. Furthermore, in Japanese Unexamined Patent Application Publication No. 2007-263915, a host station and another station are unable to transmit a radar signal while the host station and the other station are transmitting a priority order signal. This decreases use efficiency of a radio frequency, which is a limited resource.

SUMMARY

One non-limiting and exemplary embodiment provides a radar device and an interference prevention method that make it possible to prevent or suppress interference with a radar signal of another vehicle while effectively utilizing a resource such as a radio frequency without exchanging positional information or the like.

In one general aspect, the techniques disclosed here feature a radar device mounted in a host vehicle, including: a radar transmitter that transmits a radar signal; a light detector that detects ON or OFF of a light of another vehicle in which the radar device is mounted; and a controller that sets a transmission timing of the radar signal and a light ON timing of a light of the host vehicle, the light ON timing being synchronized with the transmission timing on basis of detected ON or OFF of the light of the other vehicle, and the set transmission timing being different from a transmission timing of a radar signal of the radar device mounted in the other vehicle.

According to one aspect of the present disclosure, it is possible to prevent or suppress interference with a radar signal of another vehicle while effectively utilizing a resource such as a radio frequency without exchanging positional information or the like.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13A illustrates an example of a beam pattern according to Embodiment 2;

FIG. 13B illustrates a relationship between a beam switching timing and a light ON timing of a light according to Embodiment 2;

FIG. 15A illustrates an example of a beam pattern in a case where a region to be detected is made up of two sectors in Embodiment 2;

FIG. 15B illustrates a beam switching timing and a light ON timing of a light in a case where a region to be detected is made up of two sectors in Embodiment 2;

FIG. 34 illustrates an ultrasonic sensor switching timing and a light ON timing of a light of a host vehicle and a reception state of an ultrasonic wave of another vehicle according to Embodiment 9.

DETAILED DESCRIPTION

Embodiments of the present disclosure are described in detail below with reference to the drawings.

Embodiment 1
Configuration of Radar Device

Figure 1:
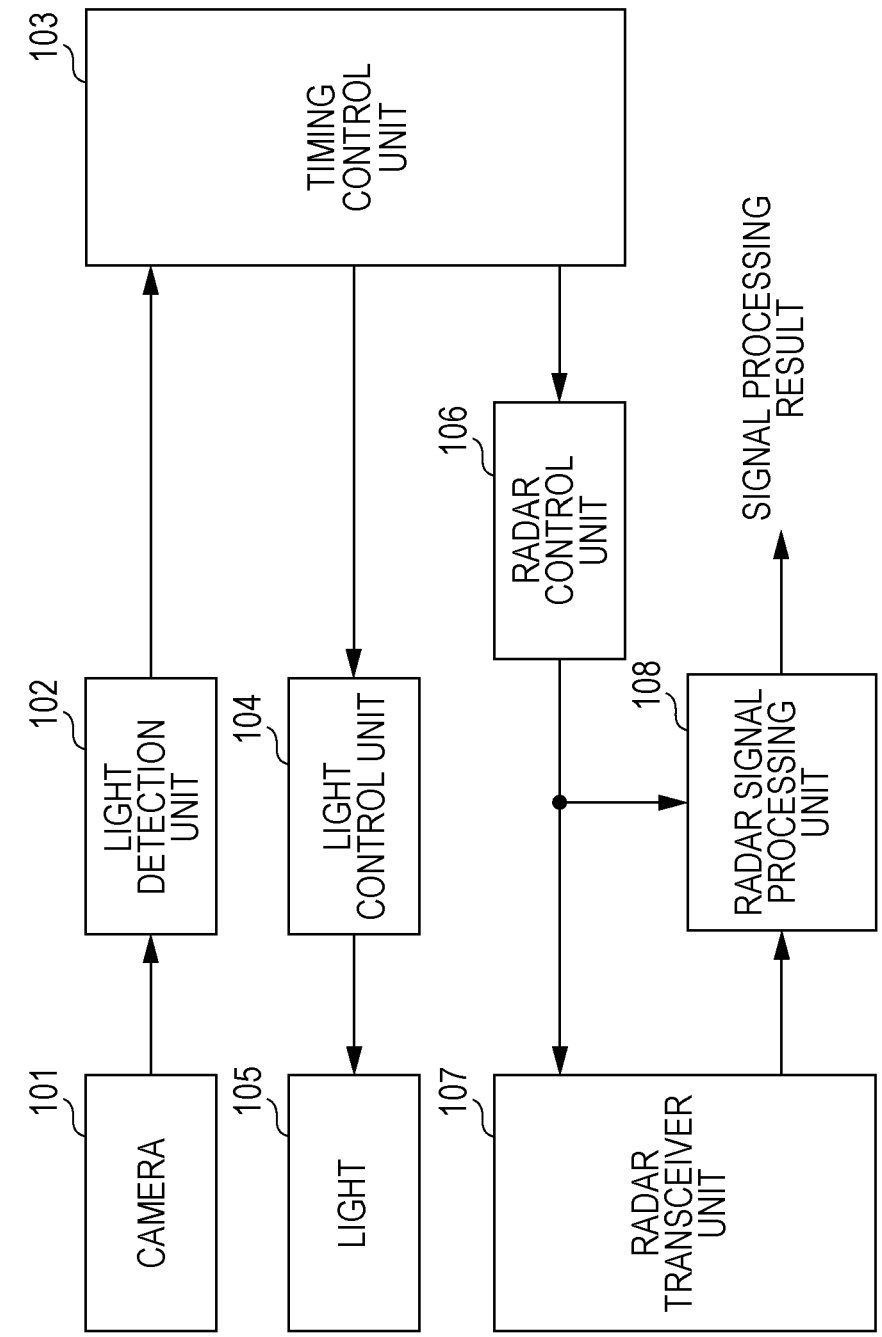
FIG. 1 illustrates a configuration of a radar device according to Embodiment 1.

FIG. 1 is a block diagram illustrating a configuration of a radar device 100 according to the present embodiment. The radar device 100 is an on-board radio radar device mounted in a vehicle.

The radar device 100 illustrated in FIG. 1 includes a camera 101, a light detection unit 102, a timing control unit 103, a light control unit 104, a light 105, a radar control unit 106, a radar transceiver unit 107, and a radar signal processing unit 108.

The camera 101 takes an image of a region including at least a direction in which the radar device 100 transmits a radar signal (radio wave). For example, the camera 101 may capture an image in a forward direction or a backward direction of a host vehicle. The camera 101 supplies the image to the light detection unit 102.

The light detection unit 102 detects whether a light of another vehicle (e.g., an oncoming vehicle, a vehicle in front of the host vehicle, or a vehicle behind the host vehicle) included in the image captured by the camera 101 is ON or OFF (hereinafter, ON or OFF of a light is referred to as a "state of a light"). The light detection unit 102 supplies a detection result to the timing control unit 103.

The timing control unit 103 sets a light ON timing of the light 105 of the host vehicle and a transmission timing of a radar signal transmitted from the host vehicle on the basis of the detection result (a state of the light of the other vehicle) supplied from the light detection unit 102. Then, the timing control unit 103 supplies a signal giving an instruction to turn on the light 105 or a signal giving an instruction to turn off the light 105 to the light control unit 104 on the basis of the light ON timing thus set. Furthermore, the timing control unit 103 supplies, to the radar control unit 106, a signal (transmission instruction signal) giving an instruction to transmit a radar signal on the basis of the transmission timing thus set.

In each of the host vehicle and the other vehicle, a transmission pattern of a radar signal (including a transmission period and a transmission suspension period) and a light ON/OFF pattern of the light 105 (including a light ON period and a light OFF period) are synchronized with each other. Accordingly, the timing control unit 103 specifies a transmission pattern of a radar signal transmitted from the other vehicle on the basis of a light ON/OFF pattern of the light of the other vehicle that is synchronized with the transmission pattern. Furthermore, the timing control unit 103 sets, as a transmission period of a radar signal of the radar device 100 of the host vehicle, a transmission suspension period of the radar signal of the other vehicle that is obtained from the specified transmission pattern. That is, the transmission period of the radar signal of the host vehicle is set different from that of the radar signal of the other vehicle.

Furthermore, the timing control unit 103 sets a light ON/OFF pattern of the light 105 of the host vehicle synchronized with a transmission pattern of a radar signal of the host vehicle. This allows the other vehicle to specify the transmission pattern of the radar signal of the host vehicle on the basis of the light ON/OFF pattern of the light 105 of the host vehicle.

The light control unit 104 controls ON/OFF of the light 105 in accordance with an instruction from the timing control unit 103. For example, the light control unit 104 supplies a control signal for turning on the light 105 to the light 105 upon receipt of the signal giving an instruction to turn on the light 105 from the timing control unit 103, whereas the light control unit 104 supplies a control signal for turning off the light 105 to the light 105 upon receipt of the signal giving an instruction to turn off the light 105 from the timing control unit 103.

The light 105 turns on or off on the basis of a control signal supplied from the light control unit 104. The light 105 is, for example, a light mounted on a vehicle such as a headlight or a taillight of a vehicle and is capable of flashing on and off at a speed that cannot be perceived by humans. For example, the light 105 may be constituted by an LED or a light-emitting element other than an LED.

The radar control unit 106 supplies a control signal for controlling transmission and reception of a radar signal to the radar transceiver unit 107 and the radar signal processing unit 108 in accordance with a radar signal transmission instruction signal supplied from the timing control unit 103.

The radar transceiver unit 107 generates a radar signal on the basis of the control signal supplied from the radar control unit 106 and then transmits the generated radar signal. For example, the radar transceiver unit 107 transmits a pulse compression radar signal made up of pulse sequences. However, the radar signal is not limited to this. Furthermore, the radar transceiver unit 107 receives a signal (reflected wave signal) that is the radar signal reflected by a target (object), and then supplies a reception signal obtained by frequency conversion of the received reflected wave signal to the radar signal processing unit 108.

The radar signal processing unit 108 performs radar signal processing (e.g., an object detection process) by using the control signal supplied from the radar control unit 106 and the reception signal supplied from the radar transceiver unit 107, and then outputs a radar signal processing result (e.g., an object detection result).

Note that the radar signal processing result (e.g., the object detection result) may be displayed, for example, on a display unit (not illustrated). The radar signal processing result (e.g., the object detection result) may be supplied to a processing device such as an ECU (Electronic Control Unit) (not illustrated).

The timing control unit 103 may be connected to a processing device, such as an ECU (not illustrated), that controls the entire radar device 100. In this case, an instruction to start or finish an operation of the radar device 100 may be supplied from the ECU.

The processing in the radar signal processing unit 108 may be performed in a processing device such as an ECU.

Operation of Radar Device 100

Next, an operation of the radar device 100 having the above configuration is described in detail.

In the following description, it is assumed that a light ON timing of the light 105 and a transmission timing of a radar signal in the radar transceiver unit 107 are synchronized with each other in all of vehicles in which the radar device 100 is mounted. In other words, a light OFF timing of the light 105 and a transmission suspension timing of a radar signal in the radar transceiver unit 107 are synchronized with each other.

That is, in each vehicle, a light ON period of the light 105 and a transmission period of a radar signal are set the same, and a light OFF period of the light 105 and a transmission suspension period of a radar signal are set the same.

Figure 2:
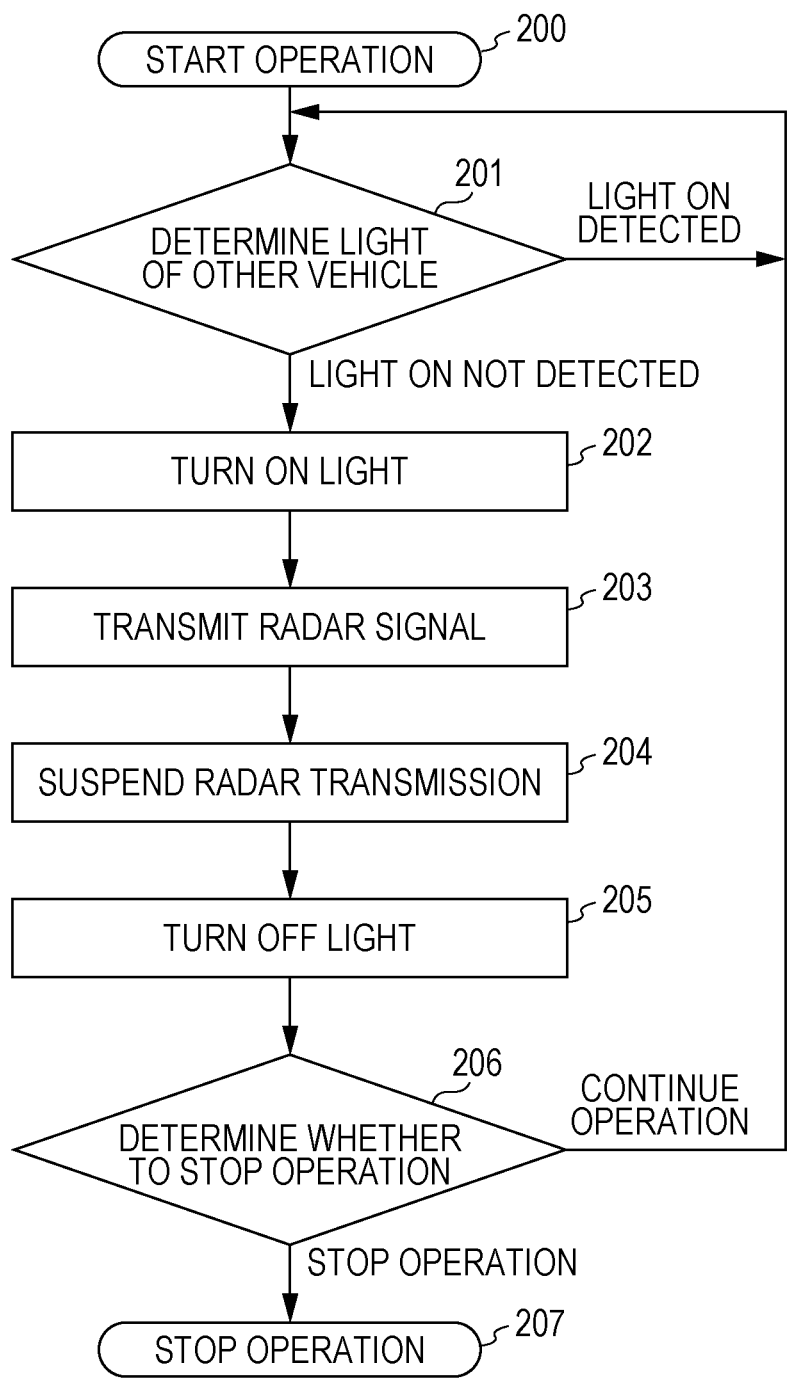
FIG. 2 illustrates an operation of the radar device according to Embodiment 1.

FIG. 2 is a flow chart illustrating an operation of the radar device 100 controlled by the timing control unit 103 of the radar device 100.

After the operation starts in Step (hereinafter referred to as "ST") 200, the timing control unit 103 determines in ST201 whether or not a light of another vehicle is on (a process of determining the light of the other vehicle) on the basis of a result of detection of a state of the light (hereinafter referred to as a "light detection result") that is supplied from the light detection unit 102. In a case where an ON state of the light of the other vehicle is detected (ST201: light ON detected), the timing control unit 103 repeats the process of determining the light of the other vehicle in ST201.

Meanwhile, in a case where an ON state of the light of the other vehicle is not detected (in a case where an OFF state of the light of the other vehicle is detected) (ST201: light ON not detected), the timing control unit 103 turns on the light 105 of the host vehicle in ST202 and causes the radar transceiver unit 107 to transmit a radar signal in ST203.

After the radar transmission in ST203 is continued, for example, for a predetermined period, the timing control unit 103 stops transmission of the radar signal in ST204 and turns off the light 105 of the host vehicle in ST205.

In ST206, the timing control unit 103 determines whether to continue or stop the operation of the radar device 100. In a case where the operation is continued, the timing control unit 103 returns to the process in ST201 (the process of determining the light of the other vehicle) and repeats the operation. Meanwhile, in a case where the operation is stopped, the timing control unit 103 stops the operation of the radar device 100 in ST207.

In this way, the timing control unit 103 determines that a light ON period of the light 105 of the other vehicle is a transmission period of a radar signal in the other vehicle, and a radar signal is not transmitted from the host vehicle during the transmission period of the other vehicle. Meanwhile, the timing control unit 103 determines that a light OFF period of the light 105 of the other vehicle is a transmission suspension period of a radar signal in the other vehicle, and a radar signal is transmitted from the host vehicle in the transmission suspension period of the other vehicle. This allows the radar device 100 to transmit a radar signal from the host vehicle while preventing or suppressing interference with a radar signal of the other vehicle by making a radar signal transmission period of the host vehicle different from that of the other vehicle on the basis of a light ON/OFF pattern of the light of the other vehicle.

Furthermore, the timing control unit 103 synchronizes ON of the light 105 (ST202) and radar transmission (ST203) and synchronizes OFF of the light 105 (ST205) and radar transmission suspension (ST204). This allows the radar device 100 to notify the other vehicle about a transmission timing of a radar signal transmitted from the host vehicle by causing the other vehicle to detect a light ON timing of the light 105 of the host vehicle.

Figure 3:
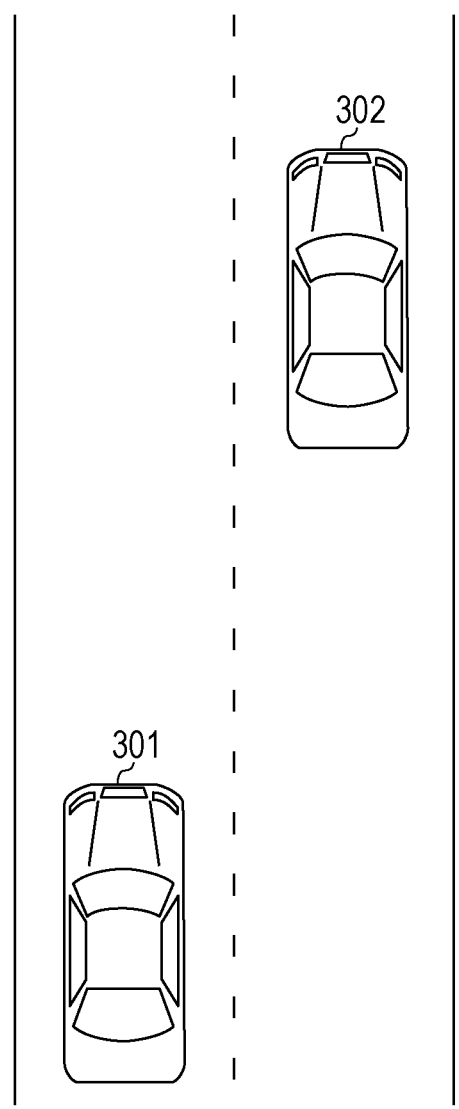
FIG. 3 illustrates an example of a situation in which the radar device according to Embodiment 1 operates.

Next, a specific example of the operation of the radar device 100 is described. FIG. 3 is a diagram illustrating an example of a situation assumed in the present embodiment. FIG. 3 illustrates a situation in which a vehicle 301 and a vehicle 302 are running in the same direction (upward in FIG. 3). Note that the radar device 100 is mounted in both of the vehicle 301 and the vehicle 302.

Figure 4:
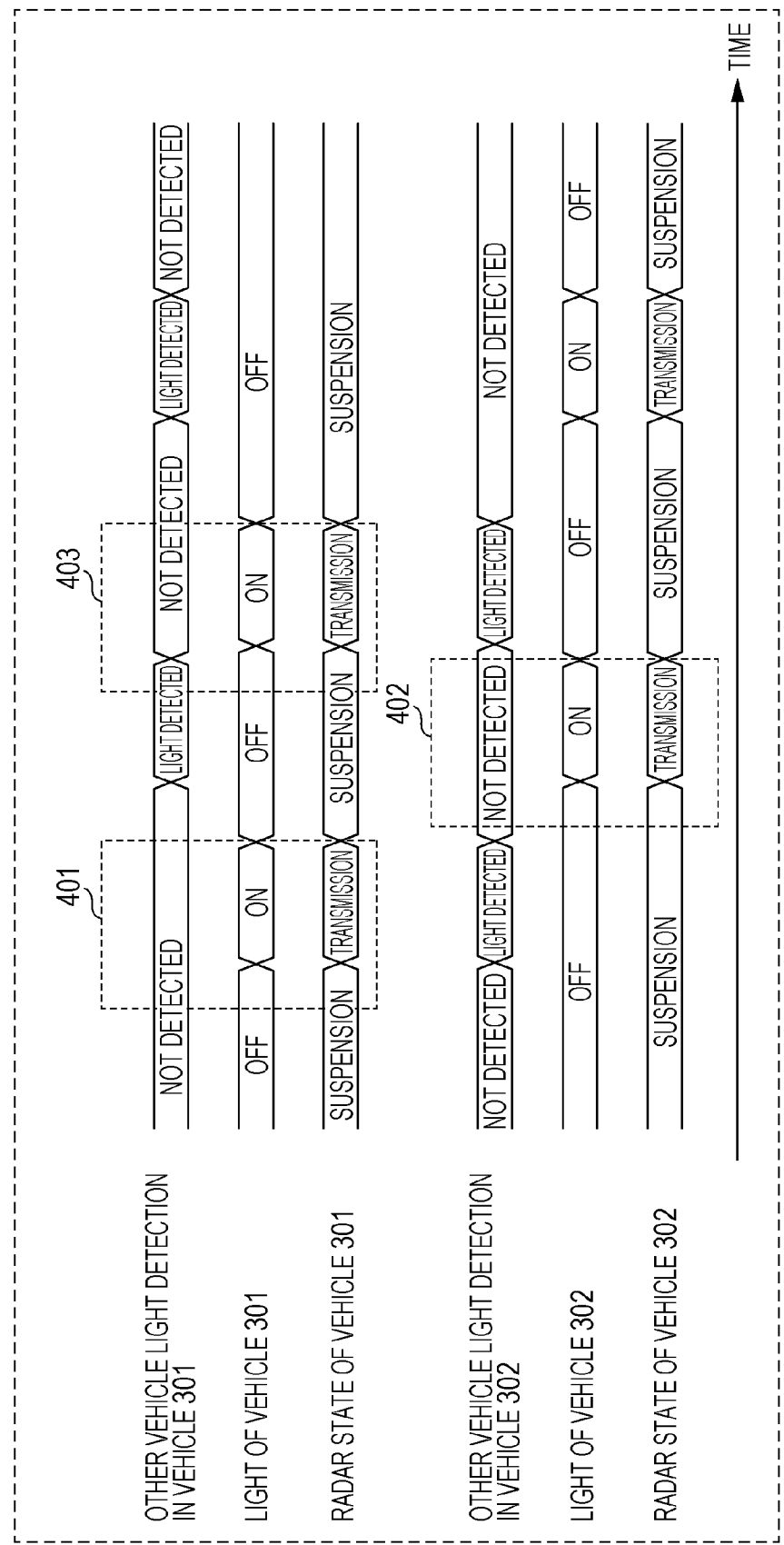
FIG. 4 illustrates an example of operation timings of lights and radar devices in a host vehicle and another vehicle according to Embodiment 1.

FIG. 4 is a diagram illustrating timings of operation states of the lights 105 and radars in the vehicle 301 and the vehicle 302.

In a transmission period 401 illustrated in FIG. 4, the radar device 100 mounted in the vehicle 301 detects a state of the light of the other vehicle by using the camera 101 before transmitting a radar signal. Since a light ON state of the light of the other vehicle (including the vehicle 302) is not detected in the transmission period 401 (other vehicle light detection: "NOT DETECTED"), the radar device 100 of the vehicle 301 determines that the other vehicle is not transmitting a radar signal in a direction in which a radar signal is to be transmitted by the vehicle 301, turns on the light 105 of the vehicle 301 (light: ON), and transmits a radar signal.

In a transmission period 402 illustrated in FIG. 4, the radar device 100 mounted in the vehicle 302 detects a state of the light of the other vehicle by using the camera 101 before transmitting a radar signal. Since a light ON state of the light of the other vehicle (including the vehicle 301) is not detected in the transmission period 402 (other vehicle light detection: "NOT DETECTED"), the radar device 100 of the vehicle 302 determines that the other vehicle is not transmitting a radar signal in a direction in which a radar signal is to be transmitted by the vehicle 302, turns on the light 105 of the vehicle 302 (light: ON), and transmits a radar signal.

In a transmission period 403, the radar device 100 mounted in the vehicle 301 detects a state of the light of the other vehicle by using the camera 101 before transmitting a radar signal. In the transmission period 403, a light ON state of the light of the vehicle 302 is detected. Accordingly, the radar device 100 of the vehicle 301 suspends transmission of a radar signal until a light OFF state of the light of the vehicle 302 is detected. Then, the radar device 100 of the vehicle 301 detects a light OFF state of the light of the vehicle 302, turns on the light 105 of the host vehicle 301, and transmits a radar signal.

Note that, in FIG. 4, in a case where transmission of a radar signal is started, each of the radar devices 100 of the vehicle 301 and the vehicle 302 turns off the light 105 (light: OFF) and stops transmission of the radar signal after 1 cycle of radar transmission.

The radar device 100 need not necessarily detect a moment at which an ON state of the light of the other vehicle switches to an OFF state and may detect an OFF state after elapse of a predetermined period from switching from an ON state to an OFF state. That is, the radar device 100 may intermittently detect a state of the light of the other vehicle.

As described above, in the present embodiment, in the radar device 100 mounted in each vehicle, a transmission timing of a radar signal and a light ON timing of the light 105 are synchronized with each other. The radar device 100 specifies a transmission timing of a radar signal from the other vehicle on the basis of a light ON timing of the light of the other vehicle and sets a transmission timing of a radar signal from the host vehicle to a timing different from the specified transmission timing.

That is, the radar device 100 transmits a radar signal of the host vehicle in a case where an ON state of the light 105 of the other vehicle is not detected. Meanwhile, in a case where an ON state of the light 105 of the other vehicle is detected, the radar device 100 does not transmit a radar signal of the host vehicle and waits until an ON state of the light 105 of the other vehicle is no longer detected. Then, in a case where an OFF state of the light of the other vehicle is confirmed (in a case where an ON state of the light of the other vehicle is not detected), the radar device 100 turns on the light 105 of the host vehicle and transmits a radar signal.

In the present embodiment, the radar device 100 can thus transmit a radar signal while preventing or suppressing interference with a radar signal of the other vehicle just by detecting a state of the light of the other vehicle. For example, it is possible to specify a transmission timing of a radar signal of the other vehicle and thus prevent or suppress interference even in a place (e.g., an indoor parking lot) where it is difficult to acquire positional information. Furthermore, according to the present embodiment, since a transmission timing of a radar signal of the other vehicle is specified on the basis of a state of the light of the other vehicle, a constituent element for transmitting information such as positional information or a used radio frequency is unnecessary. This makes it possible to suppress an increase in cost.

Furthermore, according to the present embodiment, the radar device 100 specifies a transmission timing of a radar signal transmitted from the other vehicle and starts transmission of a radar signal from the host vehicle in a transmission suspension period of a radar signal of the other vehicle, i.e., a period in which interference does not occur. This makes it possible to avoid a situation in which interference temporarily occurs, unlike Japanese Unexamined Patent Application Publication No. 2007-263915 in which an interference prevention process is started after detection of interference.

Furthermore, in the present embodiment, the radar device 100 of each vehicle transmits a radar signal in a light ON period of the light 105. Since the radar device 100 can detect whether or not interference with a radar signal of the other vehicle occurs by detecting a state of the light 105 of the other vehicle, a complicated interference detection performance or process is unnecessary.

Furthermore, according to the present embodiment, the radar device 100 of each vehicle specifies a transmission timing of a radar signal that is synchronized with a light ON timing of the light of the other vehicle by detecting a state of the light of the other vehicle, and thus autonomously controls transmission of a radar signal of the host vehicle. This makes it unnecessary for a plurality of vehicles to stop transmission of a radar signal to prevent interference with each other, unlike Japanese Unexamined Patent Application Publication No. 2007-263915. It is therefore possible to prevent a decrease in use efficiency of a radio frequency, which is a limited resource.

Therefore, according to the present embodiment, it is possible to prevent or suppress interference with a radar signal of the other vehicle while effectively using a resource such as a radio frequency without exchanging positional information or the like.

Modification 1

Figure 5:
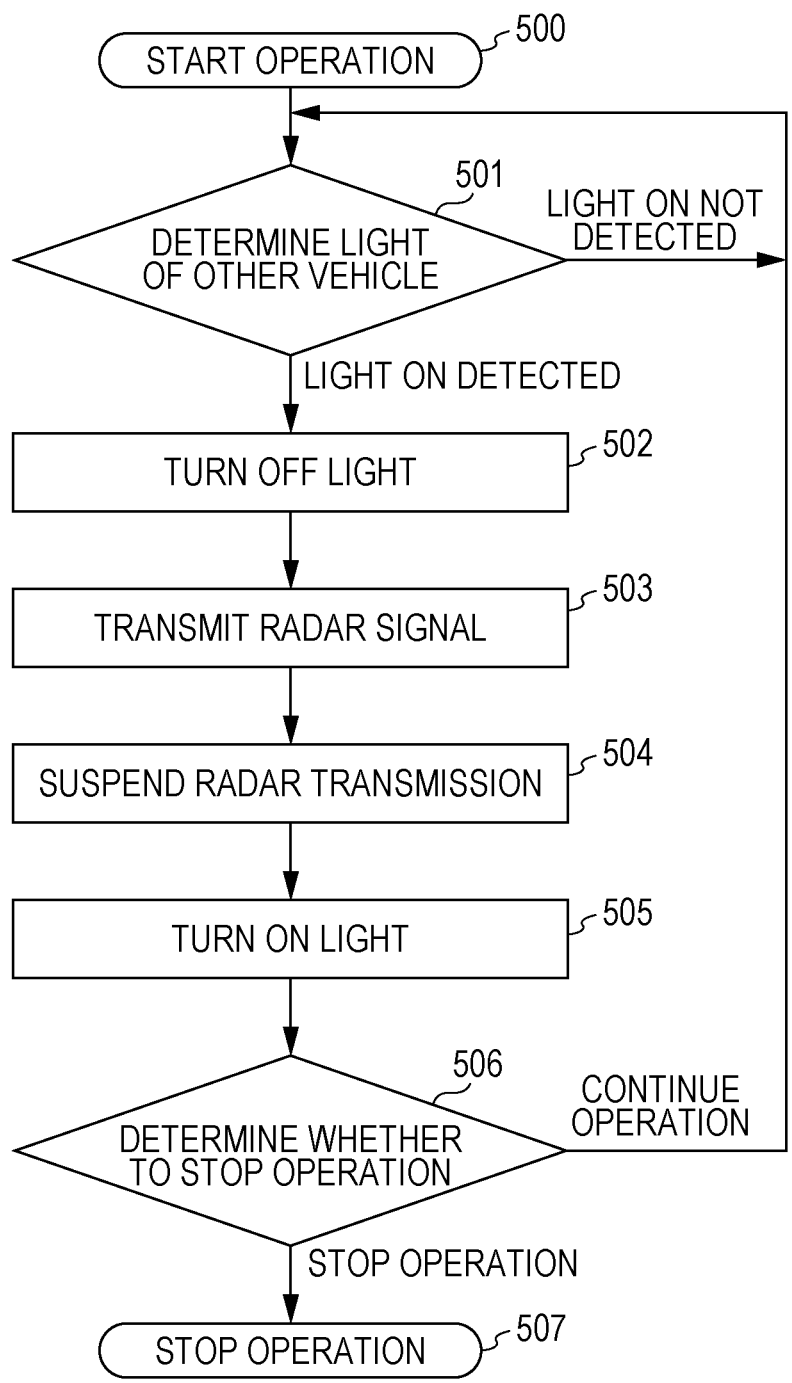
FIG. 5 illustrates an operation of a radar device according to Modification 1 of Embodiment 1.

FIG. 5 is a flow chart illustrating an operation of a radar device 100 controlled by a timing control unit 103 of the radar device 100 according to Modification 1.

In the modification of Embodiment 1, it is assumed that a light OFF timing of a light 105 and a transmission timing of a radar signal in a radar transceiver unit 107 are synchronized with each other in all vehicles in which the radar device 100 is mounted. In other words, a light ON timing of the light 105 and a transmission suspension timing of a radar signal in the radar transceiver unit 107 are synchronized with each other.

That is, in each vehicle, a light OFF period of the light 105 and a transmission period of a radar signal are set the same, and a light ON period of the light 105 and a transmission suspension period of a radar signal are set the same.

That is, the flow chart illustrated in FIG. 5 is different from the flow chart illustrated in FIG. 2 in that a radar signal is transmitted while the light 105 is off in each vehicle.

Details of an operation of the radar device 100 according to Modification 1 are described below.

After the operation starts in ST500, the timing control unit 103 determines whether or not a light of another vehicle is on (a process of determining the light of the other vehicle) on the basis of a light detection result that is supplied from a light detection unit 102 in ST501. In a case where an ON state of the light of the other vehicle is not detected (in a case where an OFF state of the light of the other vehicle is detected) (ST501: light ON not detected), the timing control unit 103 repeats the process of determining the light of the other vehicle in ST501.

Meanwhile, in a case where an ON state of the light of the other vehicle is detected (ST501: light ON detected), the timing control unit 103 turns off the light 105 of the host vehicle in ST502 and causes the radar transceiver unit 107 to transmit a radar signal in ST503.

After the radar transmission in ST503 is continued, for example, for a predetermined period, the timing control unit 103 stops transmission of the radar signal in ST504 and turns on the light 105 of the host vehicle in ST505.

In ST506, the timing control unit 103 determines whether to continue or stop the operation of the radar device 100. In a case where the operation is continued, the timing control unit 103 returns to the process in ST501 (the process of determining the light of the other vehicle) and repeats the operation. Meanwhile, in a case where the operation is stopped, the timing control unit 103 stops the operation of the radar device 100 in ST507.

Figure 6:
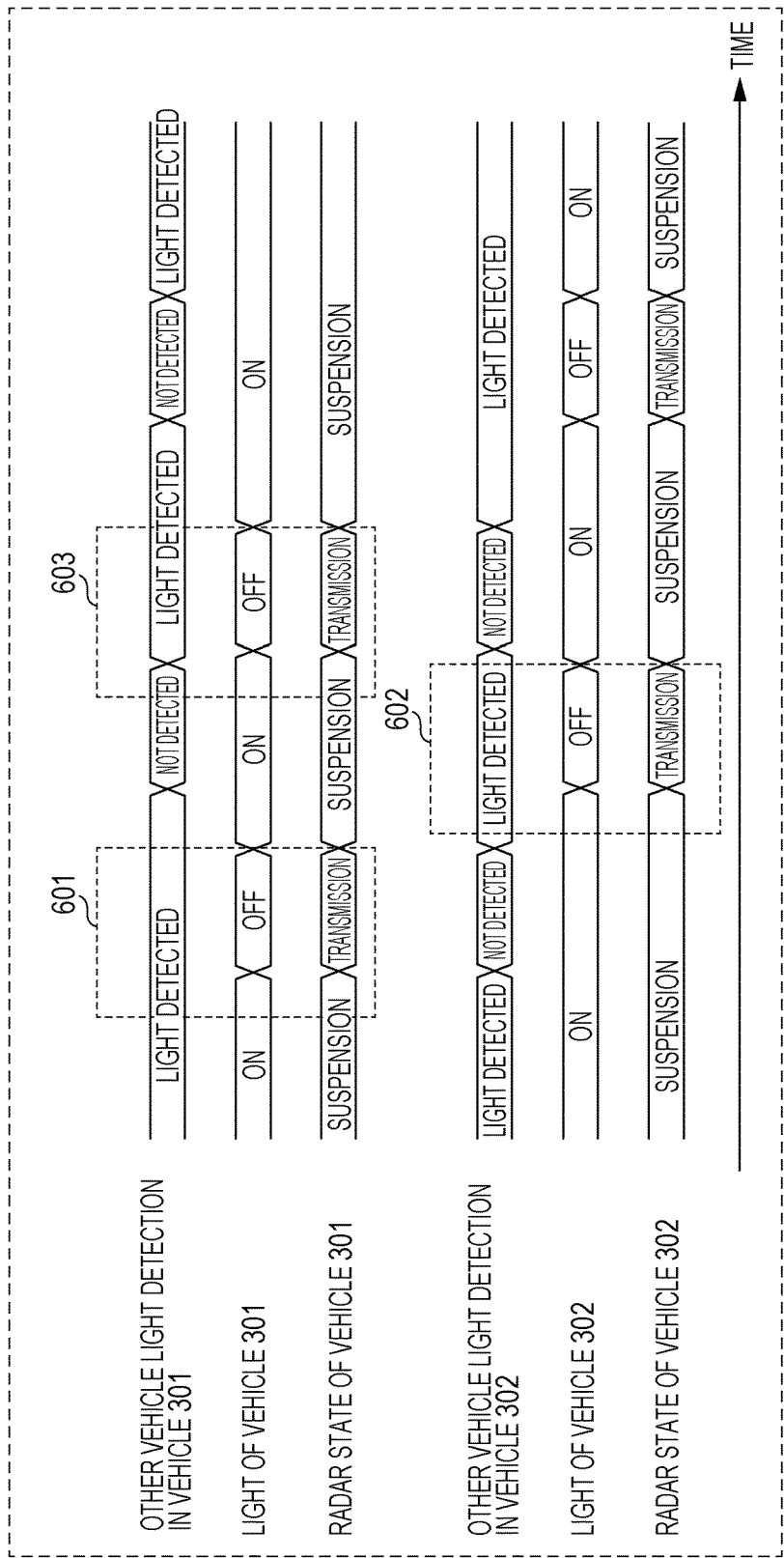
FIG. 6 illustrates an example of operation timings of lights and radar devices in a host vehicle and another vehicle according to Modification 1 of Embodiment 1.

Next, a specific example of the operation of the radar device 100 according to Modification 1 is described. FIG. 6 illustrates timings of operation states of the lights 105 and radars in the vehicle 301 and the vehicle 302 illustrated in FIG. 3.

FIG. 6 is different from FIG. 4 in that the light 105 is off while the radar device 100 of each vehicle is transmitting a radar signal.

Specifically, in a transmission period 601 illustrated in FIG. 6, a light ON state of the light of the vehicle 302 is detected, the radar device 100 of the vehicle 301 determines that the other vehicle is not transmitting a radar signal in a direction in which a radar signal is to be transmitted by the vehicle 301, turns off the light 105 of the vehicle 301 (light: OFF), and transmits a radar signal.

In a transmission period 602 illustrated in FIG. 6, a light ON state of the light of the vehicle 301 is detected, the radar device 100 of the vehicle 302 determines that the other vehicle is not transmitting a radar signal in a direction in which a radar signal is to be transmitted by the vehicle 302, turns off the light 105 of the vehicle 302 (light: OFF), and transmits a radar signal.

In a transmission period 603, the radar device 100 mounted in the vehicle 301 detects an OFF state of the light of the vehicle 302 before transmitting a radar signal (other vehicle light detection: "NOT DETECTED"). Accordingly, the radar device 100 of the vehicle 301 suspends transmission of a radar signal until a light ON state of the light of the vehicle 302 is detected. Then, the radar device 100 of the vehicle 301 turns off the light 105 of the host vehicle 301 and transmits a radar signal upon detection of an ON state of the light of the vehicle 302.

Note that, in FIG. 6, in a case where transmission of a radar signal is started, each of the radar devices 100 of the vehicle 301 and the vehicle 302 turns on the light 105 (light: ON) and stops transmission of the radar signal after 1 cycle of radar transmission.

As described above, even in a case where a light OFF timing of the light 105 and a transmission timing of a radar signal are synchronized with each other, it is possible to prevent or suppress interference with a radar signal of the other vehicle while effectively using a resource such as a radio frequency without exchanging positional information or the like as in the above embodiment.

Modification 2

In Modification 2, a case where a plurality of vehicles include ones in which a light ON timing of a light 105 and a transmission timing of a radar signal are synchronized with each other and ones in which a light OFF timing of the light 105 and a transmission timing of a radar signal are synchronized with each other is described.

That is, a radar device of each vehicle need determine a type of synchronization between a state of a light of another vehicle and transmission or transmission suspension of a radar signal (hereinafter referred to as a state of a radar signal).

Figure 7:
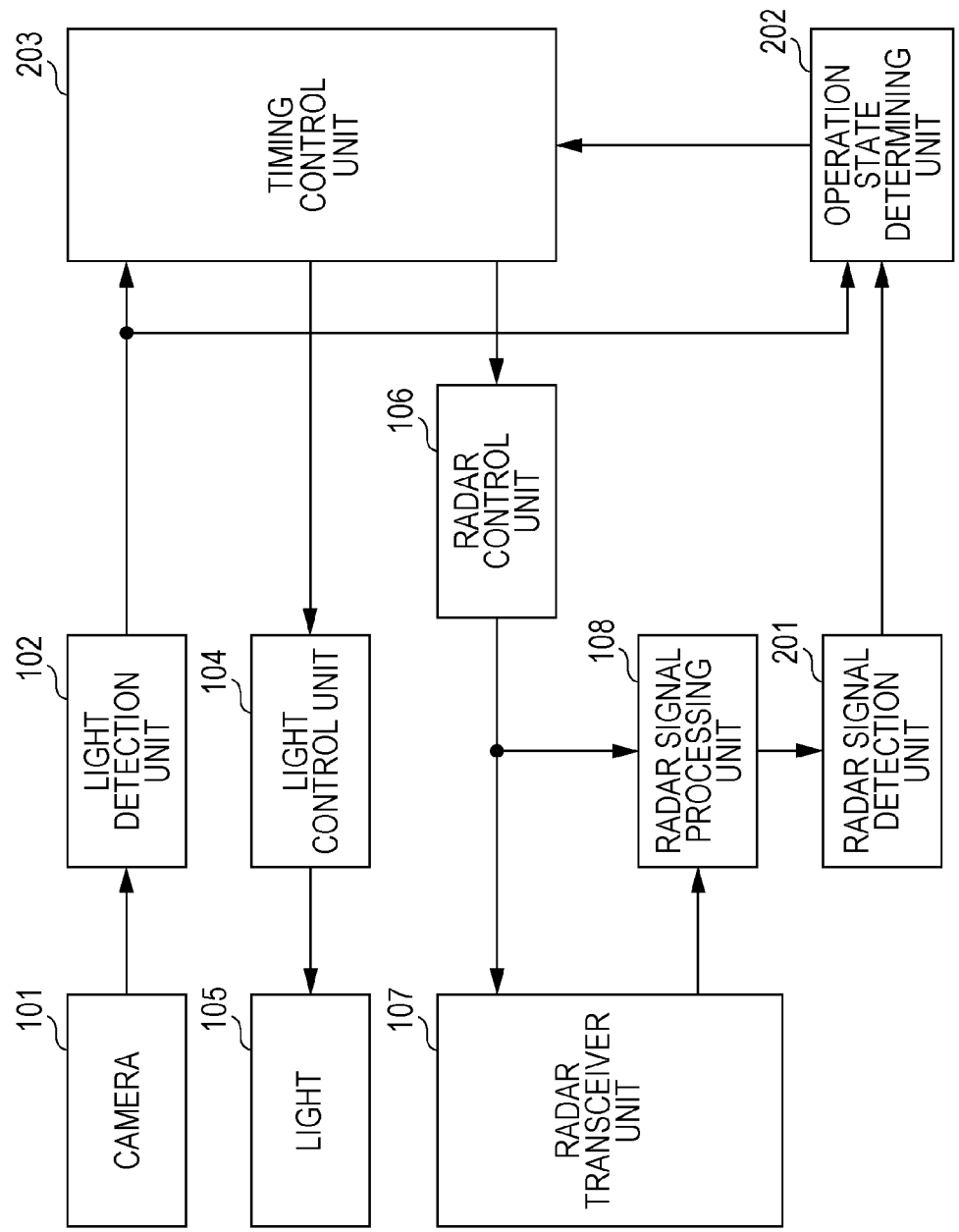
FIG. 7 illustrates a configuration of a radar device according to Modification 2 of Embodiment 1.

FIG. 7 is a block diagram illustrating a configuration of a radar device 200 according to Modification 2. In FIG. 7, constituent elements identical to those in the radar device 100 illustrated in FIG. 1 are given identical reference signs, and description thereof is omitted.

Specifically, the configuration illustrated in FIG. 7 is different from that illustrated in FIG. 1 in that a radar signal detection unit 201 and an operation state determining unit 202 are added and in an operation of the timing control unit 203.

The radar signal detection unit 201 determines whether or not there is a radar signal transmitted from another vehicle other than a host vehicle by using a reception signal (a baseband signal, i.e., a reflected wave signal) supplied from a radar signal processing unit 108. That is, the radar signal detection unit 201 detects a transmission timing of a radar signal transmitted from another vehicle by using a received reflected wave signal. For example, the radar signal detection unit 201 finds electric power of the supplied reception signal, and determines that there is a radar signal transmitted from another vehicle other than the host vehicle in a case where the electric power is higher than predetermined electric power (e.g., reception electric power of the reflected wave signal obtained on the assumption that only a radar signal from the host vehicle is received). The radar signal detection unit 201 supplies a detection result to the operation state determining unit 202.

The operation state determining unit 202 receives a light detection result (ON or OFF of the light of the other vehicle) supplied from the light detection unit 102 and the detection result (a transmission timing of a radar signal of the other vehicle; hereinafter referred to as a radar signal detection result) supplied from the radar signal detection unit 201. The operation state determining unit 202 determines whether or not the other vehicle is transmitting (or is not transmitting) a radar signal in an ON (or OFF) state of the light of the other vehicle by using the radar signal detection result and the light detection result that are obtained at the same timing. That is, the operation state determining unit 202 determines correspondence (i.e., a synchronization type) between a transmission period/transmission suspension period of a radar signal transmitted from the other vehicle and a light ON period/light OFF period of the light of the other vehicle on the basis of the state of the light of the other vehicle and the state of the radar signal from the other vehicle.

Specifically, in a case where a light ON state of the light of the other vehicle and the presence of a radar signal are detected at the same timing, the operation state determining unit 202 determines that a light ON timing of the light and a transmission timing of a radar signal are synchronized with each other in the other vehicle. Meanwhile, in a case where a light ON state of the light of the other vehicle is not detected (a light OFF state of the light of the other vehicle is detected) and the presence of a radar signal is detected at the same timing, the operation state determining unit 202 determines that a light OFF timing of the light and a transmission timing of a radar signal are synchronized with each other in the other vehicle.

In addition to the operation of the timing control unit 103 illustrated in FIG. 1, a timing control unit 203 sets a transmission timing of a radar signal and a light ON timing of the light 105 of the host vehicle in accordance with the correspondence (i.e., synchronization type) between the state of the light and the state of a radar signal in the other vehicle that has been determined by the operation state determining unit 202.

Specifically, the timing control unit 203 operates in accordance with Embodiment 1 (the flow chart illustrated in FIG. 2) in a case where a light ON timing of the light and a transmission timing of a radar signal are synchronized with each other in the other vehicle. Meanwhile, the timing control unit 203 operates in accordance with Modification 1 (the flow chart illustrated in FIG. 5) in a case where a light OFF timing of the light and a transmission timing of a radar signal are synchronized with each other in the other vehicle.

Figure 8:
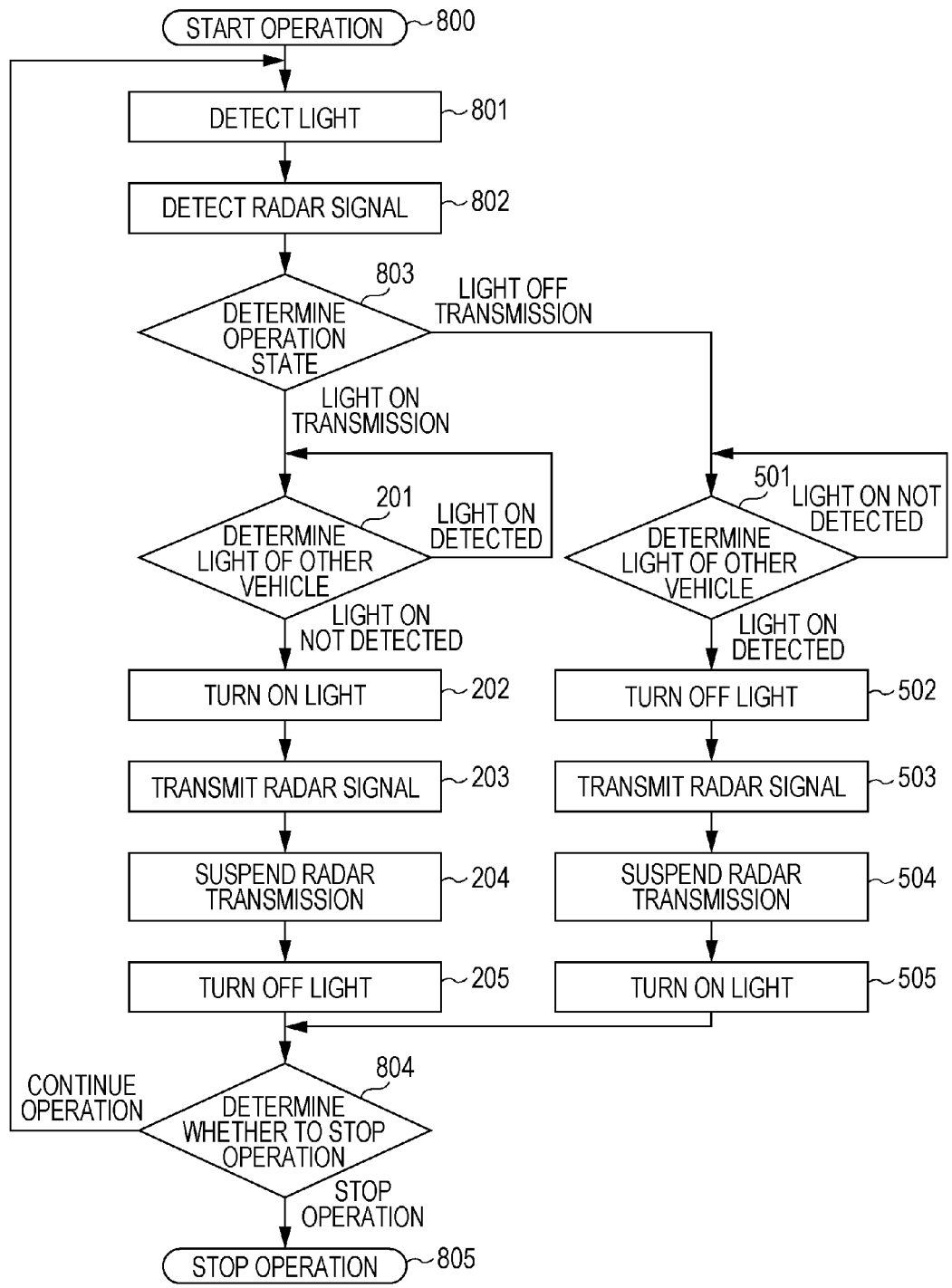
FIG. 8 illustrates an operation of the radar device according to Modification 2 of Embodiment 1.

FIG. 8 is a flow chart illustrating an operation of the radar device 200 according to Modification 2. In FIG. 8, steps similar to those illustrated in FIGS. 2 and 5 are given identical reference signs, and description thereof is omitted.

In FIG. 8, after the operation is started in ST800, the light detection unit 102 detects a state of a light of another vehicle by using an image captured by a camera 101 in ST801, and the radar signal detection unit 201 detects the presence of a radar signal (a transmission timing of a radar signal) transmitted from the other vehicle in ST802. The order of the light detection in ST801 and the radar signal detection in ST802 is not limited to this. The radar signal detection in ST802 may be performed before the light detection in ST801. Alternatively, the light detection in ST801 and the radar signal detection in ST802 may be performed concurrently.

In ST803, the operation state determining unit 202 determines correspondence (a synchronization type) between the state (ON or OFF) of the light and the state (transmission or transmission suspension) of a radar signal in the other vehicle on the basis of the light detection result obtained in ST801 and the radar signal detection result obtained in ST802. That is, the operation state determining unit 202 determines whether a radar signal is transmitted in an ON state of the light ("light ON transmission") or a radar signal is transmitted in an OFF state of the light ("light OFF transmission").

The timing control unit 203 performs processes in ST201 to ST205 (processes similar to those in FIG. 2) in a case of light ON transmission and performs processes in ST501 to ST505 (processes similar to those in FIG. 5) in a case of light OFF transmission.

In ST804, the timing control unit 203 determines whether to continue or stop the operation of the radar device 200. In a case where the operation is continued, the timing control unit 203 returns to the process in ST801 and repeats the operation. Meanwhile, in a case where the operation is stopped, the timing control unit 203 stops the operation of the radar device 200 in ST805.

Figure 9:
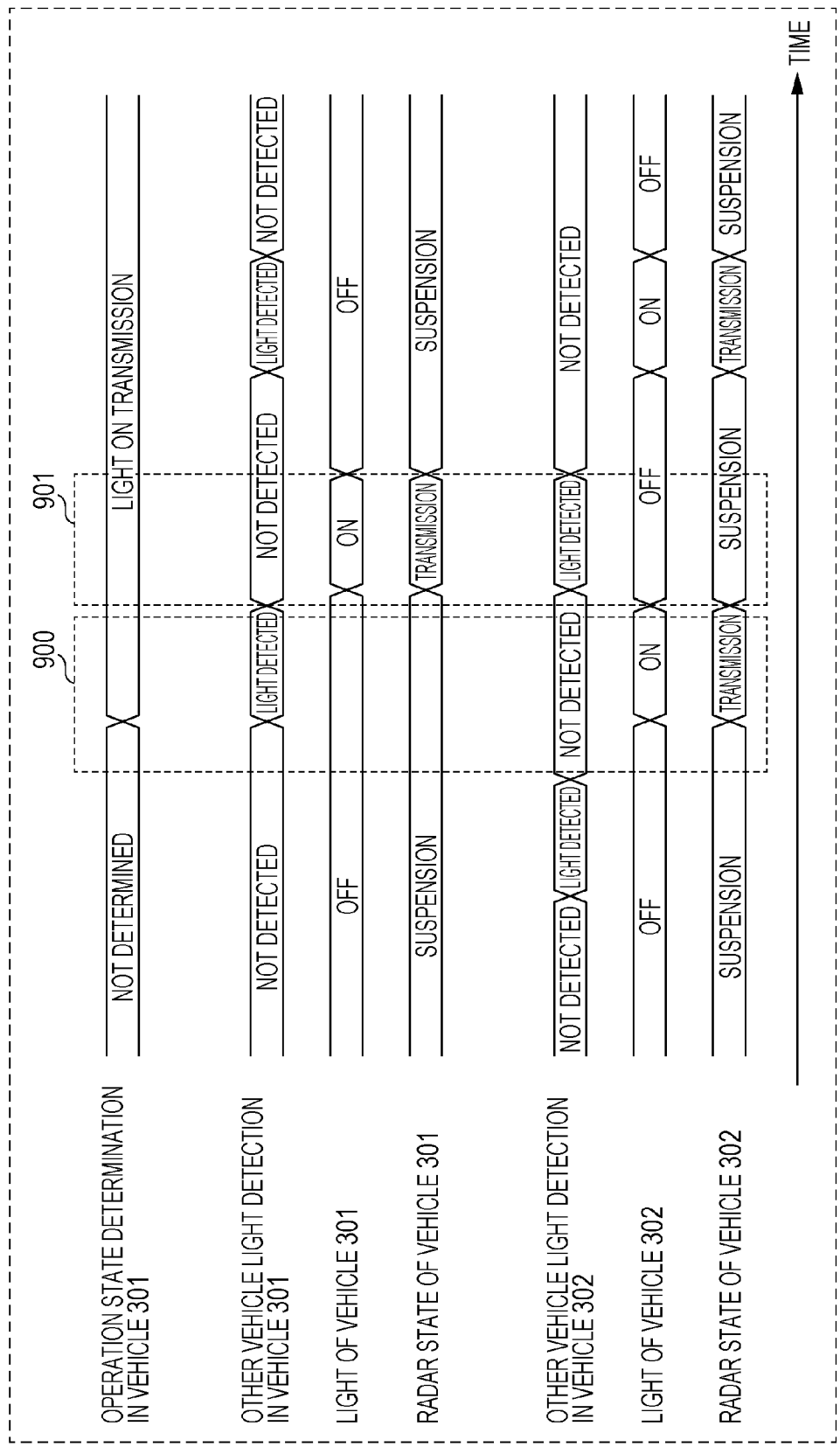
FIG. 9 illustrates an example of operation timings of lights and radar devices in a host vehicle and another vehicle according to Modification 2 of Embodiment 1.

Next, a specific example of the operation of the radar device 200 according to Modification 2 is described. FIG. 9 is a diagram illustrating operation state determination in the vehicle 301 (the operation state determining unit 202) and timings of operation states of the lights 105 and radars in the vehicle 301 and the vehicle 302 illustrated in FIG. 3.

In FIG. 9, it is assumed that the operation state determination in the vehicle 301 is started in a state where the operation state has not been determined yet. It is also assumed that "light ON transmission" (a radar signal is transmitted in an ON state of the light) is set in the vehicle 301.

In a period 900 illustrated in FIG. 9, the radar device 200 of the vehicle 301 detects an ON state of the light of the vehicle 302 and the presence of a radar signal transmitted from the vehicle 302 at the same timing. Therefore, the radar device 200 of the vehicle 301 determines that a radar signal is transmitted in an ON state of the light in the vehicle 302 ("light ON transmission").

Next, in a period 901 illustrated in FIG. 9, since an ON state of the light of the other vehicle is not detected (an OFF state of the light of the other vehicle is detected) (other vehicle light detection: "NOT DETECTED"), the radar device 200 of the vehicle 301 determines that the other vehicle is not transmitting a radar signal in a direction in which a radar signal is to be transmitted by the vehicle 301, turns on the light 105 of the vehicle 301 (light: ON), and transmits a radar signal.

In FIG. 9, the case where the operation state of the vehicle 302 is "light ON transmission" is illustrated. In a case where the operation state of the vehicle 302 is "light OFF transmission", the radar device 200 of the vehicle 301 need just turn on the light 105 of the vehicle 301 (light: ON) and transmit a radar signal upon detection of an ON state of the light of the other vehicle (not illustrated). In FIG. 9, the case where "light ON transmission" (a radar signal is transmitted in a light ON state) is set in the radar device 200 of the vehicle 301. However, "light OFF transmission" (a radar signal is transmitted in a light OFF state) may be set in the radar device 200 of the vehicle 301.

As described above, even in a case where there are plural correspondences (synchronization types) between a state of a light and a state of a radar signal in a plurality of vehicles, the radar device 200 sets a transmission timing of a radar signal of the host vehicle by determining correspondence of another vehicle. This makes it possible to prevent or suppress interference with a radar signal of the other vehicle while effectively using a resource such as a radio frequency without exchanging positional information or the like, as in the above embodiment.

Modification 3

In the method based on the flow chart illustrated in FIG. 2, 5, or 8, a situation in which an ON/OFF cycle of a light 105 dynamically fluctuates markedly can be coped with. However, in a case where there are three or more vehicle that can interfere with each other as described later, there is a possibility that a radar signal is transmitted from a plurality of vehicles at the same timing.

In Modification 3, an example assuming that an ON/OFF cycle of the light 105 does not dynamically fluctuate markedly (the ON/OFF cycle is substantially constant) is described.

Figure 10:
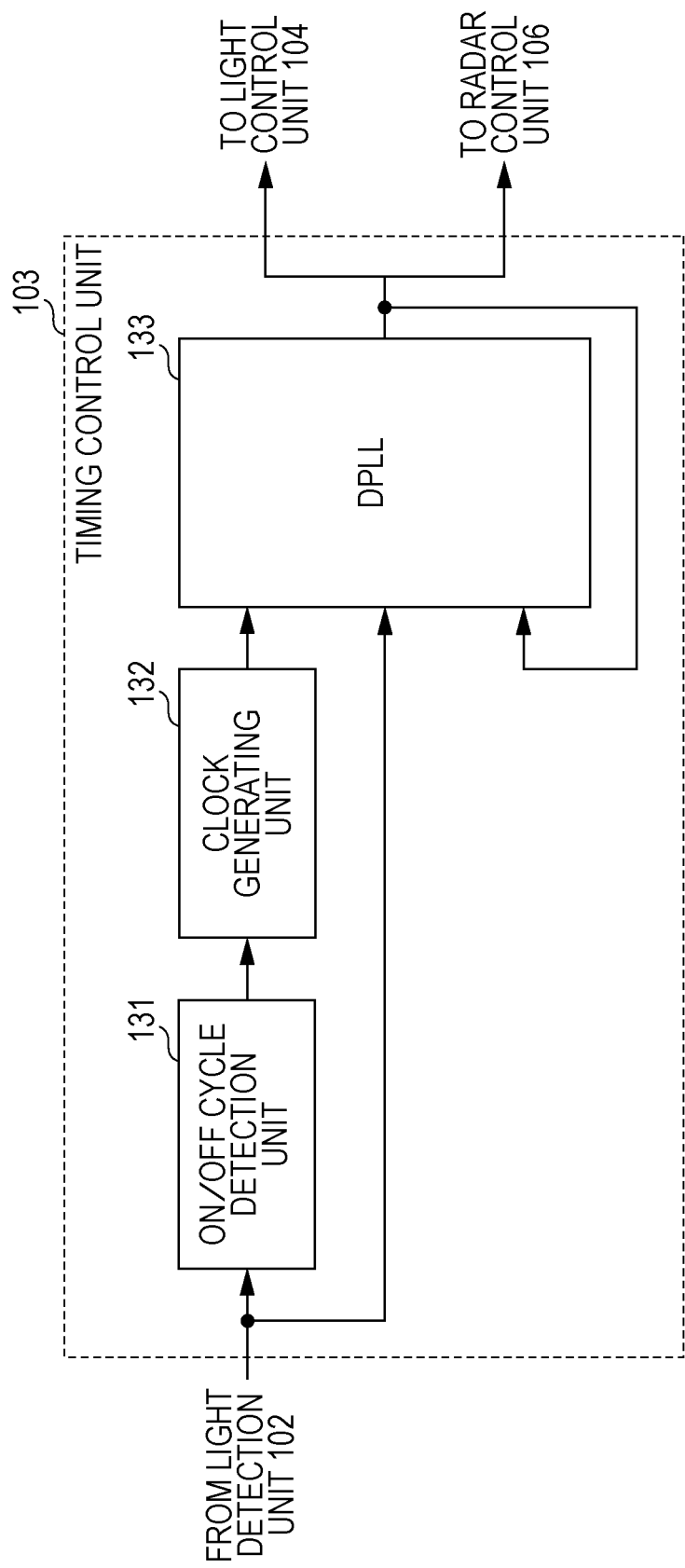
FIG. 10 illustrates an internal configuration of a timing control unit of a radar device according to Modification 3 of Embodiment 1.

FIG. 10 is a block diagram illustrating an example of an internal configuration of a timing control unit 103 according to Modification 3.

The timing control unit 103 illustrated in FIG. 10 includes an ON/OFF cycle detection unit 131, a clock generating unit 132, and a digital PLL (Phase Locked Loop) 133.

In the timing control unit 103 illustrated in FIG. 10, a light detection result supplied from a light detection unit 102 is supplied to the ON/OFF cycle detection unit 131 and the DPLL 133.

The ON/OFF cycle detection unit 131 detects an ON/OFF cycle of a light of another vehicle on the basis of the light detection result (a digital signal) indicative of a state of the light of the other vehicle. For example, the ON/OFF cycle detection unit 131 detects the ON/OFF cycle of the light by counting the number of clocks from a light ON timing to a light OFF timing and from a light OFF timing to a light ON timing of the light of the other vehicle (a light ON period and a light OFF period) by using a clock whose cycle is sufficiently shorter than a assumed light ON/OFF cycle. The ON/OFF cycle detection unit 131 supplies the ON/OFF cycle to the clock generating unit 132 so that a frequency that is M times as high as a frequency corresponding to the detected ON/OFF cycle is output.

The clock generating unit 132 generates a clock corresponding to the frequency that is M times as high as the frequency corresponding to the detected ON/OFF cycle on the basis of the ON/OFF cycle supplied from the ON/OFF cycle detection unit 131. A method for generating a clock can be, for example, a method of obtaining a desired clock frequency by generating a voltage corresponding to a set frequency and then inputting the voltage to a VCO (Voltage Controlled Oscillator) or a method of configuring an NCO (Numerically Controlled Oscillator).

The DPLL 133 divides the clock supplied from the clock generating unit 132 by approximately M. Then, the DPLL 133 compares a signal that has been divided and a signal supplied from the light detection unit 102 and controls a division ratio so that phases of these signals match each other. This turns an output signal from the DPLL 133 into a signal that is synchronized with the signal that is the light detection result obtained by the light detection unit 102.

According to the arrangement, a light ON/OFF cycle that is necessary in a case where the number of vehicles is three or more (details thereof will be described later) can be used.

Note that in a case where an ON/OFF cycle of a light dynamically fluctuates markedly, the fluctuation is detected by the ON/OFF cycle detection unit 131 of the timing control unit 103 illustrated in FIG. 10, and a frequency of a clock that is output from the clock generating unit 132 is set again. In this way, a signal that is synchronized with a light ON/OFF cycle after the fluctuation is obtained.

Assume that a light ON/OFF cycle is stable, for example, the process of determining the light of the other vehicle (ST201) in the flow chart illustrated in FIG. 2 substantially comes down to determining whether the output signal from the DPLL 133 is 0 or 1.

Figure 11:
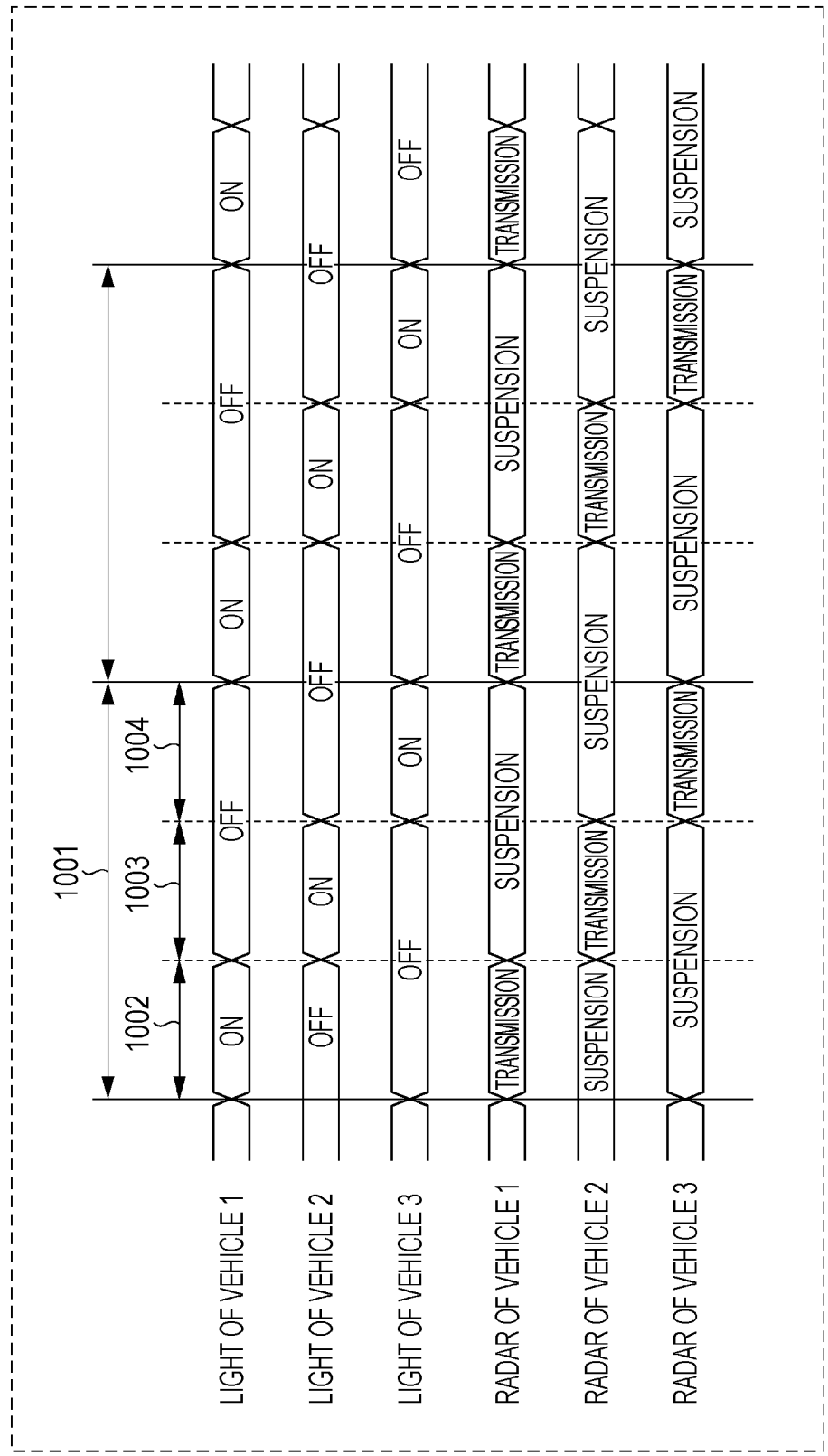
FIG. 11 illustrates an example of operation timings of lights and radar devices in three vehicles according to Modification 3 of Embodiment 1.

FIG. 11 illustrates the lights 105 and transmission timings of radar signals in three vehicles 1 through 3.

In FIG. 11, a cycle 1001 (a light ON/OFF cycle) is a cycle (an ON/OFF cycle, a transmission cycle) on which a vehicle repeats turning on the light 105 and transmitting a radar signal. That is, the cycle 1001 is a cycle from a light ON timing to a light OFF timing and from a light OFF timing to a light ON timing of a light of a vehicle. The duration of the cycle 1001 is T1.

A period 1002 is a period in which the vehicle 1 turns on the light 105 and transmits a radar signal. A period 1003 is a period in which the vehicle 2 turns on the light 105 and transmits a radar signal. A period 1004 is a period in which the vehicle 3 turns on the light 105 and transmits a radar signal.

As illustrated in FIG. 11, the radar device 100 mounted in each vehicle divides the cycle T1 by the number of vehicles that can interfere with each other and sets any one of the divided periods as a light ON period of the light 105 and a transmission period of a radar signal. In the example illustrated in FIG. 11, the cycle T1 is divided so that a ratio of a period in which the light 105 is on and a radar signal is transmitted and a period in which the light 105 is off and a radar signal is not transmitted is constant, specifically, 1:2 in each vehicle.

In FIG. 11, a ratio of a period for radar transmission and a period for radar transmission suspension is 1:2. However, the present modification is not limited to this. A ratio of a period for radar transmission and a period for radar transmission suspension changes depending on an increase or a decrease in the number of vehicles that can interfere with each other. For example, a ratio of a period for radar transmission and a period for radar transmission suspension may be set to 1:3 in a case where the number of vehicles is four or may be set to 1:4 in a case where the number of vehicles is five.

As described above, in Modification 3, the cycle T1 for turning on the light 105 and transmitting a radar signal is divided by the number of vehicles that are present within a specific area (e.g., under an environment in which the vehicles can interfere with each other), and any one of the divided plurality of periods is set as a transmission period of a radar signal of each vehicle. This makes it possible to optimally distribute a period for transmission of a radar signal to each of the vehicles that are present within the specific area.

Note that, for example, in a case where a ratio of a radar transmission period and a radar transmission suspension period is 1:2 as illustrated in FIG. 11, it may be determined in which of the three periods 1002, 1003, and 1004 two vehicles other than the host vehicle transmit a radar signal by using the configuration of the radar device 200 illustrated in FIG. 7.

Specifically, an operation state determining unit 202 determines in which of the three periods 1002, 1003, and 1004 the other vehicles are transmitting a radar signal by using a radar signal detection result and a light detection result that are obtained at the same timing. Then, a timing control unit 203 need just specify a period in which the other vehicles are not transmitting a radar signal and set the specified period as a period in which the host vehicle transmits a radar signal.

More specifically, the operation state determining unit 202 finds the number of periods N per cycle T1 (ON/OFF cycle) on the basis of a ratio of a light ON period and a light OFF period of the light 105 of each of the other vehicles that is detected by the light detection unit 102. Then, the operation state determining unit 202 determines M periods in which the lights 105 of the other vehicles are on and (N−M) periods in which the lights 105 of the other vehicles are off among the N periods. The host vehicle is controlled to transmit a radar signal in any of the (N−M) periods in which the lights 105 of the other vehicles are off.

In the process of determining the M periods in which the lights 105 of the other vehicles are on, the presence of a radar signal transmitted from the other vehicles may be detected in addition to the state of the lights 105 of the other vehicles. For example, the operation state determining unit 202 may determine M periods in which the other vehicles transmit a radar signal and (N−M) periods in which the other vehicles do not transmit a radar signal. Alternatively, the operation state determining unit 202 may determine M periods in which both a light ON state of the lights 105 of the other vehicles and transmission of a radar signal transmitted from the other vehicles are detected and remaining (N−M) periods.

FIG. 11 illustrates an example in which a transmission period of a radar signal of the vehicle 1 comes first, a transmission period of a radar signal of the vehicle 2 comes next, and a transmission period of a radar signal of the vehicle 3 comes finally. However, the present modification is not limited to this. The order of transmission of a radar signal among the vehicles may be changed every cycle T1. The order of transmission of a radar signal among the vehicles may be randomly switched. In order to prolong an ON period of the light 105 of each vehicle, a specific pattern for cyclically shifting the order of transmission of a radar signal among the vehicles may be preset, and a period for transmission of a radar signal in each cycle may be shifted in each vehicle in accordance with the preset pattern. In this case, it is possible to more efficiently secure a transmission period of a radar signal within the cycle T1 as compared with a case where the order of transmission of a radar signal among the vehicles is randomly changed.

The time when the light 105 of a vehicle is turned on is not limited to a nighttime and can be a daytime. In the daytime, it is only necessary for a radar device to be able to detect an ON state of the light 105 of another vehicle. Therefore, the light 105 may be turned on and off at a high speed or may be turned on for a short time in a manner that cannot be perceived by human eyes.

Embodiment 2

In the present embodiment, operations of a radar transceiver unit 107 and a radar signal processing unit 108 in a radar device described in Embodiment 1 (the radar device 100 illustrated in FIG. 1 or the radar device 200 illustrated in FIG. 7) are described in detail.

Figure 12:
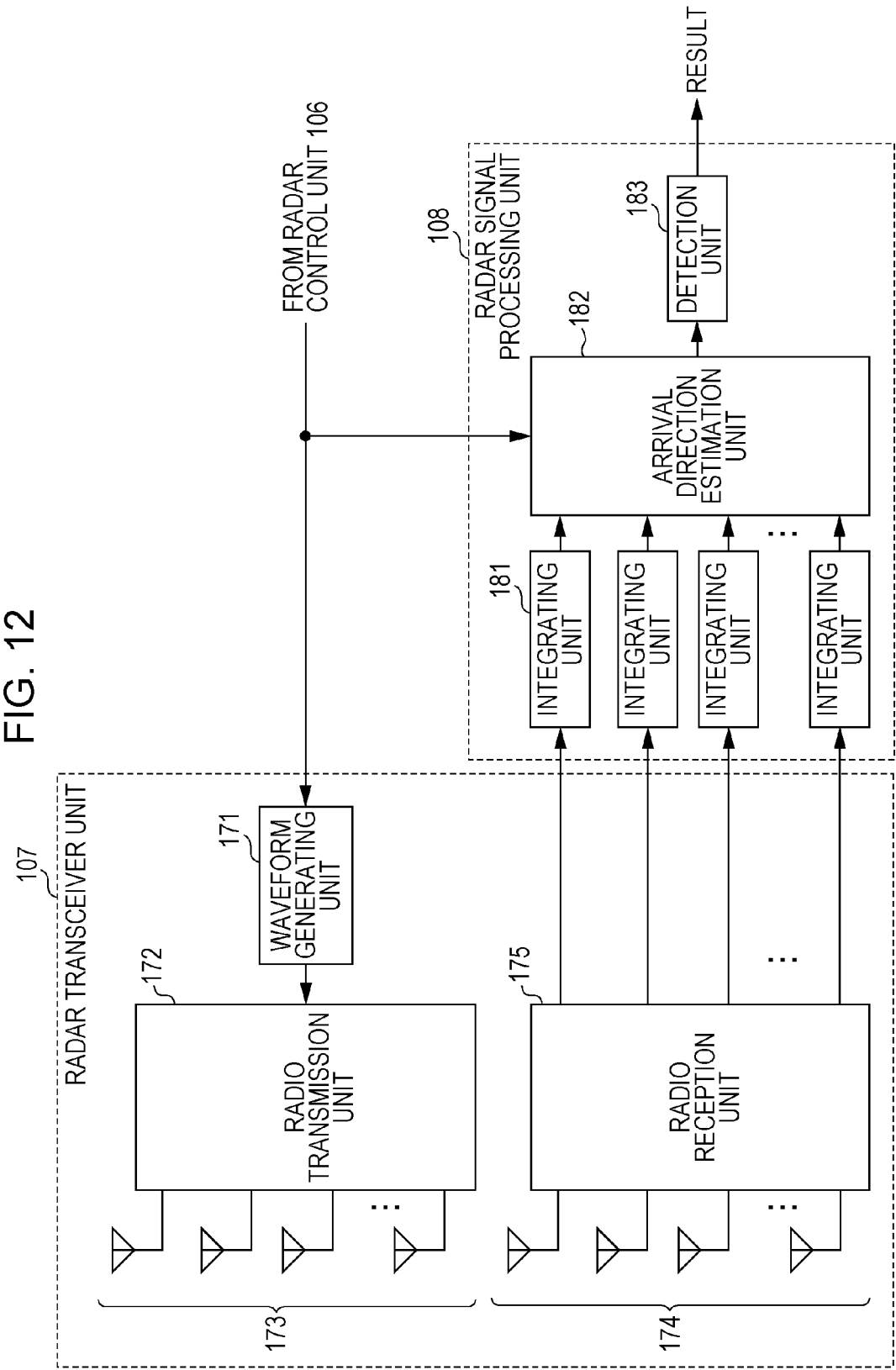
FIG. 12 illustrates internal configurations of a radar transceiver unit and a radar signal processing unit according to Embodiment 2.

FIG. 12 is a block diagram illustrating internal configurations of the radar transceiver unit 107 and the radar signal processing unit 108 in the radar device 100 or the radar device 200 according to the present embodiment.

The radar transceiver unit 107 includes a waveform generating unit 171, a radio transmission unit 172, a transmission array antenna 173, a reception array antenna 174, and a radio reception unit 175. The radar signal processing unit 108 includes integrating units 181, an arrival direction estimation unit 182, and a detection unit 183.

In the present embodiment, it is assumed that a radar device mounted in another vehicle transmits a radar signal in a light ON state of a light 105 (light ON transmission).

Antenna elements (array branches) of the transmission array antenna 173 are arranged in an array at predetermined intervals and radiate a radar signal into a space. The transmission array antenna 173 can form a beam pattern in which a central angle of beam is changed by appropriately controlling phases of the respective antenna elements. For example, a timing at which the central angle is changed (a beam switching timing) is controlled by the timing control unit 103.

Antenna elements of the reception array antenna 174 are arranged in an array at predetermined intervals.

The waveform generating unit 171 generates a waveform whose cycle is shorter than the beam switching timing in the transmission array antenna 173 in accordance with an instruction from a radar control unit 106.

The radio transmission unit 172 supplies, to the antenna elements of the transmission array antenna 173, a radar signal obtained by mixing the waveform supplied from the waveform generating unit 171, for example, with a carrier frequency in a millimeter waveband. Furthermore, the radio transmission unit 172 controls a phase of a carrier frequency of each antenna element of the transmission array antenna 173, for example, in accordance with an instruction from the timing control unit 103. This allows a radar signal to be transmitted in a desired beam pattern.

The reception array antenna 174 receives a reflected wave signal that is the radar signal transmitted from the transmission array antenna 173 and then reflected by a target.

The radio reception unit 175 converts the signal received by the reception array antenna 174 into a baseband signal by amplifying and down-converting the signal in each antenna element.

In the radar signal processing unit 108, the integrating units 181 are provided corresponding to the respective antenna elements of the reception array antenna 174. The integrating units 181 perform an integration process on the baseband signal supplied from the radio reception unit 175. This increases a signal-to-noise power ratio (SNR). For example, the integrating units 181 perform, as the integration process, Doppler integration considering a Doppler frequency fluctuation caused by movement of a target. The integrating units 181 supply an integration result to the arrival direction estimation unit 182.

The arrival direction estimation unit 182 obtains array gain by multiplying the integration result supplied from the integrating units 181 by an array vector corresponding to the central angle of the transmission beam and thus estimates an arrival direction (Direction of Arrival Estimation: DOA). The arrival direction estimation unit 182 supplies an arrival direction estimation result to the detection unit 183.

The detection unit 183 detects a target on the basis of characteristics such as a reception level (not illustrated) of the radar signal, the arrival direction estimation result (estimated angle) supplied from the arrival direction estimation unit 182, a trajectory of a fluctuation of the estimated angle, or the like. A detection result obtained by the detection unit 183 is, for example, displayed on a monitor or supplied to a control unit that controls a brake and the like.

FIG. 13A illustrates an example of a beam pattern of the transmission array antenna 173 according to the present embodiment. FIG. 13B illustrates a relationship between a beam switching timing and a light ON timing according to the present embodiment.

In FIG. 13A, a beam pattern having central angles (1) through (8) in eight directions is formed.

It is assumed that a central angle of beam is repeatedly switched, for example, in the order of (1), (2), (3), . . . , (7), (8), (1), (2), (3), . . . , as illustrated in FIG. 13B. It is also assumed that 1 cycle in which the central angle of beam is sequentially switched from (1) to (8) is 1 beam scan.

In a case where a light ON period of the light 105 and a period of the beam scan are synchronized with each other, interference with a radar signal from another vehicle does not occur throughout all of the angles of the detection area. That is, in the example of FIG. 13B, the light 105 is on during two beam scans, and the light 105 is off during a succeeding predetermined period. In the example of FIG. 13B, the light 105 is on again during next two beam scans in a period in which interference with the other vehicle does not occur.

By thus causing a multiple number (two in FIG. 13B) of a cycle of beam scan (period of 1 beam scan) and a period in which the light 105 is on (light ON period) to match each other, it is possible to prevent or suppress interference as described in Embodiment 1.

Figure 14:
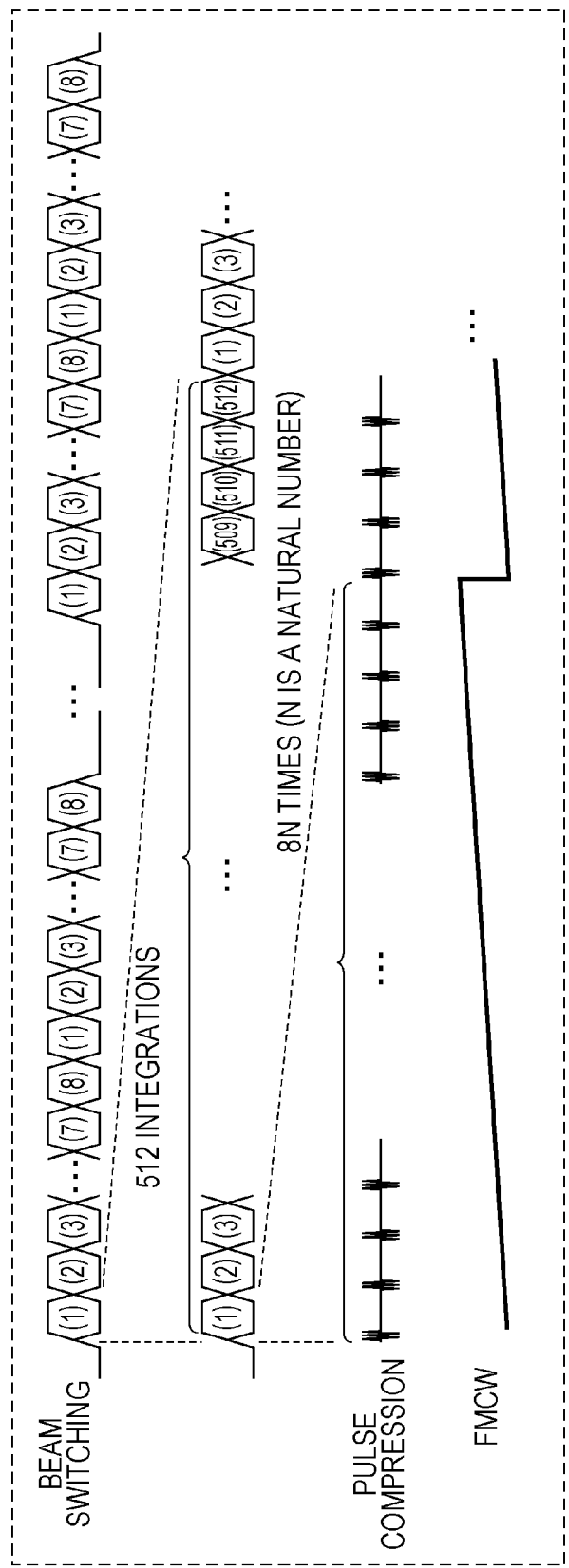
FIG. 14 illustrates a case where a pulse compression type or an FMCW type is used as a radar type in Embodiment 2.

FIG. 14 is a concept diagram illustrating a case where a pulse compression type or an FMCW (Frequency Modulated Continuous Wave) type is used as a radar type.

In the pulse compression type, a waveform is transmitted plural times from the waveform generating unit 171 while the central angle of beam is unchanged. In the pulse compression type, for example, a pulse sequence having a constant code length is transmitted as the waveform, and correlation is obtained on the reception side by using a code pattern same as that on the transmission side. This obtains coding gain. It is therefore possible to detect a target that is remote or a target that has small reflectivity.

Furthermore, in the pulse compression type, a pulse sequence having a constant code length is transmitted plural times, and a result of correlation among the pulse sequences is Doppler-integrated. This can further improve a signal-to-noise ratio. Furthermore, in the pulse compression type, the amount of Doppler frequency fluctuation that accompanies movement of a target is also obtained. This makes it easy for the radar device 100 to detect a target that is moving at a different speed relative to the host vehicle. Furthermore, it becomes easy to separate a plurality of targets that are close to each other and markedly different from each other in terms of reflectivity by using, as the pulse sequence, a complementary code that is expected to sufficiently suppress the level of surrounding regions (side lobe) of a peak level obtained after the correlation processing. For example, use of the complementary code makes it easy for the radar device 100 to detect a person whose reflectivity is low in the vicinity of a vehicle whose reflectivity is high.

Of all complementary codes, use of a Spano code makes it possible to keep a side lobe suppression ratio large even in a case where a relative speed is high. For example, a Spano code may be transmitted in a unit of eight times in order to offset a remaining component of side lobe that occurs due to phase rotation that accompanies a Doppler fluctuation. For example, as illustrated in FIG. 14, simple addition (coherent addition) is performed on the reception side until 8× N (N is a natural number) times is reached, and a result of addition is Doppler-integrated. This obtains a side lobe suppression effect while reducing the amount of computation. For example, as illustrated in FIG. 14, in a case where Doppler integration is performed 512 times, a pulse sequence is transmitted 8×N×512 times in the beam directions (1) through (8). Note that in a case where Fast Fourier Transform (FFT) is used as a computation method of Doppler integration while limiting the number of integrations to the power of 2, it is possible to reduce the amount of computation.

In the present embodiment, the FMCW type is also applicable as the radar type instead of the pulse compression type. In the FMCW type, a carrier frequency is periodically swept linearly at a constant rate in a predetermined frequency range. In principle, it is only necessary to give a triangle wave to a VCO (Voltage Controlled Oscillator) that outputs a carrier wave.

FIG. 14 illustrates a case where a so-called high-speed chirp type, which makes it easy to separate and detect a plurality of targets, is used as the FMCW type. As illustrated in FIG. 14, in the FMCW type, the level of a signal that is input as a voltage of a VCO linearly increases at a constant rate, and this is periodically repeated. As for processes on the reception side in the high-speed chirp type, it is assumed that an FFT process for distance extraction is performed, and then an FFT process for Doppler fluctuation extraction is performed. For example, on the reception side, the FFT process for distance extraction is performed on a sweep cycle, and then the FFT process for Doppler fluctuation extraction is performed in, for example, 512 integration periods.

Furthermore, in the present embodiment, as illustrated in FIG. 15A, a region to be detected may be made up of a plurality of sectors (two sectors in FIG. 15A) to provide a radar device that detects a wide region (e.g., 90 degrees or more).

For example, the radar device 100 includes a plurality of radar transceiver units 107 described above. For example, in FIG. 15A, the radar device 100 includes a radar transceiver unit 107 that realizes a beam pattern (1) through (8) and a radar transceiver unit 107 that realizes a beam pattern (a) through (h). As illustrated in FIG. 15B, the radar device 100 concurrently transmits radar signals in the respective two sectors. In FIG. 15B, the radar device 100 concurrently forms (1) and (a) of the beam patterns and transmit radar signals in (1) and (a) of the beam patterns, and then concurrently forms (2) and (b) of the beam patterns and transmit radar signals in (2) and (b) of the beam patterns. A similar process is also performed on (3) through (8) and (c) through (h) of the beam patterns.

In this case, for example, in a case where different frequency channels are used in the respective sectors, interference between the sectors does not occur, but frequency use efficiency decreases. In view of this, in a case where the same frequency channel is used in the sectors, for example, a local signal common to the sectors is used in order to suppress interference between the sectors. Furthermore, timing synchronization that is approximate to a beam scan unit is established. For example, in a case where the beam scan unit is 50 msec, a synchronization securing period of approximately 1 μsec is set so that timing synchronization between the sectors is established. By superimposing different orthogonal codes to make codes in the sectors orthogonal to each other, interference between the sectors is reduced. However, in general, a configuration taking impedance matching of branch lines, and the like into consideration is needed to use a high-frequency local signal common to the sectors. This poses a large restriction on packaging. In view of this, local signals in the sections may be synchronized with each other by using a common source oscillation input signal to a PLL or the like instead of using a common local signal. However, this raises a concern that the effect of making codes orthogonal to each other deteriorates depending on the accuracy of synchronization and thereby interference becomes large.

In a case where local signals in the sectors are not synchronized with each other, a method of slightly shifting pulse repetition cycles in the sectors from each other can be employed. Since integration periods in the sectors are different from each other, a signal from the other sector behaves like white noise in each sector. This merely causes a deterioration in signal-to-noise ratio without generating interference in a specific distance or the like after integration. It is therefore possible to suppress an influence on detection performance. The pulse repetition cycles need be set equal to or longer than a round-trip period of a reflected wave that corresponds to a distance to a target to be detected. However, if the pulse repetition cycles are made too large, a radar detection cycle becomes long. It is therefore necessary to properly set the pulse repetition cycles. For example, a difference between the pulse repetition cycles in the sectors is not made large, and is preferably set to approximately 1% for example.

If no measure is taken in a case where the pulse repetition cycles in the sectors are different from each other, beam scan cycles in the sectors differ from each other, and detection timings are not synchronized with each other. This complicates subsequent processes. In view of this, in order to synchronize a sector whose pulse repetition cycle is short and a sector whose pulse repetition cycle is long, a standby period may be set in the sector whose pulse repetition cycle is short so that the sector whose pulse repetition cycle is short suspends a next beam scan until a beam scan in the sector whose pulse repetition cycle is long is completed. Similarly, as for an ON timing of the light 105, the sector whose pulse repetition cycle is short may suspend turning on the light 105 until a beam scan in the sector whose pulse repetition cycle is long is completed.

Embodiment 3

In the present embodiment, it is assumed that there are two vehicles that can interfere with each other in a case where a light ON timing of a light of a vehicle and a transmission timing of a radar signal are synchronized with each other as in Embodiment 1. The following describes a case where another vehicle (the third vehicle) starts transmission of a radar signal under a situation in which the two vehicles share a frequency in a time-division manner and there is no spare time.

In a case where there is a spare channel other than a frequency channel occupied by the two vehicles that have been transmitting a radar signal before the third vehicle starts transmission of a radar signal, the third vehicle can transmit a radar signal without interference by using the spare channel. However, in a case where there is no spare channel, interference occurs when the third vehicle transmits a radar signal by using the frequency channel occupied by the two vehicles that have been transmitting a radar signals.

In order for the third vehicle to transmit a radar signal without interference, a ratio of periods used by the two vehicles (1/2 for each vehicle) need be changed to 1/3 for each vehicle.

In the present embodiment, a method in which the third vehicle that tries to newly transmit a radar signal requests the two vehicles that have been transmitting a radar signal to change a ratio of used periods is described.

Specifically, the vehicle that requests a change of the ratio of periods transmits request information (i.e., information for preventing interference) by modulating a light ON timing of a light thereof. This makes it possible to transmit the request at low cost since it is unnecessary to add a communication device or the like for transmitting the request.

That is, in the present embodiment, the vehicle that requests a change of the ratio of periods prompts the other surrounding vehicles to transmit a radar signal at a timing that does not cause interference by modulating the light ON timing of the light thereof, and thus the same frequency channel is shared by the plurality of vehicles so that the frequency is effectively used.

Figure 16:
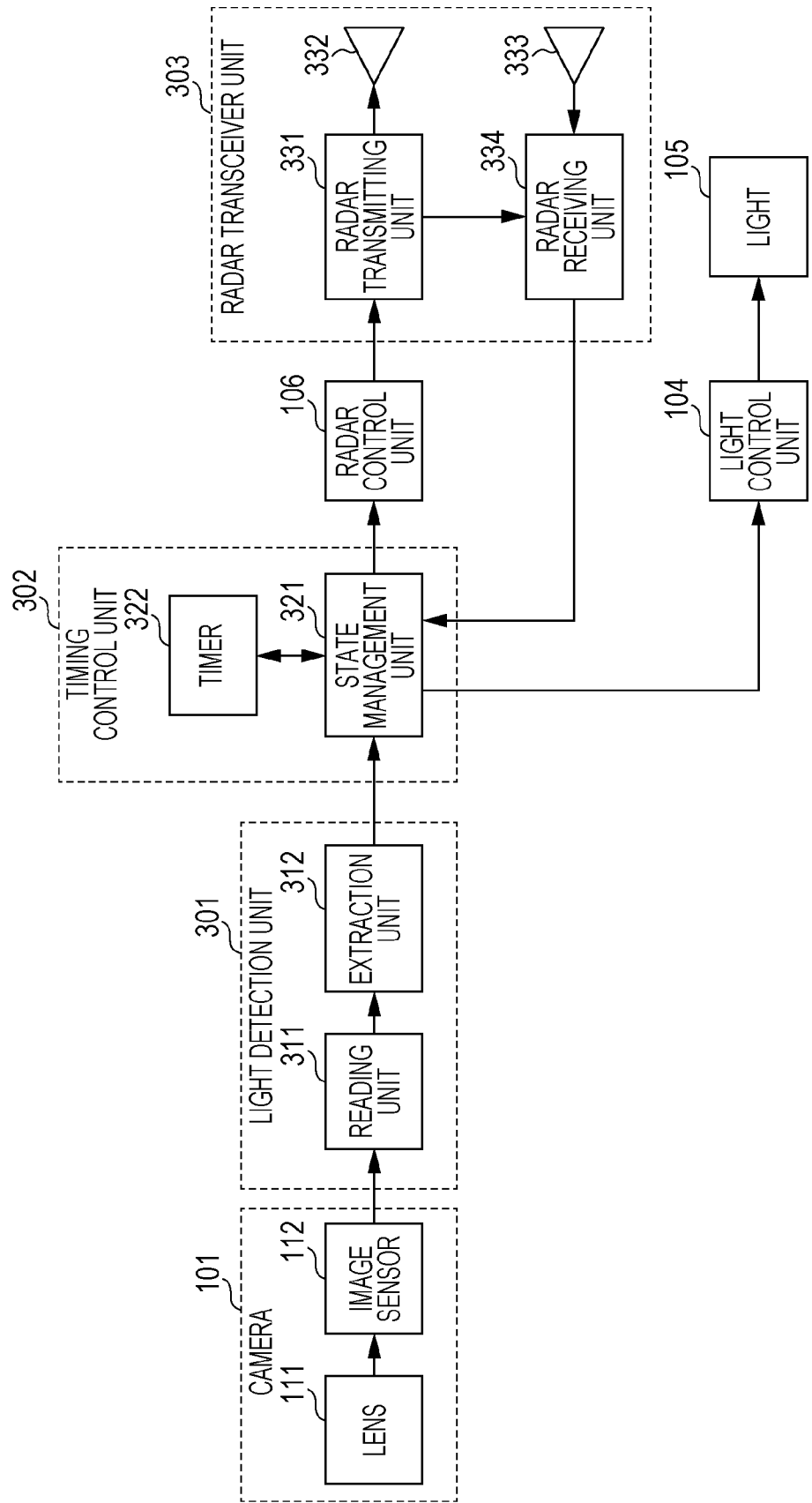
FIG. 16 illustrates a configuration of a radar device according to Embodiment 3.

FIG. 16 is a block diagram illustrating a configuration of a radar device 300 according to the present embodiment. In FIG. 16, constituent elements that are similar to those in Embodiment 1 (FIG. 1 or 7) are given identical reference signs, and description thereof is omitted.

The radar device 300 illustrated in FIG. 16 includes a camera 101, a light detection unit 301, a timing control unit 302, a light control unit 104, a light 105, a radar control unit 106, and a radar transceiver unit 303. Note that the radar device 300 illustrated in FIG. 16 may include the radar signal processing unit 108 illustrated in FIG. 1.

The camera 101 includes a lens 111 and an image sensor 112. The image sensor 112 captures an image via the lens 111.

The light detection unit 301 includes a reading unit 311 and an extraction unit 312.

The reading unit 311 reads information from the image supplied from the image sensor 112. For example, a method for reading information at a rate higher than a moving image capturing rate (frame rate) of a camera by dividing an image captured by an image sensor into blocks and then reading information sent from a light source such as an LED has been proposed (see, for example, Panasonic Corporation, Dec. 11, 2014, press release, "Panasonic Develops "Optical ID" Technology Available on Smartphone", Internet (URL: http://news.panasonic.com/press/news/data/2014/12/jn141211-2/jn141211-2.html). In this method, a signal (e.g., an LED signal) that has been modulated at a rate higher than a moving image capturing rate (frame rate) of the camera 101 is transmitted from the radar device 300 of another vehicle by ON/OFF of the light 105. Then, the reading unit 311 reads an image of 1 frame on a block basis, and then supplies the image to the extraction unit 312. This allows the radar device 300 to extract information that has been modulated at a rate higher than the frame rate. Furthermore, it is possible to shorten a standby time that is needed before switching transmission of a radar signal among a plurality of vehicles. It is therefore possible to prevent a decrease in radar detection performance.

The extraction unit 312 extracts information transmitted by the other vehicle from the image supplied from the reading unit 311 on the basis of a difference in brightness in a region corresponding to the light 105 of the other vehicle (i.e., a light ON/OFF pattern of the light 105). This information includes request information for requesting a change of a ratio of periods in which a frequency channel is used and a light detection result (ON or OFF of the light 105).

The timing control unit 302 includes a state management unit 321 and a timer 322.

The state management unit 321 controls a light ON timing of the light 105 and a transmission timing of a radar signal on the basis of the information supplied from the extraction unit 312 (i.e., the request information and the light detection result of the other vehicle) and information supplied from the radar transceiver unit 303 (i.e., a radar signal detection result (a transmission timing of a radar signal) of the other vehicle).

For example, the state management unit 321 instructs the light control unit 104 to use a light ON/OFF pattern corresponding to request information in a case where the host vehicle requests synchronization with a frequency channel shared by a plurality of other vehicles. In this case, the state management unit 321 may determine not to transmit a radar signal for a certain period. For example, the state management unit 321 instructs the timer 322 to measure the certain period and suspends transmission of a radar signal until the certain period ends. The state management unit 321 may instruct the light control unit 104 to use a light ON/OFF pattern corresponding to notification information for notifying surrounding vehicles of suspension of transmission of a radar signal in order to notify the surrounding vehicles that a radar signal is not transmitted for the certain period.

Furthermore, the state management unit 321 determines whether or not the plurality of other vehicles that share the frequency channel are actually transmitting a radar signal by monitoring a state of occupation of the frequency channel by using a reception level supplied from a radar receiving unit 334 that will be described later. For example, in a case where it is determined as a result of monitoring that a certain other vehicle is not transmitting a radar signal, the state management unit 321 determines that the other vehicle has moved away from the host vehicle (to a position where interference does not occur). In this case, the state management unit 321 changes a ratio of periods used by the respective vehicles that share the frequency channel excluding the other vehicle that has moved away from the host vehicle.

The timer 322 starts measurement of the certain period in accordance with an instruction from the state management unit 321 and notifies the state management unit 321 of the end of the certain period when the certain period ends.

The radar transceiver unit 303 includes a radar transmitting unit 331, a transmission antenna 332, a reception antenna 333, and the radar receiving unit 334.

The radar transmitting unit 331 generates a radar signal in accordance with an instruction from the radar control unit 106 and transmits the radar signal via the transmission antenna 332.

The radar receiving unit 334 receives a reflected wave signal that is the radar signal reflected by a target and then received via the reception antenna 333 and then performs a reception process on the reflected wave signal. The radar receiving unit 334 supplies a reception level of the received reflected wave signal to the state management unit 321.

Next, an operation of the radar device 300 according to the present embodiment is described in detail below. The following describes cases 1 through 3 assumed in vehicles A, B, and C described above. In the following description, it is assumed that the radar device 300 is mounted in each of the vehicles A, B, and C.

Case 1

Figure 17:
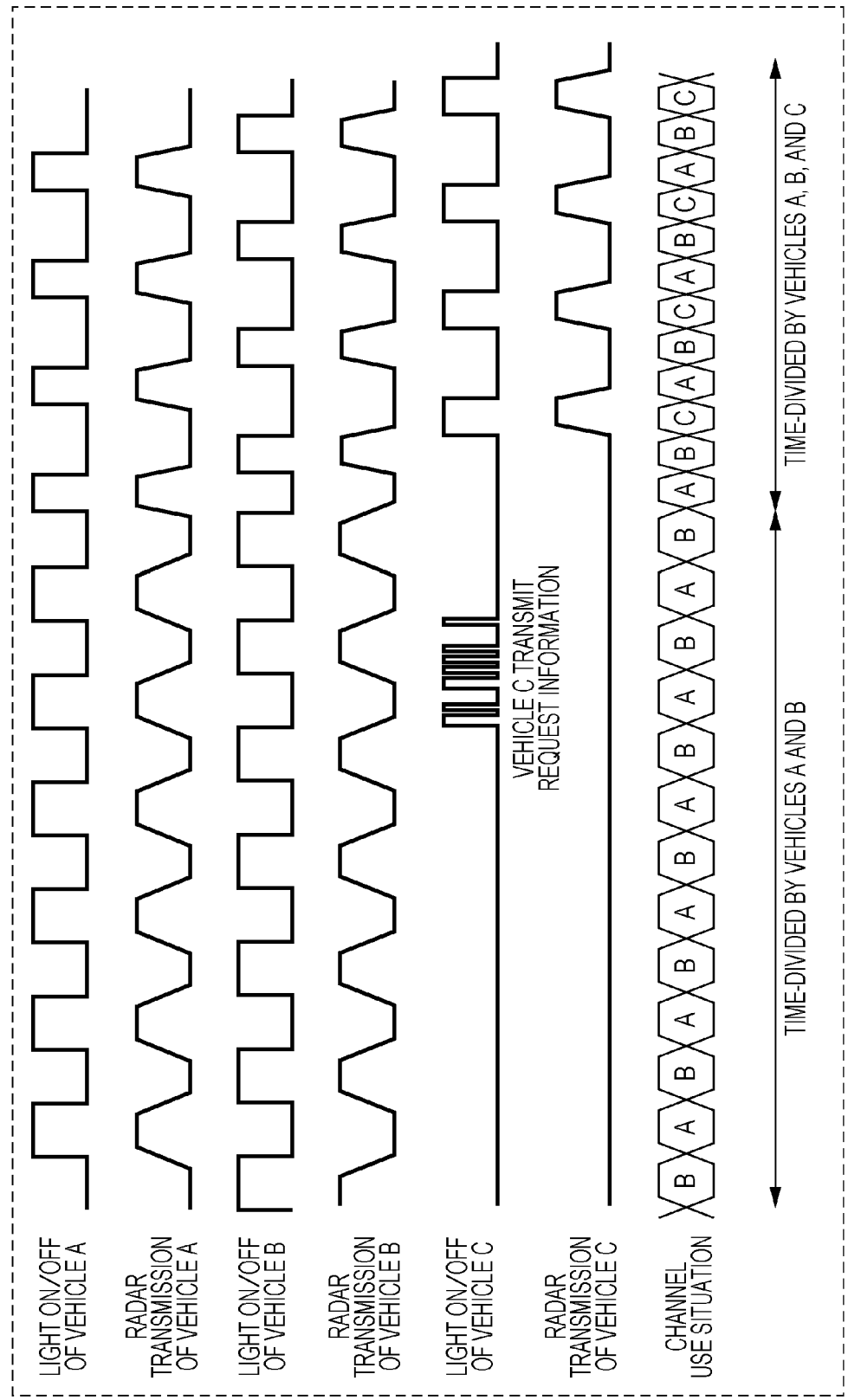
FIG. 17 illustrates beam switching timings and light ON timings of lights in three vehicles according to Embodiment 3.

FIG. 17 illustrates a case where under a situation in which the two vehicle A and B are already transmitting a radar signal so that a period used by each vehicle is 1/2, the vehicle C (the third vehicle) newly transmits a radar signal and, as a result, these three vehicles transmit a radar signal in a time-division manner.

That is, the vehicles A and B occupy a channel in a time-division manner until the vehicle C transmits request information for requesting transmission of a radar signal. A ratio of a radar transmission period and a radar suspension period in each of the vehicles A and B is 1:1 while the channel is time-divided by the vehicles A and B.

The vehicle C notifies the vehicles A and B that have been already transmitting a radar signal about request information requesting a change of the ratio of periods before transmitting a radar signal. The vehicles A and B are notified of the request information by a light ON/OFF pattern of the light 105 of the vehicle C as illustrated in FIG. 17. For example, the vehicle C transmits the request information when activating an engine.

When the vehicles A and B detect ON/OFF of the light 105 of the vehicle C and read the request information, the vehicles A and B control light ON timings of the lights 105 and transmission timings of radar signals so that the channel is used by the vehicles A, B, and C in a time-division manner. That is, the vehicles A and B shorten respective radar signal transmission periods from 1/2 to 1/3 of a cycle of use of the frequency channel and prolong respective radar signal transmission suspension periods from 1/2 to 2/3 of the cycle.

Then, in accordance with the changed ratio of periods, the vehicle C transmits a radar signal in a period (time slot) in which the vehicles A and B are not transmitting a radar signal. A period in which the vehicle C transmits a radar signal may be determined, for example, in accordance with the operation described in Modification 2 or 3 of Embodiment 1.

As a result, in a period in which the vehicles A, B, and C time-divides the channel, a ratio of a radar transmission period and a radar transmission suspension period in each of the vehicles A, B, and C is 1:2. That is, any one of a plurality of periods obtained by dividing a cycle T1 for turning on the light 105 and transmitting a radar signal by the number of vehicles that can interfere with each other is set as a transmission period of a radar signal of each vehicle.

Case 2

Figure 18:
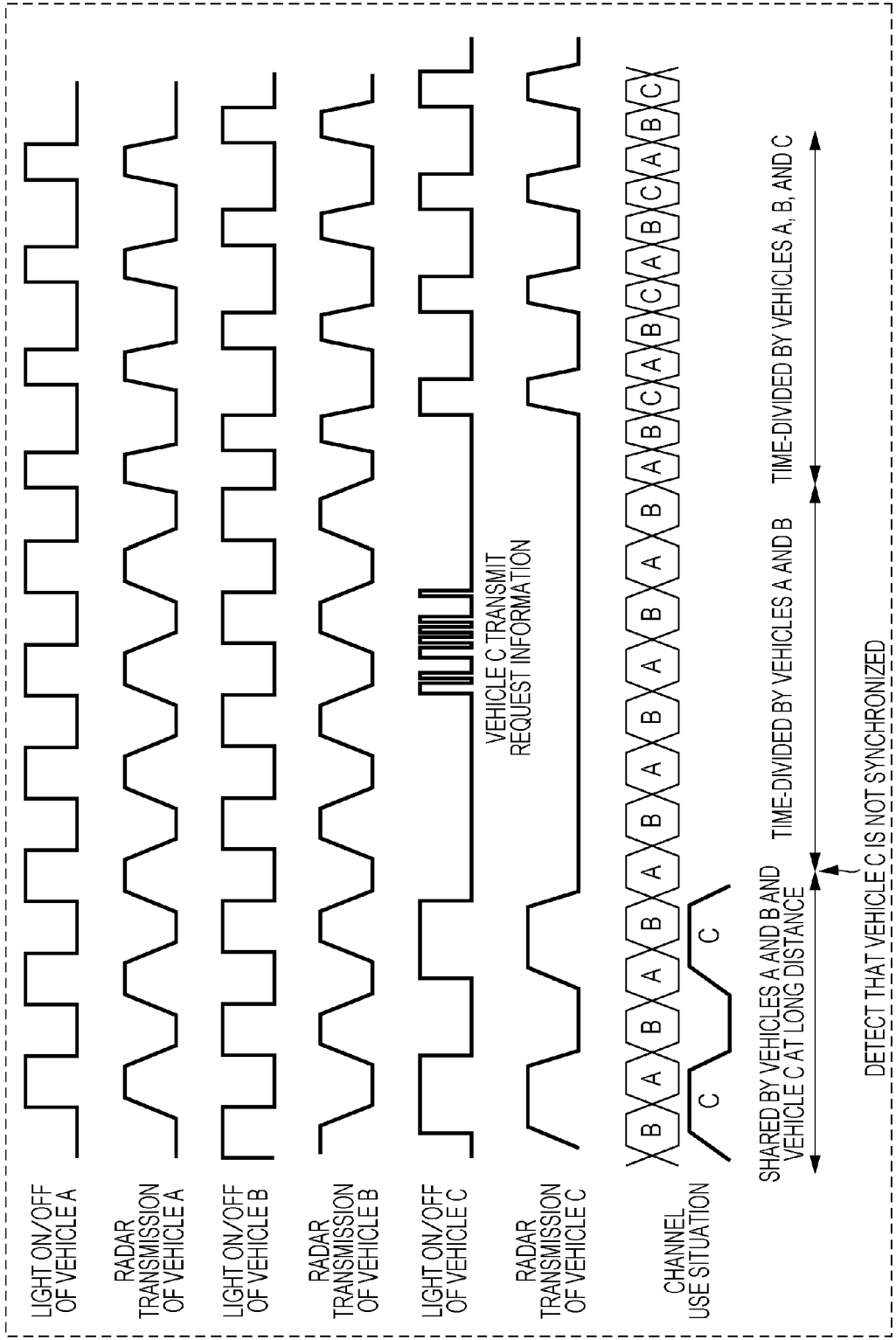
FIG. 18 illustrates beam switching timings and light ON timings of lights in three vehicles according to Embodiment 3.

FIG. 18 illustrates a case where the vehicle C that is positioned away from the vehicles A and B so as not to interfere with the vehicles A and B and that is already transmitting a radar signal approaches the vehicles A and B that are also already transmitting a radar signal.

In this case, first, the vehicle C is transmitting a radar signal without synchronization with transmission timings of radar signals of the vehicles A and B as illustrated in FIG. 18.

When the vehicle C approaches the vehicle A or the vehicle B, the vehicle C detects that a transmission timing of a radar signal of the vehicle C is not synchronized with transmission timings of radar signals of the vehicles A and the vehicle B by capturing a state (ON or OFF) of the light 105 of the vehicle A or the vehicle B by using the camera 101.

Note that in a case where the vehicle C approaches the vehicle A or the vehicle B, the vehicle A and the vehicle B also detect that a transmission timing of a radar signal of the vehicle C is not synchronized with transmission timings of radar signals of the vehicle A and the vehicle B by capturing a state (ON or OFF) of the light 105 of the vehicle C by using the camera 101. At this point in time, it is determined that a ratio of a light ON time of each of the vehicles A and B in one (1) cycle is shorter than that of a light ON time of the vehicle C in one (1) cycle and that a channel is already shared by the vehicles A and B. In this case, the vehicle C whose ratio of a light ON time is longer and does not share the channel operates so as to establish synchronization with the vehicles A and B.

That is, the vehicle C notifies the vehicles A and B of request information requesting a change of the ratio of periods so as to establish synchronization with the vehicles A and B. The vehicles A and B are notified of the request information by a light ON/OFF pattern of the light 105 of the vehicle C as illustrated in FIG. 18.

When the vehicles A and B detect ON/OFF of the light 105 of the vehicle C and read the request information, the vehicles A and B control light ON timings of the lights 105 and transmission timings of radar signals so that the channel is used by the vehicles A, B, and C in a time-division manner. That is, the vehicles A and B shorten respective radar signal transmission periods from 1/2 to 1/3 of a cycle of use of the frequency channel and prolong respective radar signal transmission suspension periods from 1/2 to 2/3 of the cycle.

Then, in accordance with the changed ratio of periods, the vehicle C transmits a radar signal in a period (time slot) in which the vehicles A and B are not transmitting a radar signal. A period in which the vehicle C transmits a radar signal may be determined, for example, in accordance with the operation described in Modification 2 or 3 of Embodiment 1.

As a result, in a period in which the vehicles A, B, and C time-divides the channel, a ratio of a radar transmission period and a radar transmission suspension period in each of the vehicles A, B, and C is 1:2.

Case 3

In Case 3, a case where the vehicle C moves away from the vehicles A and B is described. That is, a case where the vehicle C moves away from the vehicles A and B in a state where a channel is time-divided (divided into three sections)

and shared by the vehicles A, B, and C as in Case 1 (FIG. 17) and Case 2 (FIG. 18) is described.

In a case where ON/OFF of the light 105 of the vehicle C is not recognized by the vehicle A and the vehicle B, the vehicle C is away from the vehicle A and the vehicle B, and therefore no interference occurs even in a case where the vehicle A and the vehicle B transmit a radar signal so that a period used by each vehicle is 1/2 (i.e., the channel is time-divided by the vehicle A and the vehicle B.

However, in a case where the vehicle A and the vehicle B cannot share the failure to recognize ON/OFF of the light 105 of the vehicle C, it cannot be determined that the vehicle C is away from the vehicle A and the vehicle B.

In view of this, in a case where the vehicle C is moving away from the vehicle A and the vehicle B and it is determined, as a result of analysis of an image captured by the camera, that the sizes of the vehicle A and the vehicle B are equal to or smaller than a certain size, the vehicle C notifies the vehicle A and the vehicle B of desynchronization request information by using a light ON/OFF pattern of the light 105. Upon extraction of the desynchronization request information, the vehicle A and the vehicle B are controlled so that the frequency channel is time-divided by the vehicle A and the vehicle B. As a result, in a period in which the channel is time-divided, a ratio of a radar transmission period and a radar transmission suspension period in each of the vehicles A and B is 1:1.

Note that the vehicle A and the vehicle B are notified of the desynchronization request information by the vehicle C at a timing at which a distance between the vehicle C and the vehicles A and B becomes sufficiently large. Accordingly, there is a possibility that the vehicles A and B cannot recognize ON/OFF of the light 105 of the vehicle C. In view of this, for example, the radar device 300 (see FIG. 16) of each vehicle may monitor whether or not the frequency channel is being used in all periods by performing a radar reception process not only in a transmission period of a radar signal of the host vehicle, but also in transmission periods of radar signals of the other vehicles.

Specifically, in the radar device 300 illustrated in FIG. 16, the radar receiving unit 334 performs a radar reception process in a target frequency channel, and the state management unit 321 monitors a reception level at a timing at which the host vehicle is not transmitting a radar signal. For example, the state management unit 321 of each of the vehicles A and B determines that the vehicle C is sufficiently far from the vehicle A and the vehicle B and does not interfere with the vehicle A and the vehicle B in a case where the reception level at a transmission timing of a radar signal of the vehicle C is less than a predetermined threshold value. In this case, the state management unit 321 of each of the vehicles A and B prolongs a light ON period of the light 105 and a transmission period of a radar signal so that the frequency channel is occupied by the vehicle A and the vehicle B only.

As described above, according to the present embodiment, even in a case where the number of vehicles that can interfere with each other changes, it is possible to properly set a period allocated to each of a plurality of vehicles that share a frequency channel.

Modification

Figure 19:
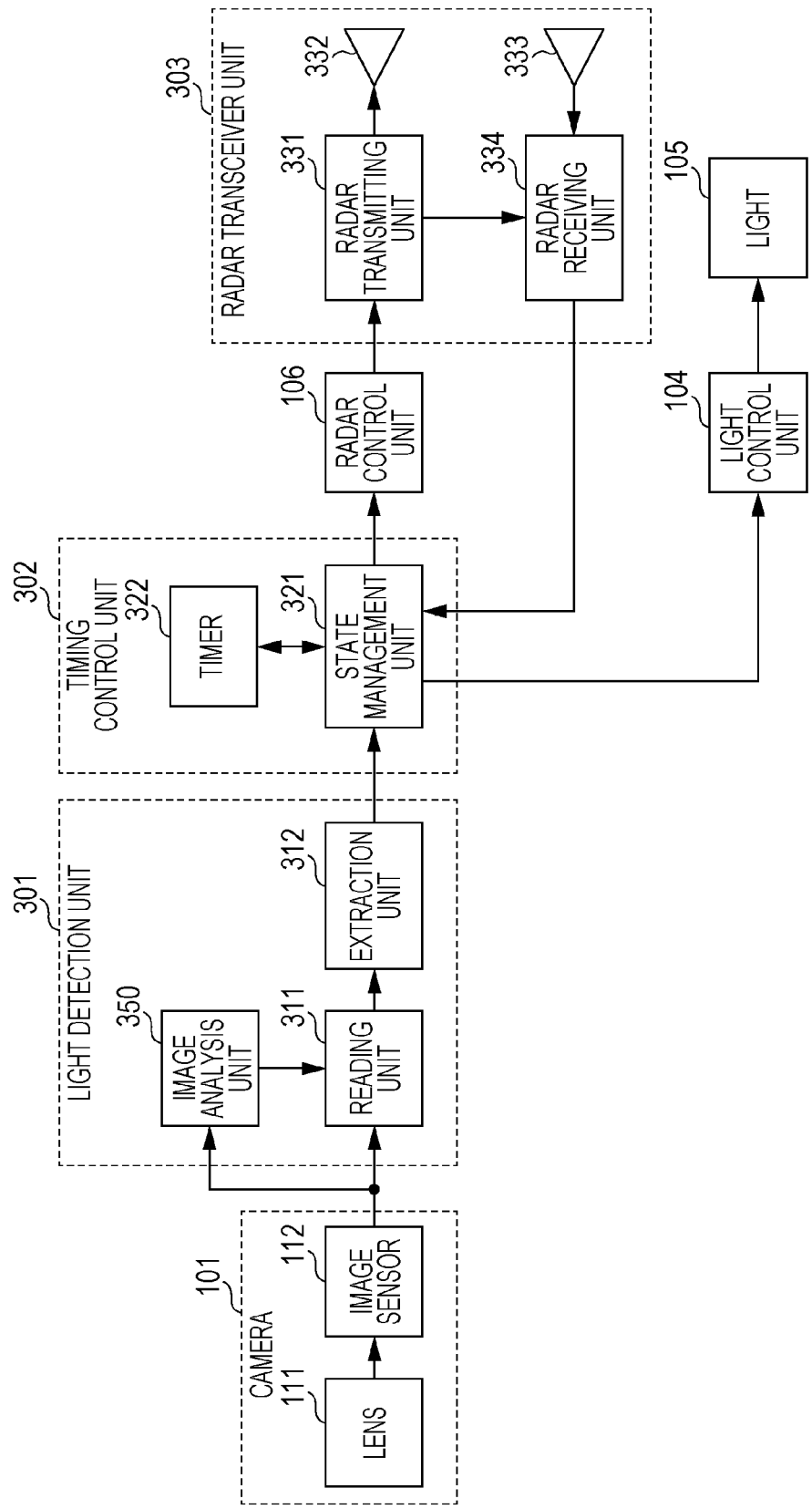
FIG. 19 illustrates a configuration of a radar device according to Modification of Embodiment 3.

FIG. 19 is a block diagram illustrating a configuration of a radar device 300a according to Modification of the present embodiment. In FIG. 19, constituent elements that are similar to those in FIG. 16 are given identical reference signs, and description thereof is omitted.

Specifically, a light detection unit 301 of the radar device 300a illustrated in FIG. 19 additionally includes an image analysis unit 350.

The image analysis unit 350 cuts out a region in which a light 105 of another vehicle is present from an image captured by an image sensor 112 and then supplies the image of the region thus cut out to a reading unit 311.

That is, the reading unit 311 of the radar device 300a reads an image of only a region including the light 105 of the other vehicle on a block basis, and then an extraction unit 312 extracts information.

This makes it possible to precisely grasp a state of the light 105 by extracting information from the region of the light 105 of the other vehicle even in a case where it is difficult to grasp the state of the light 105 of the other vehicle, for example, because the other vehicle is remote from the host vehicle and appears only in a portion of the image.

It is assumed here that light ON/OFF patterns of a plurality of lights 105 (e.g., LEDs) mounted in the same vehicle are synchronized with each other. Accordingly, in a case where a plurality of lights are present in the image, the image analysis unit 350 determines whether or not the plurality of lights belong to the same vehicle on the basis of the light ON/OFF patterns. In a case where the plurality of lights belong to the same vehicle, the image analysis unit 350 performs a process assuming that the image analysis unit 350 is notified of the same information. For example, it is also possible to increase the accuracy of extracted information by performing an averaging process or the like on images of the plurality of lights belonging to the same vehicle after the reading unit 311 individually reads the images of the regions of the lights. In a case where the plurality of lights in the image do not belong to the same vehicle, the radar device 300a need just extract information of each vehicle and control a transmission timing of a radar signal in accordance with the longest radar signal transmission suspension period so that interference does not occur.

Embodiment 4

In the present embodiment, a scene in which a plurality of vehicles are closely spaced (e.g., a parking lot) is described.

A basic configuration of a radar device according to the present embodiment is identical to that of the radar device 300 according to Embodiment 3, and is therefore described with reference to FIG. 16.

Figure 20:
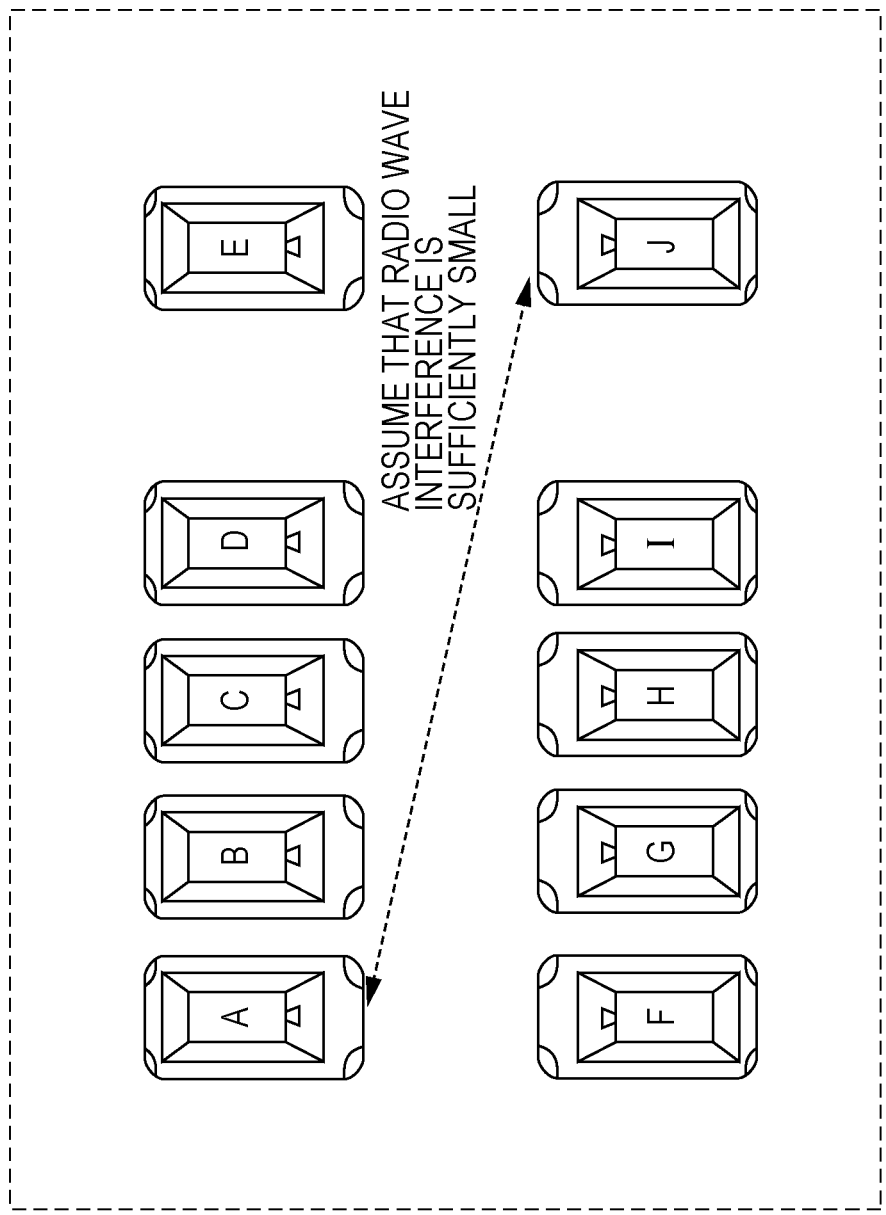
FIG. 20 illustrates a situation in which vehicles are closely spaced.

FIG. 20 illustrates a state where ten vehicles A through J are closely spaced as an example of a scene assumed in the present embodiment.

For example, in FIG. 20, it is assumed that the vehicle A and the vehicle J, which are located at both ends, do not interfere with each other even if the vehicle A and the vehicle J use the same frequency channel at the same timing because the vehicle A and the vehicle J are remote from each other.

According to the method described in Embodiment 3, synchronization is sequentially established among a plurality of vehicles by cameras 101 and lights 105 mounted in the respective vehicles irrespective of whether or not interference actually occurs. Even if the vehicle A and the vehicle J are in a positional relationship such that the camera 101 of each of the vehicles A and J cannot recognize ON/OFF of the light 105 of the other vehicle, a vehicle (e.g., the vehicle C or the vehicle H) that is present between the vehicle A and the vehicle J can recognize the vehicle A and the vehicle J. Accordingly, synchronization is also established between the vehicle A and the vehicle J via the vehicle such as the vehicle C or the vehicle H. As a result, each of the vehicles A through J transmits a radar signal during 1/10 of a cycle so that the vehicles A through J do not interfere with each other.

As described above, even in a case where the vehicle A and the vehicle J are in a positional relationship such that the vehicle A and the vehicle J do not interfere with each other, the vehicles including the vehicle A and the vehicle J share the frequency channel. This causes a decrease in frequency use efficiency.

For example, in a large-scale parking lot in which approximately one thousand vehicles are present, a period in which each of the vehicles can transmit a radar signal is 1/1000 . This makes a radar detection cycle long. It is therefore impossible to achieve sufficient performance. This is because even vehicles that are sufficiently remote from each other and do not interfere with each other are synchronized with each other.

As described in Embodiment 3 (Case 3), it is possible to employ a method in which each vehicle monitors other vehicles' use of a frequency channel, and in a case where it is determined that there is a timing at which the frequency channel is not used, light ON periods (transmission periods of radar signals) of lights of vehicles other than a vehicle corresponding to this timing are prolonged by excluding a period allocated to the vehicle corresponding to this timing. However, in this case, the vehicle whose allocated period has been excluded transmits request information requesting a change of period allocation again. As a result, a state of transmission of a radar signal is always unstable.

In view of this, in the present embodiment, the radar device 300 that tries to transmit a radar signal logically checks whether or not a surrounding vehicle is transmitting a radar signal without synchronization with the surrounding vehicle and transmits a radar signal from the host vehicle at a timing at which the surrounding vehicle is not transmitting a radar signal. In other words, control such as carrier sense often used in a radio communication field is realized by using ON/OFF of a light and a camera of a vehicle.

Specific control methods (Methods 1 through 3) in the present embodiment are described below.

Method 1

Figure 21:
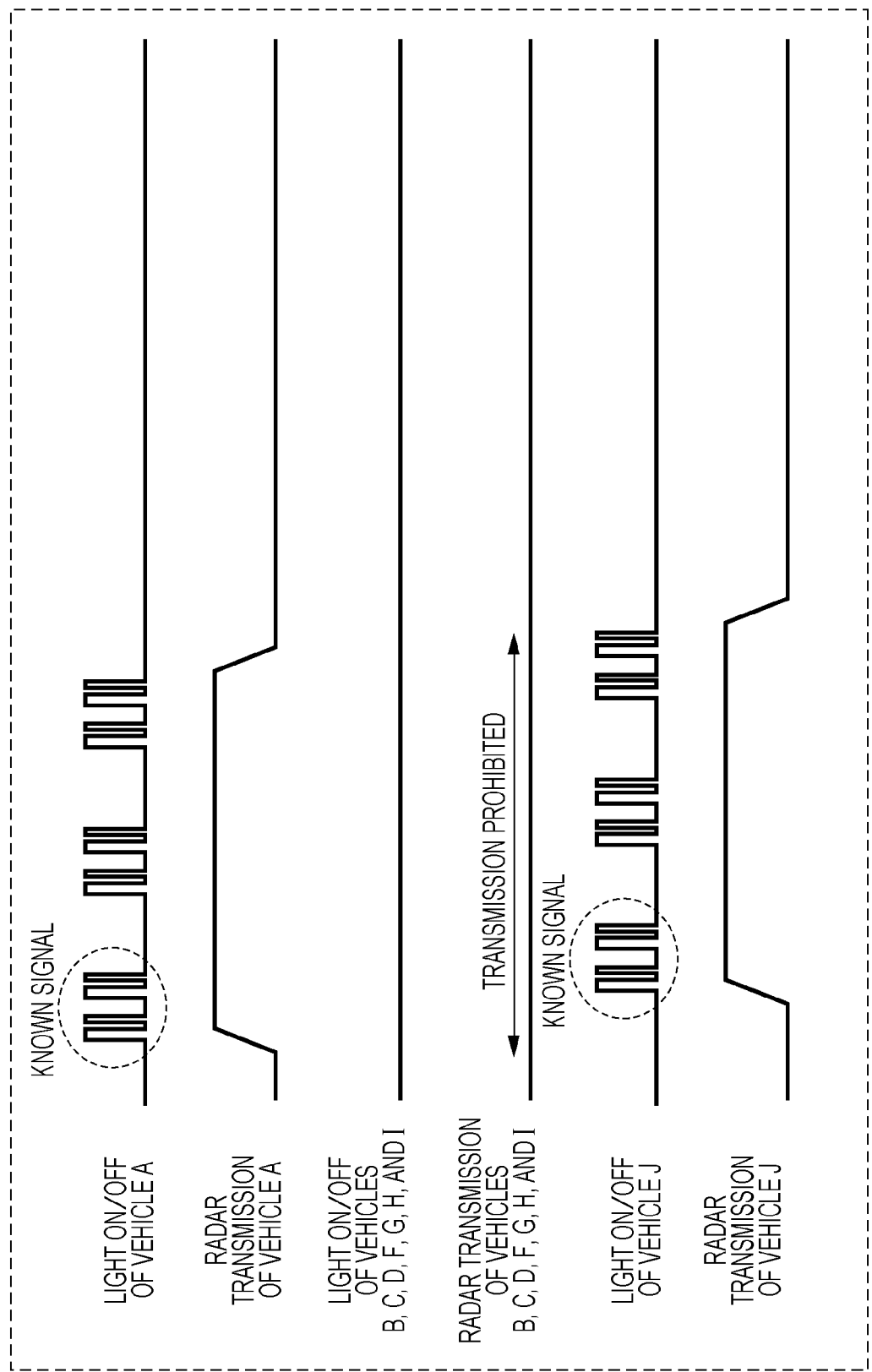
FIG. 21 illustrates a transmission timing of a known signal and a radar transmission timing according to Embodiment 4.

FIG. 21 is a diagram illustrating a relationship between a state of the light 105 and a transmission timing of a radar signal in each vehicle in Method 1.

For example, in a case where the vehicle A transmits a radar signal, the vehicle A (radar device 300) controls a light ON timing of the light 105 so as to transmit a known signal (a known light ON/OFF pattern) in a transmission period of a radar signal as illustrated in FIG. 21.

In FIG. 21, the surrounding vehicles B, C, D, F, G, H, and I are positioned so as to be able to capture the known signal of the vehicle A (the light ON/OFF pattern known to the plurality of vehicles) by using cameras thereof. Accordingly, the vehicles B, C, D, F, G, H, and I recognize the known signal. In this case, the vehicles B, C, D, F, G, H, and I do not transmit a radar signal while the known signal is being transmitted from the vehicle A (i.e., in the transmission period of the radar signal of the vehicle A).

Note that although only the transmission period of the radar signal of the vehicle A is illustrated in FIG. 21, the same applies to transmission periods of radar signals of the other vehicles.

Meanwhile, the vehicle J is positioned so as not to be able to capture the known signal (the known light ON/OFF pattern) of the vehicle A by using a camera thereof. In this case, as illustrated in FIG. 21, the vehicle J controls transmission of a radar signal independently of the vehicle A.

Note that the vehicle J controls a light ON timing of the light 105 so as to transmit a known signal (a known light ON/OFF pattern) in a transmission period of a radar signal, as with the vehicle A.

In this way, in Method 1, each vehicle (radar device 300) turns on and off the light 105 by using a unique light ON/OFF pattern known to a plurality of vehicles in a transmission period of a radar signal thereof. Other vehicles that can confirm this light ON/OFF pattern do not transmit a radar signal during this transmission period of the radar signal.

Accordingly, even in a transmission period of a radar signal of a certain vehicle, a vehicle that does not interfere with the radar signal transmitted from the certain vehicle can transmit a radar signal.

Furthermore, in Method 1, vehicles that share a frequency channel used for transmission of a radar signal are limited to ones that can confirm the known signal. For example, in FIG. 21, the vehicles A, B, C, D, F, G, H, and I share (i.e., time-divide) a frequency channel, and the vehicle J uses a frequency channel independently of the vehicles A, B, C, D, F, G, H, and I. This makes it possible to minimize the number of vehicles that share a frequency channel, thereby securing a period in which each vehicle can transmit a radar signal. It is therefore possible to shorten a radar detection cycle, thereby achieving sufficient performance.

Method 2

In Method 2, it is assumed that the vehicle D cannot recognize a light ON/OFF pattern of the light 105 of the vehicle A even though the vehicle D is within a range of interference with the vehicle A in FIG. 21.

In this case, according to Method 1, the vehicle D transmits a radar signal independently of the vehicle A, and therefore the vehicle A interferes with the vehicle D. This deteriorates radar detection performance.

Figure 22:
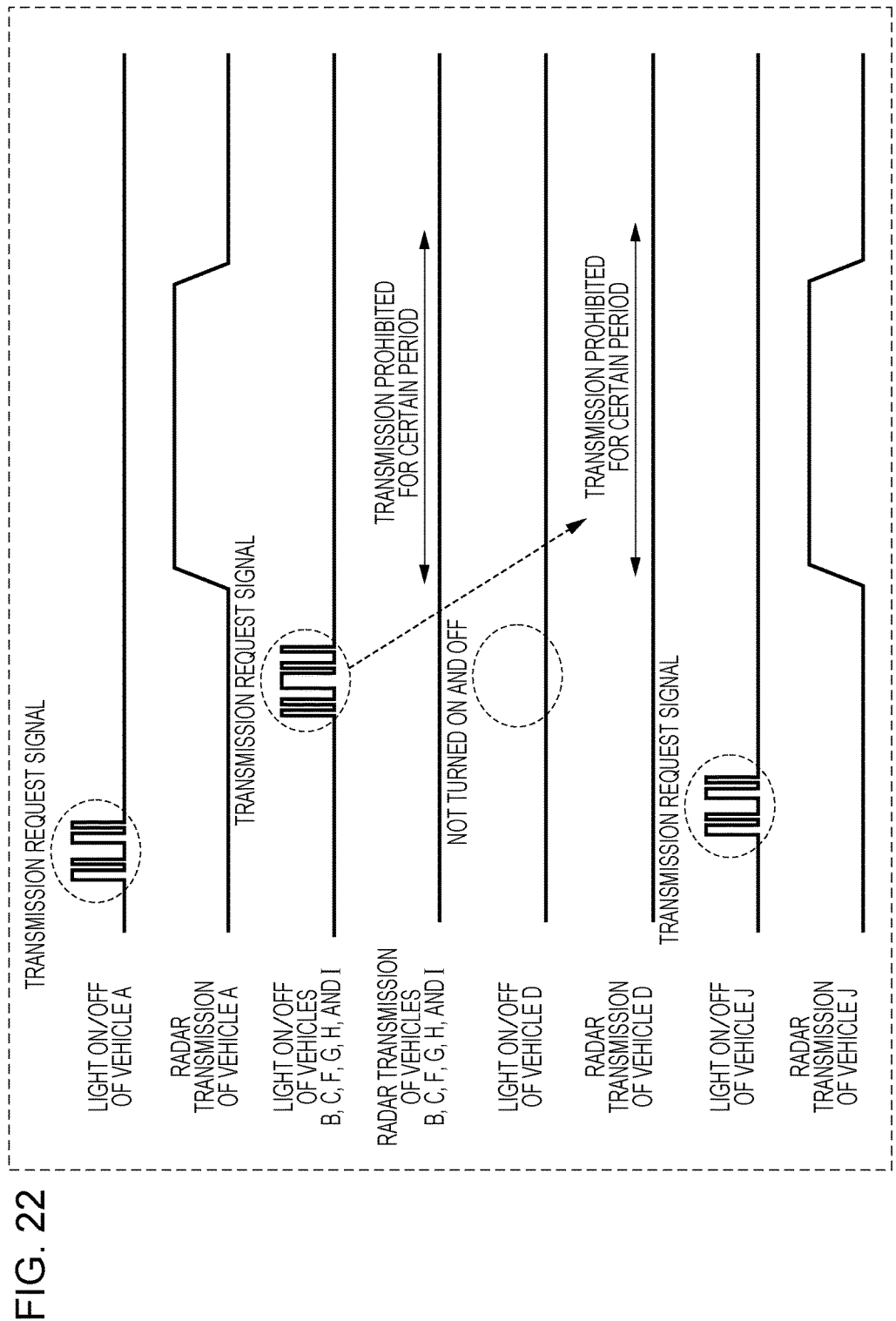
FIG. 22 illustrates a transmission timing of a transmission request signal and a transmission timing of a transmission permission signal according to Embodiment 4.

In view of this, in Method 2, the vehicle A (radar device 300) controls ON/OFF of the light 105 so as to transmit a radar signal transmission request signal (a light ON/OFF pattern indicative of a transmission request) before transmitting a radar signal as illustrated in FIG. 22.

In this case, in FIG. 22, the surrounding vehicles B, C, F, G, H, and I can capture the transmission request signal (light ON/OFF pattern) of the vehicle A by using cameras thereof and recognize that the light ON/OFF pattern corresponds to the transmission request signal. In this case, each of the vehicles B, C, F, G, H, and I controls ON/OFF of the light 105 so as to transmit a radar signal transmission permission signal (a light ON/OFF pattern indicative of transmission permission).

In this case, each of the vehicles B, C, F, G, H, and I need just turn on the light 105 in the light ON/OFF pattern indicative of transmission permission for the vehicle A in a case where a light ON/OFF pattern indicative of request from another vehicle to transmit a radar signal in a transmission period requested by the vehicle A is not detected. This makes it possible to prevent the vehicle A and a vehicle (not illustrated) that is given permission for transmission of a radar signal prior to the vehicle A from transmitting a radar signal concurrently.

Each of the vehicles B, C, F, G, H, and I that transmits the transmission permission signal does not transmit a radar signal for a certain period corresponding to the transmission period of the radar signal of the vehicle A.

Upon confirmation of the transmission permission signal from the surrounding vehicles, the vehicle A transmits a radar signal. That is, the radar device 300 (timing control unit 302) mounted in a vehicle turns on the light 105 in a light ON/OFF pattern indicative of radar signal transmission request, and then transmits a radar signal in a case where light ON/OFF patterns of lights of other vehicles indicate permission for transmission of a radar signal.

Meanwhile, in FIG. 22, the vehicle D is positioned so as not to be able to capture the transmission request signal (the light ON/OFF pattern of the light 105) of the vehicle A by using a camera thereof. In this case, as illustrated in FIG. 22, the vehicle D does not transmit a transmission permission signal (does not turn on and off the light 105 in a light ON/OFF pattern indicative of transmission permission). However, the vehicle D can capture the transmission permission signal from the surrounding vehicle B, C, F, G, H, or I by using the camera thereof and recognize that the light ON/OFF pattern is the transmission permission signal. In this case, the vehicle D determines that another vehicle (the vehicle A) requests transmission of a radar signal and the request has been permitted, and does not transmit a radar signal for a certain period corresponding to the transmission period of the radar signal of the other vehicle (the vehicle A).

That is, a vehicle that recognizes any one of a transmission request signal and a transmission permission signal suspends transmission of a radar signal for a certain period. For example, in FIG. 22, the vehicle D cannot recognize the transmission request signal from the vehicle A, but can recognize the transmission permission signals from the surrounding vehicles. Accordingly, the vehicle D does not transmit a radar signal.

Meanwhile, in FIG. 22, it is assumed that the vehicle J is positioned so as to be able to capture none of the transmission request signal from the vehicle A and the transmission permission signals from the vehicles B, C, F, G, H, and I by using the camera thereof. In this case, as illustrated in FIG. 22, the vehicle J transmits a radar signal independently of the vehicle A. Note that the vehicle J controls ON/OFF of the light 105 so as to transmit a radar signal transmission request signal before transmitting a radar signal, as with the vehicle A.

As described above, in Method 2, each vehicle (radar device 300) turns on and off the light 105 in a light ON/OFF pattern corresponding to a transmission request signal before transmitting a radar signal. A vehicle that can confirm the transmission request signal turns on and off the light 105 in a light ON/OFF pattern corresponding to a transmission permission signal and does not transmit a radar signal for a transmission period of a radar signal of the other vehicle. Furthermore, a vehicle that can confirm the transmission permission signal also does not transmit a radar signal in the transmission period of the radar signal of the other vehicle.

This allows even a vehicle that cannot confirm a transmission request signal from a vehicle that can interfere with the vehicle to prevent or suppress interference by suspending transmission of a radar signal.

Method 3

A situation where a plurality of vehicles transmit a transmission request signal (turn on the light 105) at the same timing can be also assumed in Method 2. For example, in a case where the vehicle B and the vehicle G transmit a transmission request signal at the same timing in FIG. 20, surrounding vehicles that can recognize light ON/OFF patterns corresponding to the transmission request signals from the vehicle B and the vehicle G transmit a transmission permission signal (a light ON/OFF pattern). As a result, both of the vehicle B and the vehicle G transmit a radar signal, and the vehicle B and the vehicle G interfere with each other.

In view of this, in Method 3, a method for transmitting a radar signal without interference even in a case where a plurality of vehicles transmit a transmission request signal at the same timing is described.

Specifically, a vehicle (radar device 300) that tries to transmit a radar signal transmits a transmission request signal including an ID (identification number) unique to the vehicle. That is, a light ON/OFF pattern indicative of transmission request includes a light ON/OFF pattern corresponding to the ID of the vehicle that requests transmission of a radar signal.

Upon confirmation of the transmission request signal, other vehicles (radar devices 300) transmit a transmission permission signal including the ID included in the transmission request signal. That is, a light ON/OFF pattern indicative of transmission permission includes a light ON/OFF pattern corresponding to the ID of the vehicle that is to be given permission to transmit a radar signal. This allows the transmission permission signal to be aimed at the vehicle corresponding to the ID included in the transmission permission signal.

The vehicle that tries to transmit a radar signal confirms the transmission permission signals transmitted from the surrounding vehicles and determines whether or not the IDs included in these transmission permission signals correspond to the vehicle that tries to transmit a radar signal. The vehicle that tries to transmit a radar signal transmits a radar signal in a case where all of the IDs included in these transmission permission signals are the ID of this vehicle, whereas the vehicle that tries to transmit a radar signal does not transmit a radar signal in a case where at least one of the IDs included in these transmission permission signals is not the ID of this vehicle.

That is, the vehicle that tries to transmit a radar signal determines that transmission of a radar signal has been permitted in a case where all of the IDs included in these transmission permission signals are the ID of this vehicle.

All vehicles (radar devices 300) transmit a transmission request signal again after elapse of a random period whose upper limit is a predetermined period instead of transmitting a transmission request signal (a light ON/OFF pattern of the light 105) immediately after a timing at which transmission of a radar signal is completed or a timing at which transmission of a radar signal is not permitted. This makes it possible to lower the possibility that a plurality of vehicles transmit a transmission request signal at the same timing. That is, each vehicle that tries to transmit a radar signal transmits a transmission request signal (a light ON/OFF pattern) after elapse of the random period from the aforementioned timing.

Figure 23:
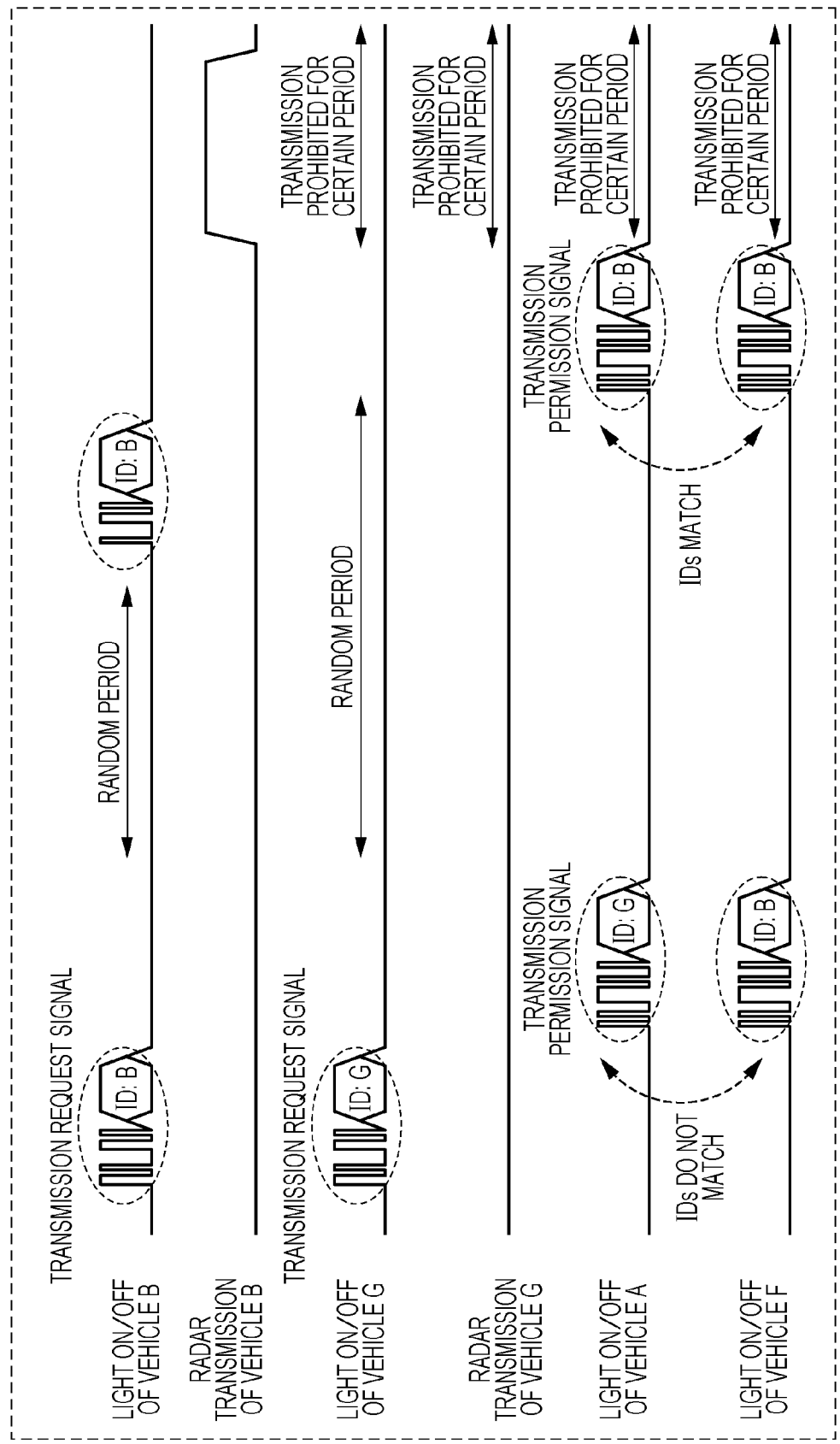
FIG. 23 illustrates a transmission timing of a transmission request signal and a transmission permission signal that include a vehicle ID according to Embodiment 4.

For example, in FIG. 23, the vehicle B and the vehicle G concurrently transmit a transmission request signal. In this case, the vehicle B transmits a transmission request signal including an ID of the vehicle B, and the vehicle G transmits a transmission request signal including an ID of the vehicle G.

Next, in FIG. 23, the vehicle A recognizes the transmission request signal transmitted from the vehicle G and transmits a transmission permission signal including the ID of the vehicle G. Meanwhile, the vehicle F recognizes the transmission request signal transmitted from the vehicle B and transmits a transmission permission signal including the ID of the vehicle B. That is, the vehicle ID included in the transmission permission signal transmitted from the vehicle A is different from that included in the transmission permission signal transmitted from the vehicle F.

Furthermore, for example, a vehicle (not illustrated) that recognizes both of the transmission request signal transmitted from the vehicle B and the transmission request signal transmitted from the vehicle G at the same timing does not transmit a transmission permission signal. Alternatively, this vehicle may transmit a transmission prohibition signal.

Next, in FIG. 23, the vehicle B and the vehicle G recognize the transmission permission signals transmitted from the vehicle A and the vehicle F. Since one of the transmission permission signals is aimed at one of the vehicles B and G and the other one of the transmission permission signals is aimed at the other one of the vehicles B and G, the vehicle B and the vehicle G determine that transmission of a radar signal is not permitted and do not transmit a radar signal.

Furthermore, the vehicle B and the vehicle G do not transmit a radar signal, for example, also in a case where the vehicle B and the vehicle G recognize no transmission permission signal aimed at the vehicle B and the vehicle G or in a case where the vehicle B and the vehicle G recognize the transmission prohibition signal.

In FIG. 23, the vehicle B transmits a transmission request signal again after elapse of the random period from determination that transmission of a radar signal is not permitted. Since it is unlikely that the random period in the vehicle B coincides with that in the vehicle G, there is a high possibility that a transmission request signal transmitted from any one of the vehicles B and G (the vehicle B in FIG. 23) is recognized by surrounding vehicles earlier.

In FIG. 23, the vehicle A recognizes the transmission request signal transmitted from the vehicle B and then transmits a transmission permission signal including the ID of the vehicle B. Furthermore, the vehicle F recognizes the transmission request signal transmitted from the vehicle B and then transmits a transmission permission signal including the ID of the vehicle B. That is, the vehicle ID included in the transmission permission signal transmitted from the vehicle A is the same as that included in the transmission permission signal transmitted from the vehicle F.

Since all of the IDs included in the transmission permission signals transmitted from the vehicle A and the vehicle F are the ID of the vehicle B, the vehicle B determines that transmission of a radar signal has been permitted and then transmits a radar signal. Furthermore, the vehicle A and the vehicle F that have transmitted the transmission permission signals and other vehicles (not illustrated) that have confirmed the transmission permission signals do not transmit a radar signal for a certain period corresponding to a transmission period of the radar signal of the vehicle B.

Note that a case where transmission of a radar signal is not permitted even after the series of processes of transmitting a transmission request signal again after elapse of the random period is repeated a predetermined number of times can also be assumed. In this case, the radar device 300 may transmit a radar signal after the predetermined number of times is reached. This makes it possible to give priority to safety of driving while performing radar detection assuming occurrence of interference.

Methods 1 through 3 have been described above.

As described above, according to the present embodiment, it is possible to prevent a radar detection cycle from becoming long since a plurality of vehicles that do not interfere with each other can use the same frequency channel concurrently.

Embodiment 5

A basic configuration of a radar device according to the present embodiment is identical to that of the radar device 300 according to Embodiment 3, and is therefore described with reference to FIG. 16.

In the present embodiment, any value that is equal to or lower than a predetermined upper limit value is set as a period in which a radar signal is transmitted (hereinafter referred to as a transmission continuation period). In a case where the transmission continuation period is set in accordance with a surrounding environment, the radar device 300 can more efficiently detect a target. For example, in a case where the surrounding environment allows restriction of a detection range, the radar device 300 may finish a radar detection process in a shorter time than usual by setting the transmission continuation period shorter than usual.

Specifically, the transmission continuation period is included in a transmission request signal and a transmission permission signal (see Embodiment 4) transmitted by the radar device 300 in addition to a vehicle ID. That is, a light ON/OFF pattern indicative of radar signal transmission request and a light ON/OFF pattern indicative of transmission permission include a light ON/OFF pattern indicative of the transmission continuation period.

As a result, a vehicle (radar device 300) that recognizes a transmission request signal or a transmission permission signal does not transmit a radar signal for the transmission continuation period included in the transmission request signal or the transmission permission signal. The transmission continuation period is set, for example, in a timer 322 illustrated in FIG. 16, and a state management unit 321 controls the vehicle (radar device 300) not to transmit a radar signal until the transmission continuation period ends. However, a vehicle that has transmitted a transmission request signal and recognized a transmission permission signal aimed to this vehicle transmits a radar signal.

In a case where a certain vehicle recognizes transmission request signals transmitted from a plurality of vehicles at almost the same timing, the certain vehicle may transmit a transmission permission signal including the longest one of transmission continuation periods included in the transmission request signals transmitted from the plurality of vehicles and a corresponding vehicle ID. This makes it possible to prevent interference with not only a vehicle whose transmission continuation period is short, but also a vehicle whose transmission continuation period is long.

Furthermore, control signals such as a transmission request signal, a transmission permission signal, and a transmission prohibition signal may include information indicative of a frequency channel used by a vehicle in addition to the aforementioned information. This allows each vehicle to determine whether or not a frequency channel indicated by a transmission request signal, a transmission permission signal, or a transmission prohibition signal is the same as a frequency channel used by the vehicle, for example, in a system using a plurality of frequency channels. A vehicle that transmits a radar signal by using a frequency channel different from another vehicle can transmit a radar signal at the same time as the other vehicle. Accordingly, the vehicle is permitted to transmit a radar signal even in a case where the vehicle and the other vehicle transmit transmission request signals at the same time. That is, a transmission timing of a radar signal may be controlled by also taking a used frequency channel into consideration.

Figure 24:
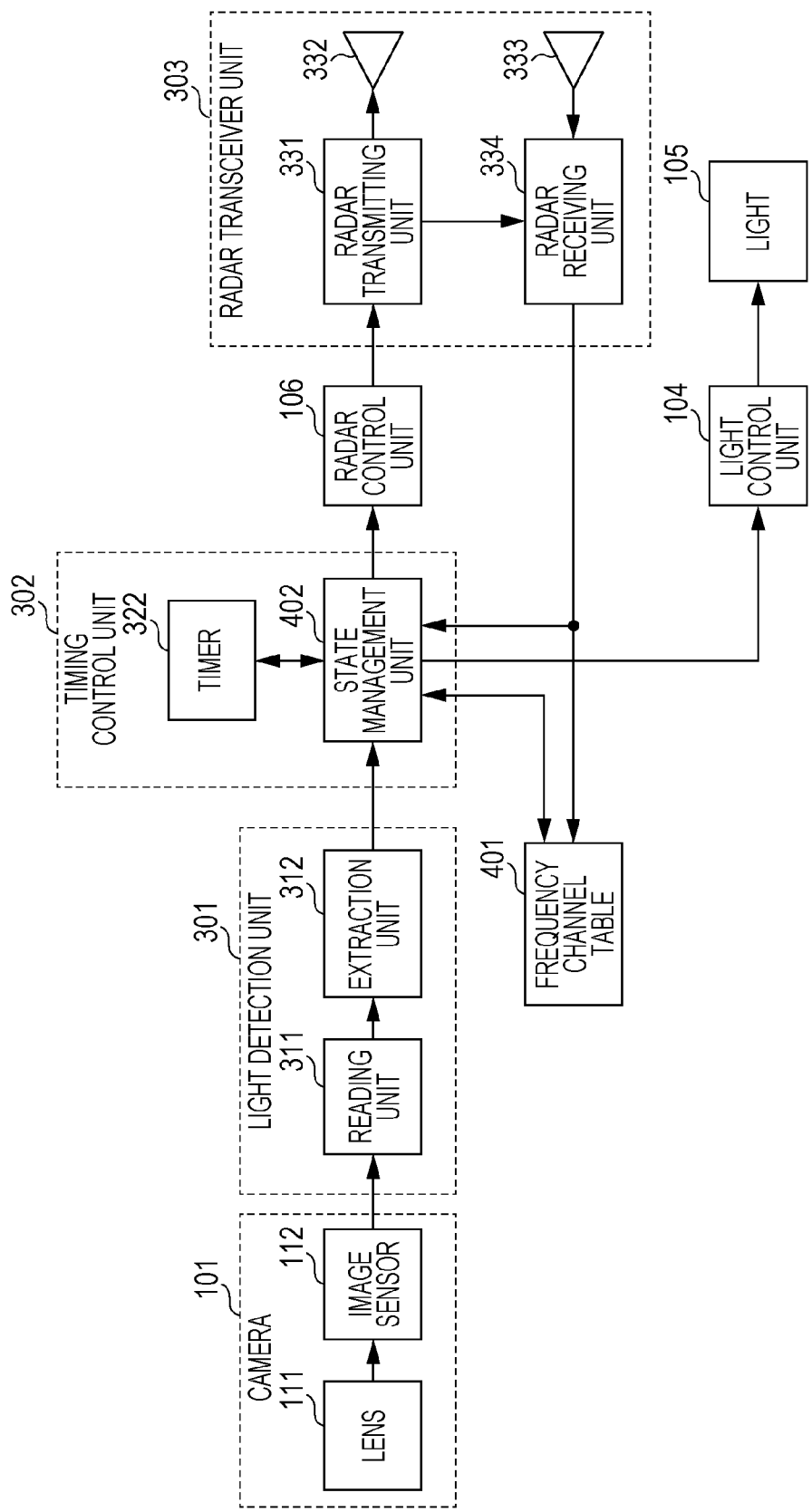
FIG. 24 illustrates a configuration of a radar device according to Embodiment 5.

FIG. 24 is a block diagram illustrating a configuration of a radar device 400 that achieves control taking a used frequency channel into consideration. In FIG. 24, constituent elements identical to those in FIG. 16 are given identical reference signs, and description thereof is omitted.

Specifically, the configuration illustrated in FIG. 24 is different from that illustrated in FIG. 16 in that a frequency channel table 401 is added and in an operation of a state management unit 402.

The radar device 400 measures a reception level at a transmission timing of a radar signal of another vehicle by using a reflected wave signal received by a radar receiving unit 334. For example, the radar device 400 can measure a reception level of a radar signal transmitted from another vehicle at a timing at which the host vehicle does not transmit a radar signal. The radar device 400 also measures a reception level in a frequency channel different from a frequency channel used by the host vehicle. Then, the radar device 400 specifies a frequency channel used by another vehicle by using the measured reception level in the frequency channel.

The frequency channel table 401 stores therein correspondences between a plurality of frequency channels and vehicle IDs of vehicles that use the frequency channels for transmission of a radar signal.

Upon receipt of a transmission request signal, the state management unit 402 specifies a frequency channel associated with a vehicle ID included in the transmission request signal by referring to the correspondences stored in the frequency channel table 401. For example, in a case where a plurality of transmission request signals are received at the same timing and where frequency channels corresponding to vehicle IDs included in the respective transmission request signals are different from each other, the state management unit 402 gives transmission permission to each of these transmission request signals.

Furthermore, the state management unit 402 may control a frequency channel used by the host vehicle on the basis of a frequency channel of another vehicle that is specified by a vehicle ID included in a transmission request signal, a transmission permission signal, or a transmission prohibition signal. For example, the state management unit 402 may change the frequency channel used by the host vehicle to one used by a smaller number of vehicles by referring to the frequency channel of the other vehicle.

Furthermore, in a case where a transmission permission signal is transmitted, the state management unit 402 causes a vehicle ID of another vehicle corresponding to the transmission permission signal to be included in the transmission permission signal. This allows other vehicles that receive the transmission permission signal (vehicles other than the vehicle that has transmitted a transmission request signal) to specify a frequency channel used by the vehicle that transmits a radar signal.

As described above, use of a frequency channel table makes it possible to achieve control taking a frequency channel into consideration without causing information of a used frequency channel to be included in a transmission request signal or the like. Since the information of a frequency channel is not included in a transmission request signal or the like, a period needed to transmit a control signal is limited. This shortens a standby period needed before transmission of a radar signal.

Embodiment 6

Figure 25:
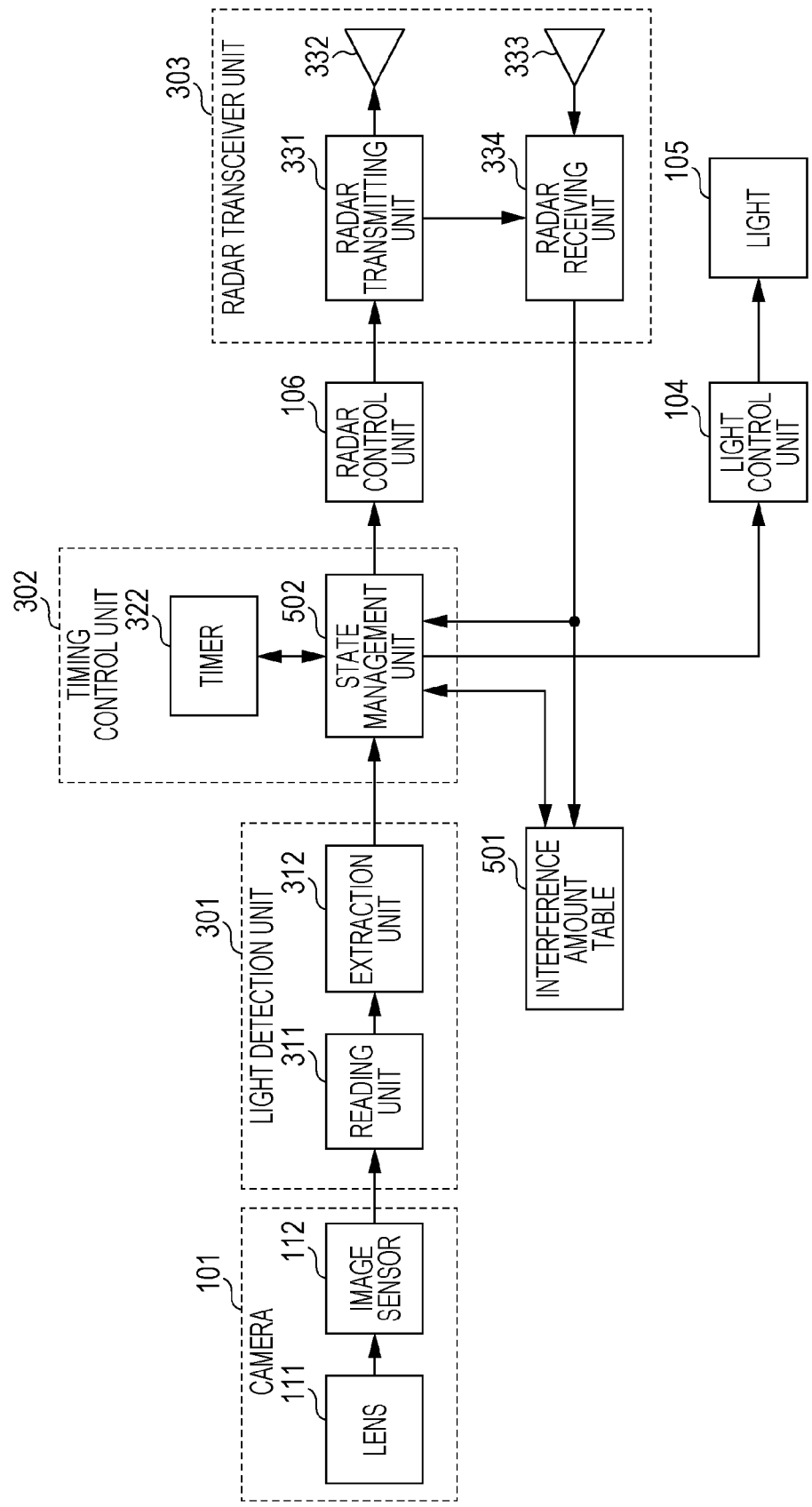
FIG. 25 illustrates a configuration of a radar device according to Embodiment 6.

FIG. 25 is a block diagram illustrating a configuration of a radar device 500 according to the present embodiment. In FIG. 25, constituent elements that are identical to those in FIG. 16 are given identical reference signs, and description thereof is omitted.

Specifically, the configuration illustrated in FIG. 25 is different from that illustrated in FIG. 16 in that an interference amount table 501 is added and in an operation of a state management unit 502.

The radar device 500 measures a reception level at a transmission timing of a radar signal of another vehicle by using a reflected wave signal received by a radar receiving unit 334. Then, the radar device 500 measures, for each vehicle, an interference amount between another vehicle and a host vehicle by using the measured reception level.

The interference amount table 501 stores therein correspondences between (i) interference amounts (reception levels) between a plurality of other vehicles and the host vehicle and (ii) vehicle IDs of the vehicles.

Upon receipt of a transmission request signal from another vehicle, the state management unit 502 specifies an interference amount (i.e., a reception level of a radar signal obtained previously) associated with a vehicle ID included in the transmission request signal by referring to the interference amount table 501. In a case where the specified interference amount is equal to or larger than a predetermined threshold value, the state management unit 502 transmits a transmission permission signal (a light ON/OFF pattern indicative of transmission permission), whereas in a case where the interference amount is less than the predetermined threshold value, the state management unit 502 does not transmit a transmission permission signal. Note that the predetermined threshold value can be a value (reception level) indicating sufficiently small interference with transmission of a radar signal of the host vehicle.

As described above, the radar device 500 does not transmit a transmission permission signal in a case where an interference amount is less than the predetermined threshold value. This allows a vehicle that cannot recognize a signal from a vehicle that transmits a transmission request signal to transmit a radar signal since such a vehicle does not receive a transmission permission signal. That is, it is possible to reduce the number of vehicles that are prohibited from transmitting a radar signal.

For example, a case where a vehicle D and a vehicle I recognize a transmission request signal transmitted from a vehicle A in the example illustrated in FIG. 20 is described. In this case, a reception level (interference amount) of a radar signal from the vehicle A received previously is specified by referring to the interference amount table 501. In a case where it is determined that the interference amount is sufficiently small (less than the threshold value), the vehicle D and the vehicle I do not transmit a transmission permission signal to the vehicle A. As a result, in FIG. 20, a vehicle E and a vehicle J that cannot recognize the signal transmitted from the vehicle A do not recognize a transmission permission signal, and therefore can transmit a radar signal by using the same frequency channel even at a timing at which the vehicle A transmits a radar signal.

Note that although the vehicle D and the vehicle I do not transmit a transmission permission signal in response to the transmission request signal transmitted from the vehicle A, a transmission permission signal is transmitted from a vehicle (e.g., a vehicle B and a vehicle F) in which an interference amount with the vehicle A is equal to or larger than the threshold value. This allows the vehicle A to transmit a radar signal.

In a situation in which the vehicle A and the vehicle J concurrently transmit a transmission request signal and the vehicle D and the vehicle I can recognize both of the transmission request signal transmitted from the vehicle A and the transmission request signal transmitted from the vehicle J in FIG. 20, radar signal transmission may be controlled in accordance with a relative positional relationship among the vehicle A, the vehicle J, and a host vehicle (the vehicle D or vehicle I). For example, the vehicle D and the vehicle I may grasp the relative positional relationship with the vehicle A and the vehicle J by using image analysis.

Figure 26A:
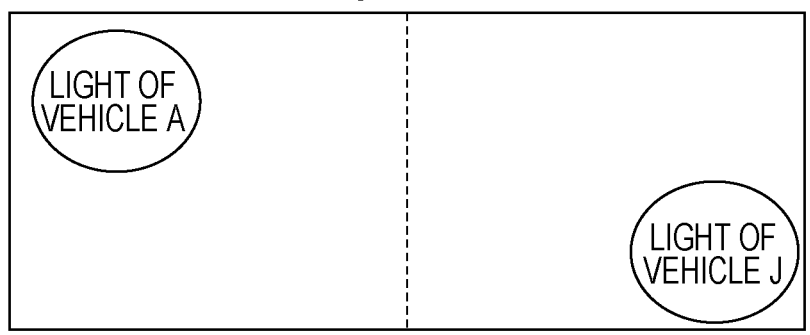
FIG. 26A illustrates an example of a positional relationship between vehicles specified by image analysis.
Figure 26B:
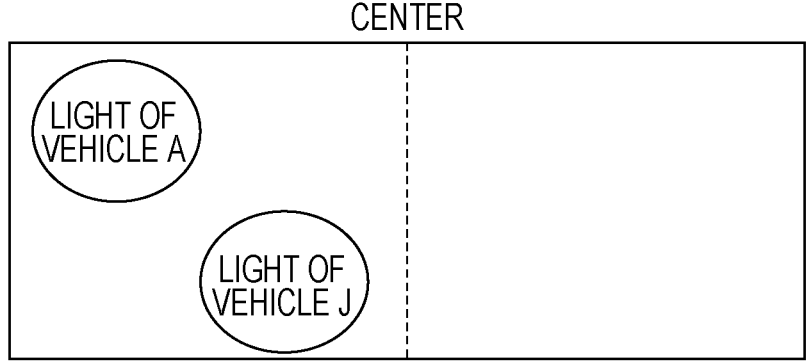
FIG. 26B illustrates another example of a positional relationship between vehicles specified by image analysis.

FIGS. 26A and 26B illustrate the relative positional relationship with the vehicle A and the vehicle J viewed from the vehicle D or the vehicle I. FIG. 26A illustrates a positional relationship in which the vehicle J is closer to the host vehicle (the vehicle D or the vehicle I) than the vehicle A, and FIG. 26B illustrates a positional relationship in which the vehicle J is closer to the vehicle A than the host vehicle (the vehicle D or the vehicle I).

For example, in a case where the vehicle J is closer to the host vehicle than the vehicle A (in a case where the vehicle J and the vehicle A are remote from each other) as illustrated in FIG. 26A, the host vehicle determines that interference does not occur (or an interference amount is small) even in a case where the vehicle J and the vehicle A concurrently transmit a radar signal. Accordingly, the host vehicle may be controlled not to transmit a transmission permission signal in response to the transmission request signals transmitted from the vehicle A and the vehicle J. That is, in this case, the vehicle D and the vehicle I that can recognize both of the signals transmitted from the vehicle A and the vehicle J operate not to prohibit the vehicle A and the vehicle J from concurrently transmitting a radar signal. This allows the vehicle A and the vehicle J to transmit a radar signal since the vehicle A and the vehicle J recognize transmission permission signals for the vehicle A and the vehicle J (a transmission permission signal including a vehicle ID of the vehicle A and a transmission permission signal including a vehicle ID of the vehicle J), respectively, without recognizing a transmission permission signal for another vehicle (a transmission permission signal including a vehicle ID different from the vehicle A and a transmission permission signal including a vehicle ID different from the vehicle J, respectively).

Meanwhile, in a case where the vehicle J is closer to the vehicle A than the host vehicle as illustrated in FIG. 26B, the host vehicle determines that interference occurs (an interference amount is large) in a case where the vehicle J and the vehicle A concurrently transmit a radar signal. Accordingly, the host vehicle may be controlled to transmit a transmission permission signal in response to the transmission request signal transmitted from the vehicle A. As a result, the vehicle J recognizes the transmission permission signal for the vehicle A and therefore cannot transmit a radar signal. That is, in this case, the vehicle D and the vehicle I operate to prohibit the vehicle A and the vehicle J from concurrently transmitting a radar signal.

A situation in which a positional relationship among vehicles changes in accordance with movement of vehicles can also be assumed. In view of this, the position of each vehicle is grasped by image analysis and associated in the interference amount table. In a case where the position of each vehicle (the positional relationship among vehicles) changes, a process such as resetting values of interference amounts of vehicles is performed. This makes it possible to always refer to highly reliable interference amount table.

As described above, according to the present embodiment, it is possible to precisely control transmission of a radar signal in accordance with not only ON/OFF of the light 105 of another vehicle captured by a camera 101, but also an interference amount that is actually measured, thereby improving radio frequency use efficiency.

Embodiment 7

There is a possibility that the luminance of a light of a vehicle becomes higher or lower than original luminance for illumination of a region around the vehicle in a case where the light of the vehicle is turned on and off to control transmission of a radar signal as described above.

In view of this, in the present embodiment, a case where the light is turned on and off so that a change of luminance of the light falls within a certain range is described.

A basic configuration of a radar device according to the present embodiment is identical to that of the radar device 300 according to Embodiment 3, and is therefore described with reference to FIG. 16.

Figure 27:
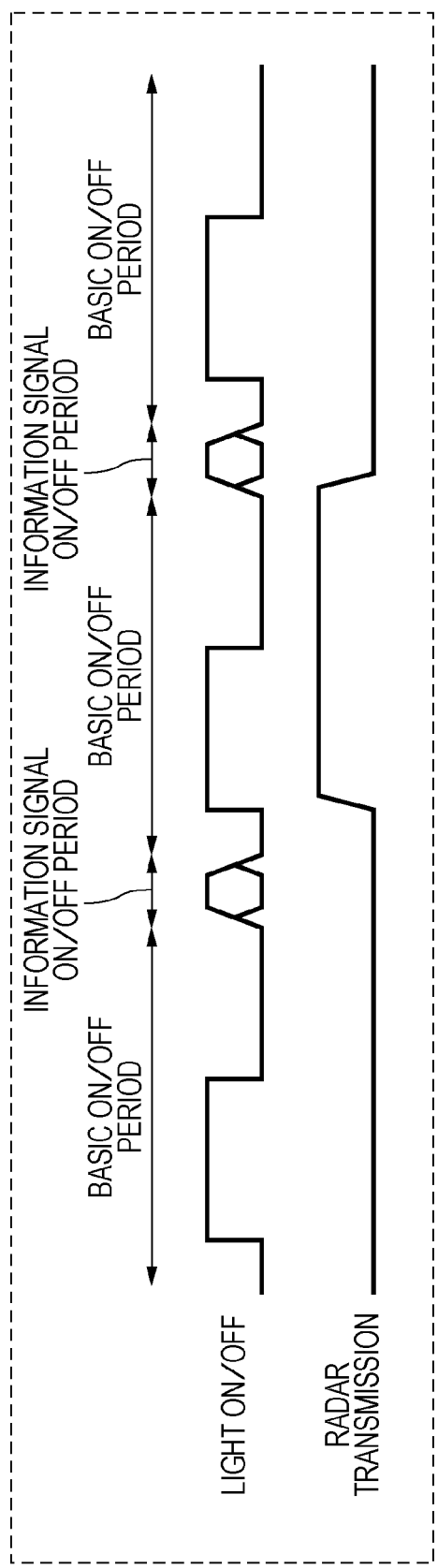
FIG. 27 illustrates a light ON/OFF cycle according to Embodiment 7.

A timing control unit 302 of the radar device 300 according to the present embodiment sets a basic ON/OFF period in which the luminance of a light 105 is kept and an information signal ON/OFF period in which a control signal concerning transmission of a radar signal is transmitted, as illustrated in FIG. 27. The radar device 300 of each vehicle transmits a control signal for transmission of a radar signal only in the information signal ON/OFF period.

For example, in FIG. 27, the radar device 300 transmits a control signal (a light ON/OFF pattern of the light 105) in the information signal ON/OFF period. The radar device 300 transmits a radar signal in the basic ON/OFF period. That is, in FIG. 27, the radar device 300 synchronizes a light ON/OFF pattern of the light 105 in the information signal ON/OFF period and a transmission pattern of a radar signal in the basic ON/OFF period.

Although a case where a transmission timing of a radar signal matches the basic ON/OFF period is illustrated in FIG. 27, a transmission timing of a radar signal is not limited to this and can be a different timing (period).

In a case where a ratio of an ON period of the light 105 is changed in accordance with the number of vehicles that share a frequency channel in a time-division manner as described in Embodiment 3, the ratio of the ON period of the light 105 of each vehicle decreases and the luminance decreases accordingly as the number of vehicles becomes larger. Meanwhile, in the present embodiment, a change of the ratio of the ON period of the light 105 that occurs depending on the number of vehicles that share the frequency channel is applied to the information signal ON/OFF period. That is, the ratio of the ON period is constant in the basic ON/OFF period.

This allows a change of luminance of the light 105 to be within a certain range. It is therefore possible to keep desired luminance.

Modification

Figure 28:
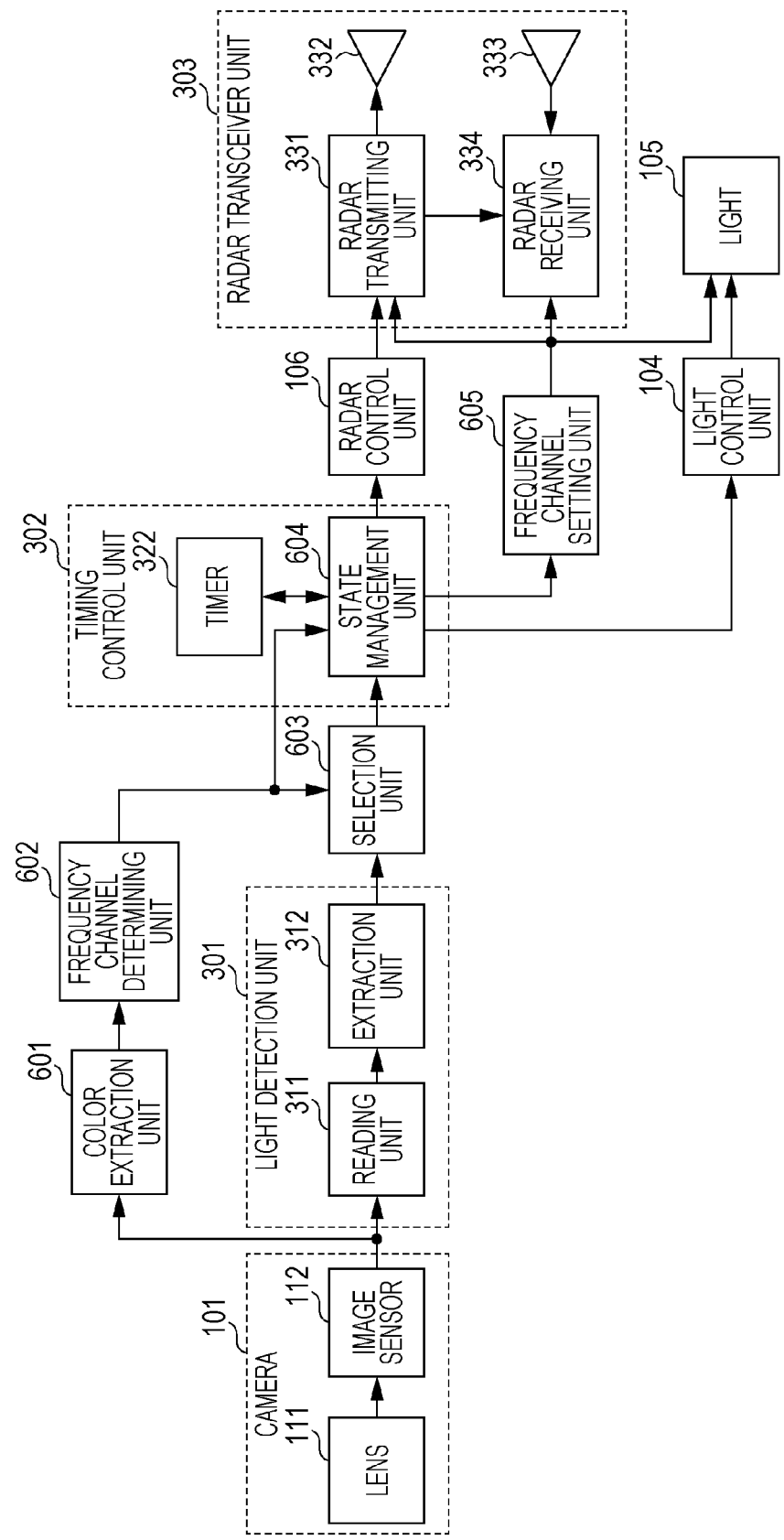
FIG. 28 illustrates a configuration of a radar device according to Embodiment 7.

FIG. 28 is a block diagram illustrating a configuration of a radar device 600 according to Modification of the present embodiment. In FIG. 28, constituent elements that are identical to those in FIG. 16 are given identical reference signs, and description thereof is omitted.

In Modification of the present embodiment, the radar device 600 causes a light 105 to emit light in a predetermined color in a basic ON/OFF period, and changes the color of light emitted by the light 105 in accordance with a frequency channel used by the radar device 600 in an information signal ON/OFF period. That is, a plurality of frequency channels and colors of light emitted by the light 105 are associated with each other in advance.

A color extraction unit 601 extracts a color of a light (e.g., an LED) of another vehicle that emits light in an information signal ON/OFF period from an image signal supplied from an image sensor 112.

A frequency channel determining unit 602 stores therein, in advance, correspondences between frequency channels available for transmission of a radar signal and colors of emitted light corresponding to the respective frequency channels. The frequency channel determining unit 602 determines a frequency channel corresponding to the color extracted by the color extraction unit 601.

A selection unit 603 nullifies a signal (a light detection result) supplied from an extraction unit 312 in a case where a frequency channel used by a host vehicle and a frequency channel used by the other vehicle that is supplied from the frequency channel determining unit 602 are different from each other. That is, the selection unit 603 supplies the signal supplied from the extraction unit 312 to the timing control unit 302 only in a case where the frequency channel used by the host vehicle is the same as the frequency channel used by the other vehicle.

A state management unit 604 sets a transmission timing of a radar signal and a light ON timing of the light 105 of the host vehicle on the basis of a state (a light detection result) of the light of the other vehicle in a case where the state of the light of the other vehicle is supplied from the selection unit 603 (i.e., in a case where the frequency channel used by the host vehicle is the same as the frequency channel used by the other vehicle). Meanwhile, the state management unit 604 sets a transmission timing of a radar signal and a light ON timing of the light 105 of the host vehicle independently of the other vehicle in a case where the state of the light of the other vehicle is not supplied from the selection unit 603 (i.e., in a case where the frequency channel used by the host vehicle and the frequency channel used by the other vehicle are different from each other).

Furthermore, the state management unit 604 manages the frequency channel used by the host vehicle and the frequency channel used by the other vehicle that is determined by the frequency channel determining unit 602.

A frequency channel setting unit 605 sets a frequency channel used by the host vehicle in accordance with a state of the frequency channel managed by the state management unit 604. For example, the frequency channel setting unit 605 changes the frequency channel used by the host vehicle to one that is relatively unoccupied in accordance with frequency channels used by the host vehicle and the other vehicle. The frequency channel setting unit 605 supplies the set frequency channel to a radar transmitting unit 331 and a radar receiving unit 334, and supplies information of a color of emitted light corresponding to the set frequency channel to the light 105.

As a result, the radar transceiver unit 303 transmits and receives a radar signal by using the set frequency channel, and the light 105 turns on in the color of light corresponding to the set frequency channel.

As described above, the radar device 600 can easily detect a used frequency channel by identifying a color of light emitted by the light 105 that is on in the information signal ON/OFF interval. The radar device 600 can use a frequency channel that is relatively unoccupied on the basis of the detection result.

In a case where there is a large number of vehicles that can interfere with each other and where a frequency channel is shared by the large number of vehicles in a time-division manner in order to prevent interference, a ratio of a period that can be used for radar detection in each vehicle is small, and as a result, a radar detection cycle is long. Meanwhile, in a case where there are a plurality of frequency channels available for transmission of a radar signal as described above, independent radar signal transmission control can be achieved in each frequency channel because no interference occurs between different frequency channels.

In a case where information on a used frequency channel is transmitted by modulating ON/OFF of the light 105, a period for transmission of the information is additionally needed. Meanwhile, in a case where a used frequency channel is distinguished on the basis of a color of light emitted by the light 105, an additional period for transmission of the information is unnecessary.

Embodiment 8

In the present embodiment, a case where radar signal transmission is controlled in consideration of the frequency of occurrence of interference or the degree of influence of interference that varies depending on a scene in which a vehicle is placed is described.

It is assumed that there is a difference in the frequency of occurrence of interference or the degree of influence of interference between a scene (e.g., a parking lot) in which there are a large number of vehicles that are running at a low speed or parked and a scene (e.g., an ordinary road or an expressway) in which there are vehicles that are running at a medium or high speed.

Specifically, in the scene in which there are a large number of vehicles that are running at a low speed or parked, there is a possibility that interference occurs among a large number of vehicles over a long period. Since both of the speed of a host vehicle and the speed of other vehicles are low, a period before occurrence of an accident such as collision is longer than that in the case where vehicles are running at a medium or high speed, and therefore a cycle for radar detection of an object or the like can be long.

Figure 29:
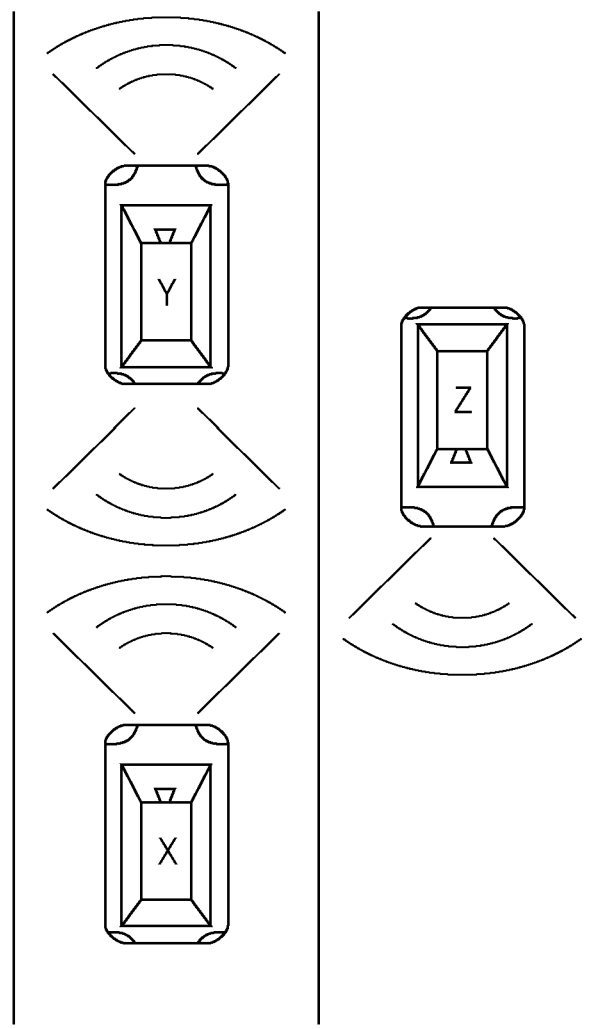
FIG. 29 illustrates an example of a situation in which the radar device according to Embodiment 7 operates.

Meanwhile, in the scene in which there are vehicles that are running at a medium or high speed, for example, in a case where a vehicle X and a vehicle Y are running in the same direction and where the vehicle Y is transmitting a radar signal backward as illustrated in FIG. 29, interference continuously occurs between the vehicle X and the vehicle Y. However, the number of vehicles that can interfere with each other is limited as compared with the case such as a parking lot.

In view of this, in the present embodiment, a radar device determines a scene in which a vehicle is placed on the basis of information on running speed of the vehicle (vehicle speed) and an image analysis result, and controls transmission of a radar signal in accordance with the scene.

Figure 30:
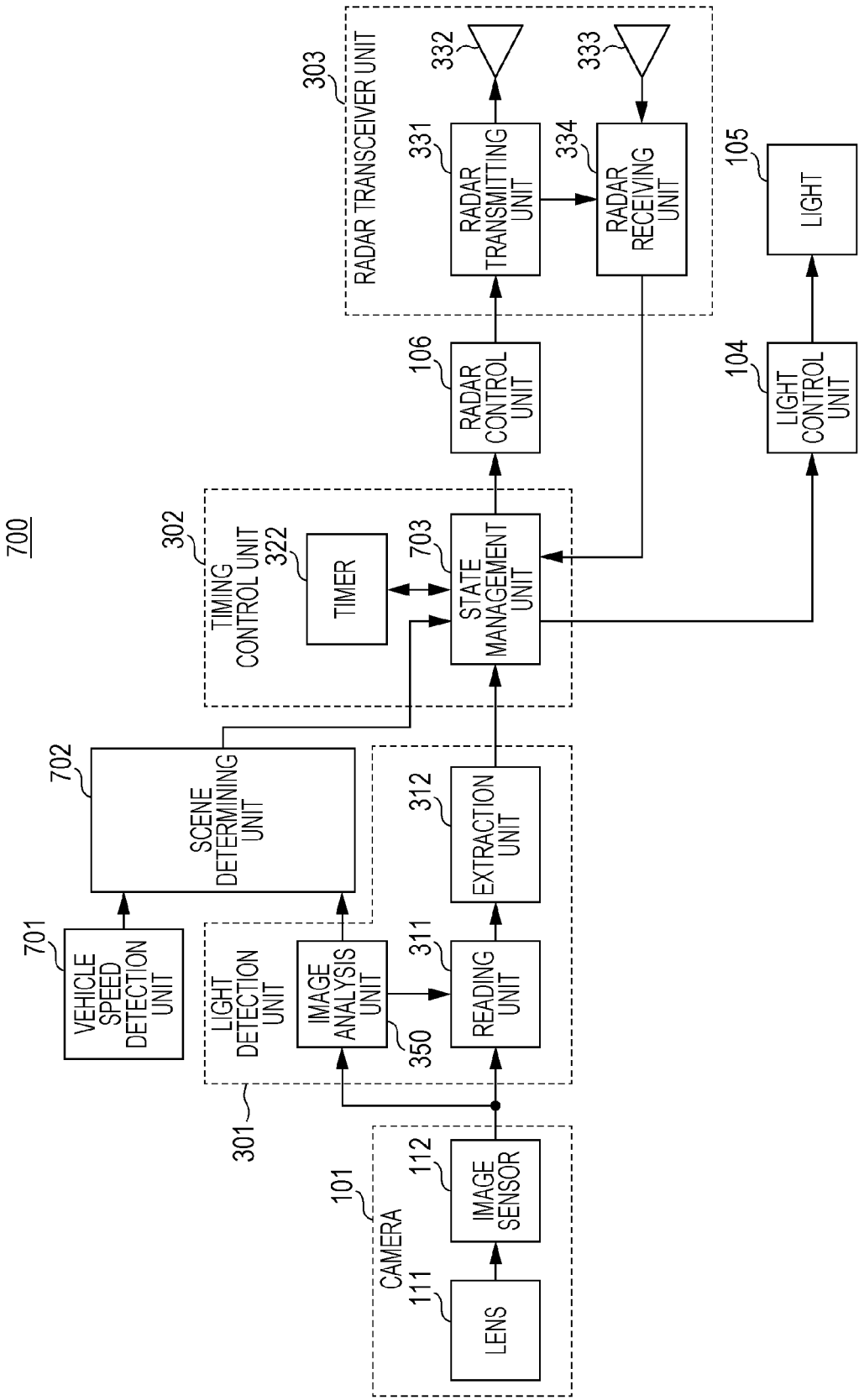
FIG. 30 illustrates a configuration of a radar device according to Embodiment 8.

FIG. 30 is a block diagram illustrating a configuration of a radar device 700 according to the present embodiment. In FIG. 30, constituent elements that are identical to those in FIGS. 16 and 19 are given identical reference signs, and description thereof is omitted. Specifically, the configuration illustrated in FIG. 30 is different from that illustrated in FIG. 19 in that a vehicle speed detection unit 701 and a scene determining unit 702 are newly provided and in an operation of a state management unit 703.

The vehicle speed detection unit 701 measures a running speed of a host vehicle (vehicle speed).

The scene determining unit 702 determines whether a scene in which the host vehicle is placed is a scene (e.g., a parking lot) in which vehicles are running at a low speed or a scene in which vehicles are running at a medium or high speed on the basis of the vehicle speed of the host vehicle supplied from the vehicle speed detection unit 701 and information (image analysis result) supplied from an image analysis unit 350.

In a case where the host vehicle is running at a low speed, the state management unit 703 of a timing control unit 302 selects a mode in which a transmission request signal is transmitted by using a light ON/OFF pattern of a light 105 before transmission of a radar signal, and a radar signal is transmitted after elapse of a predetermined period as described in Embodiment 4. Meanwhile, in a case where the host vehicle is running at a medium or high speed, the state management unit 703 selects a mode in which a transmission timing of a radar signal of a surrounding other vehicle that is synchronized with a state of a light 105 of the other vehicle is specified, and a radar signal is transmitted and the light 105 is turned on in a period (time slot) in which the other vehicle is not transmitting a radar signal as described in Embodiment 1 or 3.

In this way, in the present embodiment, a mode of radar signal transmission control is switched in accordance with a scene in which a host vehicle is placed. For example, the radar device 700 lowers the frequency of occurrence of interference by prolonging a radar detection cycle in a scene in which there are a large number of vehicles that can interfere with each other, whereas the radar device 700 shortens a radar detection cycle in a scene in which the number of vehicles that can interfere with each other is small. By thus adaptively switching radar signal transmission control in accordance with a scene in which a host vehicle is placed, it is possible to secure safety according to the scene.

Embodiment 9

In the present embodiment, a radar device that uses an ultrasonic wave instead of a radio wave as a radar signal is described.

A basic configuration of a radar device according to the present embodiment is identical to that of the radar device 100 according to Embodiment 1, and is therefore described with reference to FIG. 1.

Figure 31:
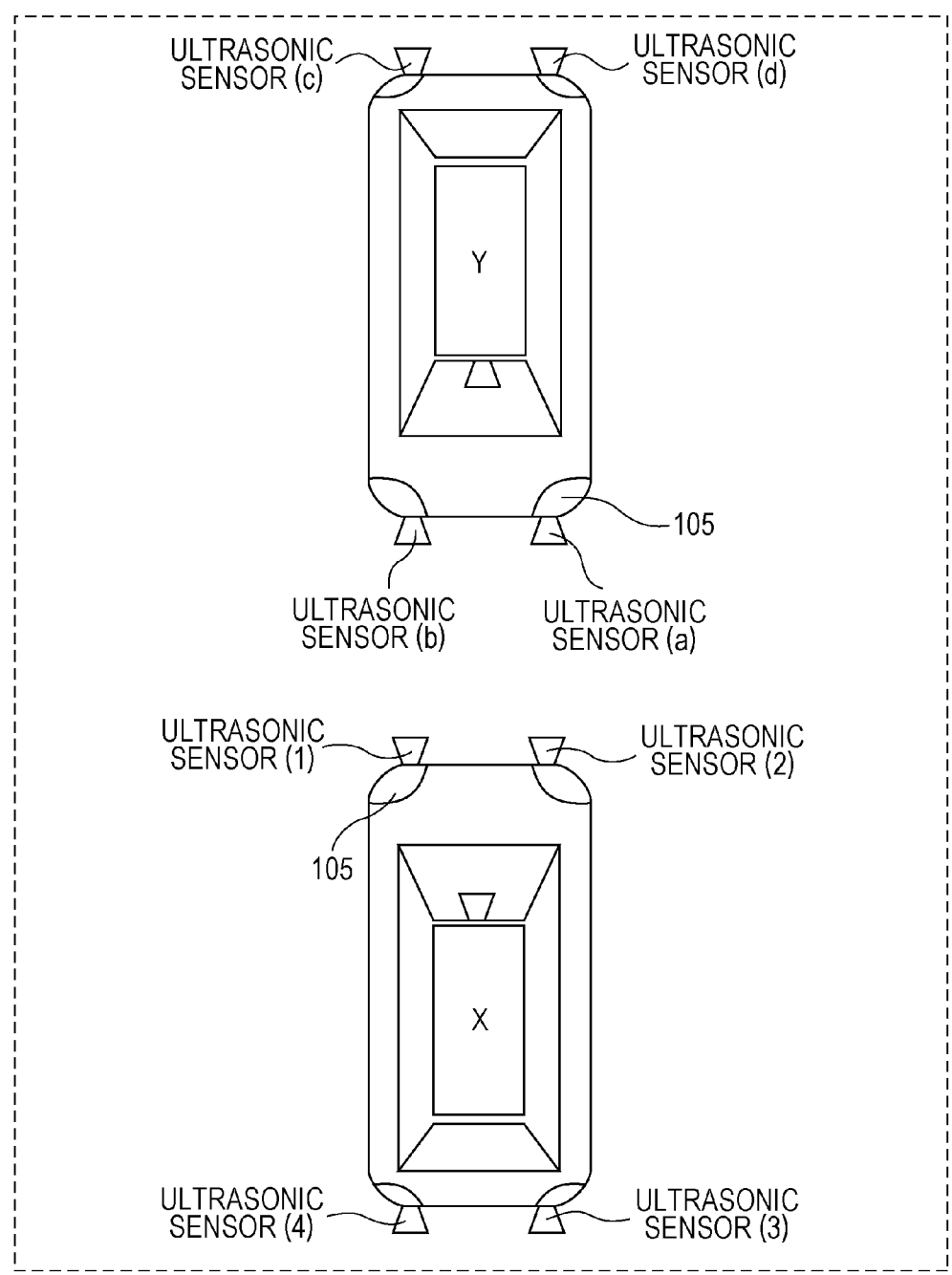
FIG. 31 illustrates an example of a situation in which a radar device according to Embodiment 9 operates.

FIG. 31 illustrates a situation in which a vehicle X and a vehicle Y, in each of which a radar device 100 is mounted, are facing each other in a parking lot or the like.

A plurality of ultrasonic sensors are mounted in each of the vehicles X and Y. For example, in the vehicle X illustrated in FIG. 31, a plurality of ultrasonic sensors (1) through (4) are mounted at positions corresponding to the positions of lights 105 of the vehicle X. Similarly, in the vehicle Y illustrated in FIG. 31, a plurality of ultrasonic sensors (a) through (d) are mounted at positions corresponding to the positions of lights 105 of the vehicle Y.

In a case where a plurality of ultrasonic sensors are used in the same region, there is a problem of interference as in the case of a radio wave (see, for example, Reports of Toyama Industrial Technology Center No. 25 (2011) "A System for Simultaneous Measurement of Distance Using Multiple Ultrasonic Wave Signals").

In view of this, in the present embodiment, a timing control unit 103 of the radar device 100 mounted in each of the vehicles X and Y sets an ultrasonic sensor switching timing on the basis of states of the lights 105 of the other vehicle that are included in an image captured by a camera 101. The ultrasonic sensor switching timing is a timing at which an ultrasonic sensor that transmits an ultrasonic wave is sequentially switched among a plurality of ultrasonic sensors mounted in each vehicle.

Then, a radar transceiver unit 107 sequentially switches an ultrasonic sensor that transmits an ultrasonic wave (i.e., a radar signal) among the plurality of ultrasonic sensors in accordance with a control signal (including the ultrasonic sensor switching timing) supplied from a radar control unit 106.

For example, the radar transceiver unit 107 of the vehicle X transmits an ultrasonic wave while switching an ultrasonic sensor in a time-division manner in the order of (1), (2), (3), and (4). Furthermore, the radar transceiver unit 107 of the vehicle X receives (detects) the ultrasonic wave transmitted as a radar signal and then reflected by a target (the vehicle Y) by using the ultrasonic sensor, and then supplies the ultrasonic wave to the radar signal processing unit 108. Similarly, the radar transceiver unit 107 of the vehicle Y transmits an ultrasonic wave while switching an ultrasonic sensor in a time-division manner in the order of (a), (b), (c), and (d). Furthermore, the radar transceiver unit 107 of the vehicle Y receives (detects) the ultrasonic wave transmitted as a radar signal and then reflected by a target (the vehicle X) by using the plurality of ultrasonic sensors, and then supplies the ultrasonic wave to the radar signal processing unit 108.

A pattern (hereinafter referred to as a switching pattern) in which an ultrasonic sensor that transmits an ultrasonic wave is sequentially switched among the plurality of ultrasonic sensors in the vehicle X is synchronized with that in the vehicle Y so that the vehicle X and the vehicle Y do not interfere with each other in the same region.

Figure 32:
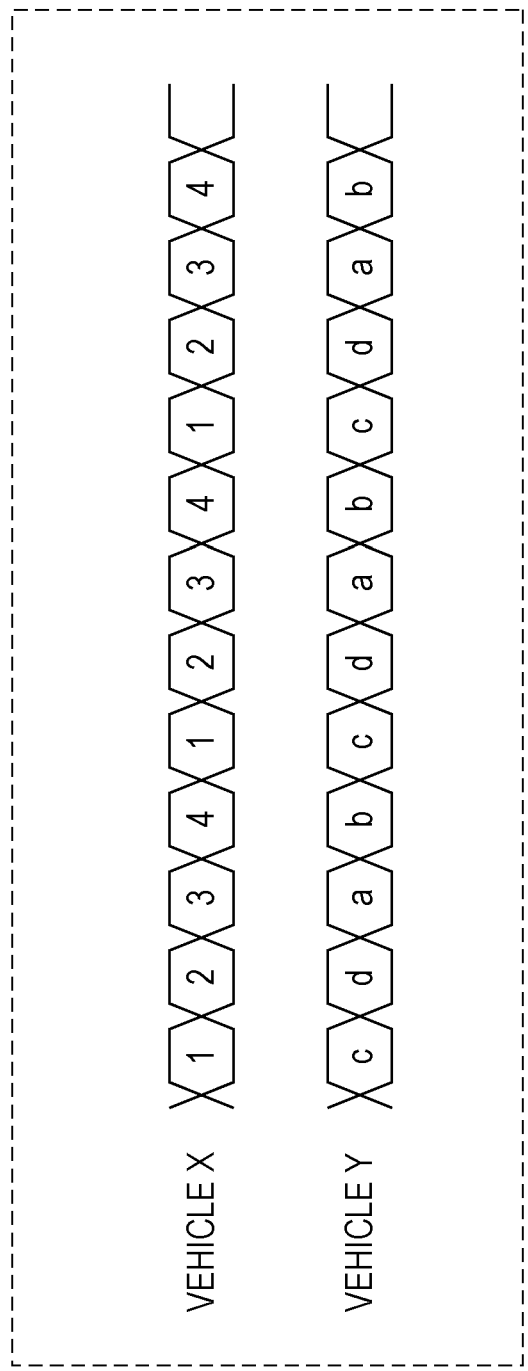
FIG. 32 illustrates ultrasonic sensor switching patterns of two vehicles according to Embodiment 9.

FIG. 32 illustrates ultrasonic sensor switching patterns in the vehicle X and the vehicle Y. In FIG. 32, the ultrasonic sensor switching pattern in the vehicle X ((1)→(2)→(3)→(4)) and the ultrasonic sensor switching pattern in the vehicle Y ((c)→(d)→(a)→(b)) are synchronized with each other.

That is, in a case where the ultrasonic sensors (1) and (2) mounted on the front side of the vehicle X (on the side facing the vehicle Y) transmit (detect) an ultrasonic wave, the ultrasonic sensors (c) and (d) mounted on the rear side of the vehicle Y (on the side opposite to the vehicle X) transmit (detect) an ultrasonic wave. Similarly, in a case where the ultrasonic sensors (3) and (4) mounted on the rear side of the vehicle X (on the side opposite to the vehicle Y) transmit (detect) an ultrasonic wave, the ultrasonic sensors (a) and (b) mounted on the front side of the vehicle Y (on the side facing the vehicle X) transmit (detect) an ultrasonic wave. That is, the ultrasonic sensor switching patterns in the vehicle X and the vehicle Y are set so that an ultrasonic sensor detection region in the vehicle X and an ultrasonic sensor detection region in the vehicle Y are not the same as each other.

In a case where vehicle X and the vehicle Y transmit an ultrasonic wave without synchronization between the vehicle X and the vehicle Y (independently of each other) in a state where the vehicle X and the vehicle Y are facing, there is a risk of erroneous detection because of interference. Meanwhile, in a case where the vehicle X and the vehicle Y transmit an ultrasonic wave synchronized with each other even in state where the vehicle X and the vehicle Y are facing, it is possible to prevent erroneous detection caused by interference.

Figure 33:
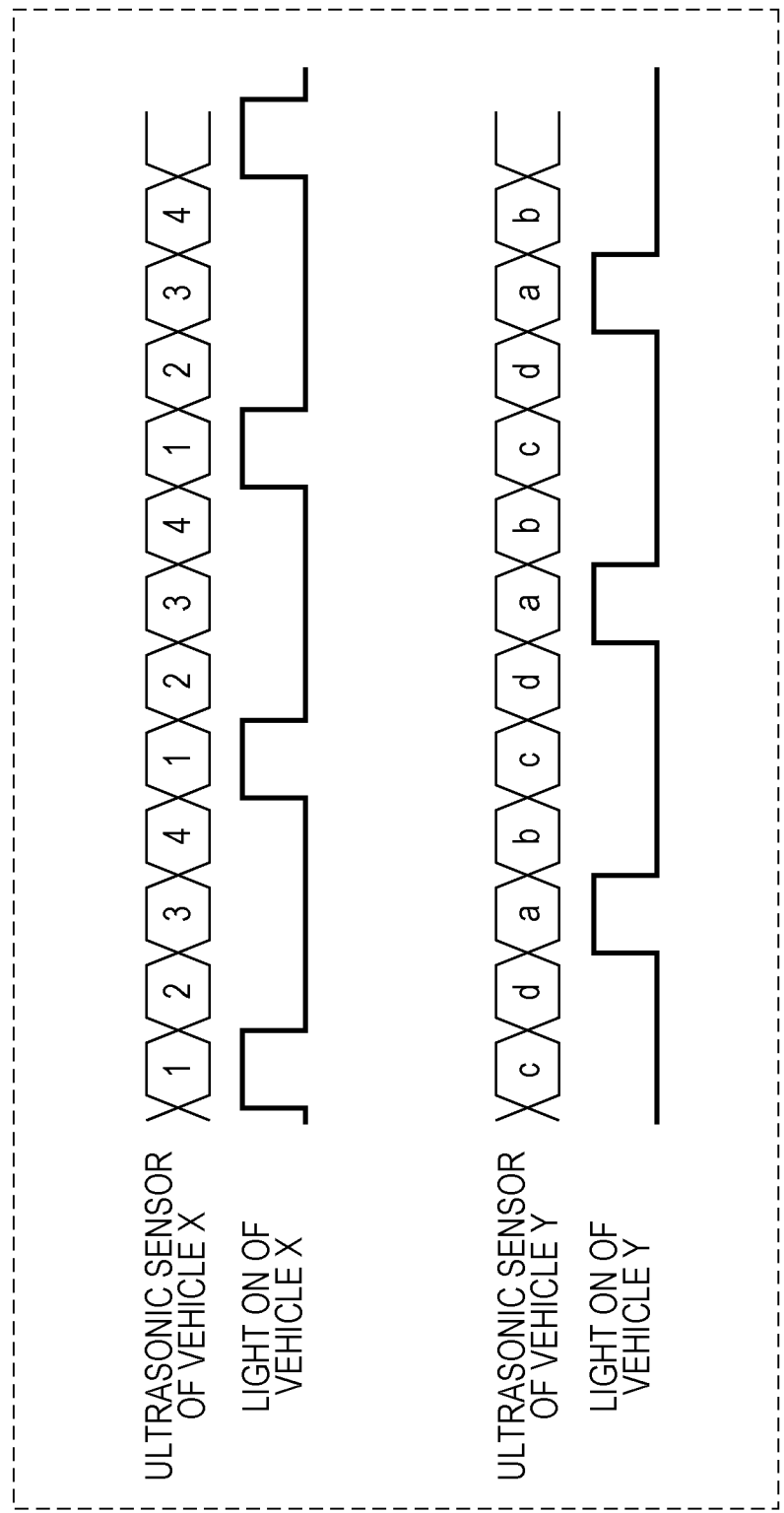
FIG. 33 illustrates ultrasonic sensor switching patterns and light ON timings of lights according to Embodiment 9.

Furthermore, in the present embodiment, an ultrasonic sensor switching pattern and a light ON/OFF pattern of a light 105 are synchronized with each other in each vehicle. For example, the timing control unit 103 sets a light ON timing of the light 105 synchronized with an ultrasonic sensor switching timing of the host vehicle as illustrated in FIG. 33. For example, in the vehicle X illustrated in FIG. 33, a transmission period of the ultrasonic sensor (1) mounted on the front side of the vehicle X (on the side facing the vehicle Y) and the light ON period of the light 105 are synchronized with each other. In the vehicle Y illustrated in FIG. 33, a transmission period of the ultrasonic sensor (a) mounted on the front side of the vehicle Y (on the side facing the vehicle X) and the light ON period of the light 105 are synchronized with each other.

In a case where the ultrasonic sensor (1) and the ultrasonic sensor (a) are used at the same timing in the state where the vehicle X and the vehicle Y are facing each other as illustrated in FIG. 31, the ultrasonic sensor (1) and the ultrasonic sensor (a) interfere with each other. Meanwhile, in FIG. 33, in a case where the vehicle X and the vehicle Y are facing, the timing control unit 103 of each vehicle sets an ultrasonic sensor switching pattern so that ultrasonic sensors associated with the light ON timings of the lights 105 of the vehicles X and Y do not interfere with each other.

Specifically, the timing control unit 103 of each vehicle specifies an ultrasonic sensor switching pattern transmitted from the other vehicle that is synchronized with a light ON/OFF pattern of the light of the other vehicle on the basis of the light ON/OFF pattern of the light of the other vehicle. Then, the timing control unit 103 sets an ultrasonic sensor switching pattern of the host vehicle so that an ultrasonic sensor of the other vehicle and an ultrasonic sensor of the host vehicle do not interfere with each other.

For example, assume that the vehicle X has been performing detection using the ultrasonic sensors prior to the vehicle Y. In this case, the timing control unit 103 of the vehicle Y specifies a pattern of switching among the ultrasonic sensors (1) through (4) of the vehicle X on the basis of the light ON period of the light 105 of the vehicle X and then sets, as transmission periods of the ultrasonic sensors (a) and (b), periods other than transmission periods of the ultrasonic sensors (1) and (2) that can interfere with the ultrasonic sensors of the vehicle Y.

In other words, the timing control unit 103 of the vehicle Y sets, as the light ON timing of the light 105 of the vehicle Y, a timing different from the light ON period of the light 105 of the vehicle X. That is, the light ON period of the light 105 of the vehicle X and the light ON period of the light 105 of the vehicle Y are different from each other as illustrated in FIG. 33. Since a transmission period of an ultrasonic sensor associated with the light ON period of the light 105 of the vehicle X is different from that of the vehicle Y, the timing control unit 103 can set an ultrasonic sensor switching pattern so that interference between the vehicle X and the vehicle Y is prevented.

As described above, according to the present embodiment, the radar device 100 mounted in each vehicle transmits an ultrasonic wave from an ultrasonic sensor for detecting a direction of another vehicle among a plurality of ultrasonic sensors mounted in a host vehicle in a case where the light detection unit 102 does not detect an ON state of the light 105 of the other vehicle. This allows the timing control unit 103 to transmit an ultrasonic wave while preventing interference with the other vehicle by detecting a state of the light 105 of the other vehicle. For example, in a case where the vehicles have the same relationship between an ultrasonic sensor switching pattern and a light ON/OFF pattern of the light 105, the radar device 100 mounted in each vehicle can prevent erroneous detection caused by interference by detecting a direction of the other vehicle by using an ultrasonic sensor of the host vehicle in a case where the light ON timing of the light 105 of the host vehicle is different from that of the other vehicle.

In the present embodiment, a case where the radar device 100 specifies a relationship between an ultrasonic sensor switching pattern and a light ON/OFF pattern of the light 105 on the basis of a state of the light 105 of the other vehicle has been described. However, the present embodiment is not limited to this. For example, the radar device 100 may specify a relationship between an ultrasonic sensor switching pattern and a light ON/OFF pattern of the light 105 on the basis of a reception state of an ultrasonic wave from the other vehicle.

For example, assume that the vehicle X has been performing detection using the ultrasonic sensors prior to the vehicle Y. In this case, the radar device 100 of the vehicle Y grasps a relationship between a light ON timing of the vehicle X that is obtained by the light detection unit 102 and a reception state of an ultrasonic wave before transmitting an ultrasonic wave. For example, assume that the radar device 100 of the vehicle Y observes a signal of a reception level illustrated in FIG. 34. The reception level illustrated in FIG. 34 is divided into periods A in which the reception level is high and periods B in which the reception level is low. The radar device 100 of the vehicle Y specifies that the light ON timing of the light of the vehicle X that is obtained by the light detection unit 102 and the reception level (the periods A) are synchronized with each other. Accordingly, the radar device 100 of the vehicle Y transmit an ultrasonic wave from an ultrasonic sensor mounted on the front side of the vehicle Y (on the side facing the vehicle X) in the periods B, and transmit an ultrasonic wave from an ultrasonic sensor mounted on the rear side of the vehicle Y (on the side opposite to the vehicle X) in the period A.

The embodiments of the present disclosure have been described above.

Note that a case where a state of a light of another vehicle is detected by using a camera has been described in the above embodiments, but the embodiments are not limited to this. A state of a light of another vehicle may be detected by using a different light-receiving circuit.

In the above embodiments, an example in which as aspect of the present disclosure is realized by hardware has been described. However, the present disclosure can be also realized by software in combination with hardware.

The functional blocks used for description of the above embodiments are typically realized by an LSI that is an integrated circuit. The integrated circuit may control the functional blocks used for description of the above embodiments and include input and output. These functional blocks may be realized as individual chips or some or all of the constituent elements may be realized as a single chip. The term "LSI" is used, but the term "IC", "system LSI", "super LSI", or "ultra LSI" may be used depending on the degree of integration.

Furthermore, means to achieve integration is not limited to an LSI and may be a special circuit or a general-purpose processor. An FPGA (Field Programmable Gate Array) that can be programmed after production of an LSI or a reconfigurable processor in which connection or setting of circuit cells inside an LSI can be reconfigured can be also used.

If a technique of integration circuit that replaces an LSI appears in the future as a result of advancement of the semiconductor technique or appearance of another technique deriving from the semiconductor technique, integration of the functional blocks can be achieved by using such a technique. One possibility is application of a biotechnology or the like.

A radar device according to the present disclosure is a radar device mounted in a host vehicle, including: a radar transmitter that transmits a radar signal; a light detector that detects ON or OFF of a light of another vehicle in which the radar device is mounted; and a controller that sets a transmission timing of the radar signal and a light ON timing of a light of the host vehicle, the light ON timing being synchronized with the transmission timing on basis of detected ON or OFF of the light of the other vehicle, and the set transmission timing being different from a transmission timing of a radar signal of the radar device mounted in the other vehicle.

In the radar device according to the present disclosure, a transmission cycle including a transmission period and a transmission suspension period of the radar signal and an ON/OFF cycle including an light ON period and a light OFF period of the light are synchronized with each other; and the controller sets the transmission period that is different from a transmission period of the radar signal of the radar device mounted in the other vehicle.

In the radar device according to the present disclosure, the controller sets the transmission period in a period same as the light ON period and sets the transmission suspension period in a period same as the light OFF period.

In the radar device according to the present disclosure, the controller sets the transmission period in a period same as the light OFF period and sets the transmission suspension period in a period same as the light ON period.

The radar device according to the present disclosure further includes a radar signal detector that detects a radar signal transmitted from the other vehicle; and a determiner that determines correspondence between (i) a transmission period and a transmission suspension period of the radar signal transmitted from the other vehicle and (ii) and a light ON period and a light OFF period of the light of the other vehicle on basis of ON or OFF of the light of the other vehicle and a detection result obtained by the radar signal detector, the controller setting the transmission timing and the light ON timing on basis of the correspondence.

In the radar device according to the present disclosure, the controller sets, as the transmission timing, any one of a plurality of periods obtained by dividing an ON/OFF cycle of the light by the total number of host and other vehicles.

In the radar device according to the present disclosure, the controller turns on the light by using a light ON/OFF pattern known to a plurality of vehicles in a transmission period of the radar signal; and the controller does not transmit the radar signal in a case where the known light ON/OFF pattern of the light of the other vehicle is detected.

In the radar device according to the present disclosure, the controller transmits the radar signal in a case where the controller turns on the light by using a first light ON/OFF pattern indicative of request for transmission of the radar signal and then a second light ON/OFF pattern of the light of the other vehicle is detected, the second light ON/OFF pattern being indicative of permission for transmission of the radar signal.

In the radar device according to the present disclosure, in a case where the first light ON/OFF pattern of the other vehicle is detected, the controller turns on the light by using the second light ON/OFF pattern and suspends transmission of the radar signal for a predetermined period.

In the radar device according to the present disclosure, the controller turns on the light by using the second light ON/OFF pattern in a case where the first light ON/OFF pattern of the other vehicle is detected and the first light ON/OFF pattern of another vehicle is not detected.

In the radar device according to the present disclosure, the controller suspends transmission of the radar signal for a predetermined period in a case where the light is not turned on by using the first light ON/OFF pattern and where the second light ON/OFF pattern of the other vehicle is detected.

In the radar device according to the present disclosure, the first light ON/OFF pattern indicates an identification number of a vehicle that requests transmission of the radar signal; the second light ON/OFF pattern indicates an identification number of a vehicle to be given permission to transmit the radar signal; and the controller transmits the radar signal in a case where the detected second light ON/OFF patterns of all of other vehicles indicate an identification number of the host vehicle.

In the radar device according to the present disclosure, the controller turns on the light by using the first light ON/OFF pattern after elapse of a random period in a case where at least one of the detected second light ON/OFF patterns of all of the other vehicles does not indicate the identification number of the host vehicle.

In the radar device according to the present disclosure, each of the first light ON/OFF pattern and the second light ON/OFF pattern indicates a continuation period of transmission of the radar signal; and the controller suspends transmission of the radar signal for the continuation period indicated by the detected first light ON/OFF pattern or second light ON/OFF pattern of the other vehicle.

In the radar device according to the present disclosure, each of the first light ON/OFF pattern and the second light ON/OFF pattern indicates a continuation period of transmission of the radar signal; and the controller turns on the light by using a longest one of a plurality of continuation periods indicated by the detected first light ON/OFF patterns of a plurality of other vehicles.

In the radar device according to the present disclosure, the first light ON/OFF pattern indicates an identification number of a vehicle that requests transmission of the radar signal; a frequency channel used for transmission of the radar signal and the identification number of the vehicle are associated with each other; and in a case where frequency channels associated with respective identification numbers of a plurality of other vehicles indicated by the first light ON/OFF patterns of the plurality of other vehicles, the controller turns on the light for each of the plurality of other vehicles by using the second light ON/OFF pattern.

In the radar device according to the present disclosure, the first light ON/OFF pattern indicates an identification number of a vehicle that requests transmission of the radar signal; an interference amount between another vehicle and the host vehicle and an identification number of the other vehicle are associated with each other; and the controller turns on the light for the other vehicle by using the second light ON/OFF pattern in a case where the interference amount associated with the identification number indicated by the first light ON/OFF pattern of the other vehicle is equal to or larger than a predetermined threshold value, and the controller does not turn on the light for the other vehicle by using the second light ON/OFF pattern in a case where the interference amount indicated by the first light ON/OFF pattern of the other vehicle is less than the predetermined threshold value.

In the radar device according to the present disclosure, an ON/OFF cycle of the light includes a first period in which luminance of the light is kept and a second period in which the light is turned on and off in a manner indicating a control signal concerning transmission of the radar signal.

The radar device according to the present disclosure further includes: an extractor that extracts a color of light emitted by the light of the other vehicle; and a determiner that determines a frequency channel associated with the extracted color, the controller setting the transmission timing and the light ON timing on basis of ON or OFF of the light of the other vehicle in a case where a frequency channel used by the host vehicle is same as the determined frequency channel, and setting the transmission timing and the light ON timing independently of the other vehicle in a case where the frequency channel used by the host vehicle is different from the determined frequency channel.

In the radar device according to the present disclosure, in a situation in which the host vehicle is running at a low speed, the controller transmits the radar signal in a case where the second light ON/OFF pattern of the other vehicle is detected after the light is turned on by using the first light ON/OFF pattern; and in a situation in which the host vehicle is running at a medium or high speed, the controller specifies a transmission period of the radar signal of the other vehicle that is synchronized with an ON/OFF cycle of the light of the other vehicle and transmits the radar signal at a timing different from the transmission period.

A radar device mounted in a host vehicle according to the present disclosure includes a plurality of ultrasonic sensors that transmit an ultrasonic wave; a light detector that detects ON or OFF of a light of another vehicle in which the radar device is mounted; and a controller that sets a switching pattern in which an ultrasonic sensor that transmits an ultrasonic wave is sequentially switched among the plurality of ultrasonic sensors and a light ON timing of a light of the host vehicle, the light ON timing being synchronized with the switching pattern on basis of detected ON or OFF of the light of the other vehicle, and the set light ON timing being different from a light ON timing of the light of the other vehicle.

An interference prevention method according to the present disclosure is an interference prevention method in a radar device that is mounted in a host vehicle and transmits a radar signal, including: detecting ON or OFF of a light of another vehicle in which the radar device is mounted; and setting a transmission timing of the radar signal and a light ON timing of a light of the host vehicle, the light ON timing being synchronized with the transmission timing on basis of ON or OFF of the light of the other vehicle, and the set transmission timing being different from a transmission timing of a radar signal of the radar device mounted in the other vehicle.

An aspect of the present disclosure is useful for an on-board radio radar device.

What is claimed is:

1. A radar device configured to be mounted on a host vehicle and to be used in cooperation with another radar device mounted on another vehicle, the radar device comprising:
    a radar transmitter, which, in operation, transmits a radar signal;
    a light detector, which, in operation, detects a light state of the another vehicle, the light state of the another vehicle being detected as an ON state if a light of the another vehicle is detected, the light state of the another vehicle being detected as an OFF state if the light of the another vehicle is not detected; and
    a controller, which, in operation, sets a transmission state of the radar signal and a light state of the host vehicle based on the detected light state of the another vehicle, wherein
    changes in the light state of the host vehicle are synchronized with changes in the transmission state of the radar signal.

2. The radar device according to claim 1, wherein
the controller sets the light state of the host vehicle to an ON state in a case where the transmission state of the radar signal is set to an ON state, and sets the light state of the host vehicle to an OFF state in a case where the transmission state of the radar signal is set to an OFF state.

3. The radar device according to claim 1, wherein
the controller sets the light state of the host vehicle to an ON state in a case where the transmission state of the radar signal is set to an OFF state, and sets the light state of the host vehicle to an OFF state in a case where the transmission state of the radar signal is set to an ON state.

4. The radar device according to claim 1, further comprising:
    a radar signal detector, which, in operation, detects the another radar signal transmitted from the other vehicle; and
    a determiner, which, in operation, determines whether or not the transmission of the another radar signal, is synchronized with the light state of the another vehicle based on a detection result obtained by the radar signal detector, wherein
    the controller sets the transmission state of the radar signal and sets the light state of the host vehicle based on a determination by the determiner.

5. The radar device according to claim 1, wherein
the controller sets the transmission state of the radar signal to an ON state, at any one of a plurality of periods obtained by dividing an ON/OFF cycle of the light state of the host vehicle by the total number of host and other vehicles.

6. The radar device according to claim 1, wherein
the controller sets the transmission state of the radar signal to an OFF state in a case where a known light ON/OFF pattern of the light state of the another vehicle is detected by the light detector.

7. The radar device according to claim 1, wherein
the controller sets the transmission state of the radar signal to an ON state in a case where the controller sets the light state of the host vehicle by using a first light ON/OFF pattern indicative of a request for transmission and the light detector detects a second light ON/OFF pattern from the another vehicle, the second light ON/OFF pattern being indicative of a permission for transmission.

8. The radar device according to claim 7, wherein
in a case where the light detector detects the first light ON/OFF pattern from the another vehicle, the controller turns on the light state of the host vehicle by using the second light ON/OFF pattern and sets the transmission state of the radar signal to an OFF state for a determined period.

9. The radar device according to claim 7, wherein
the controller sets the light state of the host vehicle by using the second light ON/OFF pattern in a case where the light detector detects the first light ON/OFF pattern from the another vehicle and does not detect the first light ON/OFF pattern from a vehicle that is different from the host vehicle and the another vehicle.

10. The radar device according to claim 7, wherein
the controller sets the transmission state of the radar signal to an OFF state for a determined period in a case where the controller does not set the light state of the host vehicle to an ON state by using the first light ON/OFF pattern and where the light detector detects the second light ON/OFF pattern from the another vehicle.

11. The radar device according to claim 7, wherein
the first light ON/OFF pattern indicates an identification number of a vehicle that requests the request for transmission;

the second light ON/OFF pattern indicates an identification number of a vehicle to be given the permission for transmission; and the controller sets the transmission state of the radar signal to an ON state in a case where the light detector detects a second light ON/OFF pattern indicating an identification number of the host vehicle from the another vehicle.

12. The radar device according to claim 11, wherein the controller turns on the light state of the host vehicle by using the first light ON/OFF pattern after elapse of a random period in a case where the light detector detects a second light ON/OFF pattern not indicating the identification number of the host vehicle from the another vehicle.

13. The radar device according to claim 8, wherein each of the first light ON/OFF pattern and the second light ON/OFF pattern indicates a continuation period of transmission; and the controller sets the transmission state of the radar signal to an OFF state for the continuation period indicated by the first light ON/OFF pattern or second light ON/OFF pattern from the another vehicle.

14. The radar device according to claim 7, wherein each of the first light ON/OFF pattern and the second light ON/OFF pattern indicates a continuation period of transmission; and the controller sets the light state of the host vehicle to an ON state by using the continuation period indicated by the first light ON/OFF pattern from the another vehicle.

15. The radar device according to claim 7, wherein the first light ON/OFF pattern indicates an identification number of a vehicle that requests the request for transmission;

a frequency channel used for the transmission and the identification number of the vehicle are associated with each other; and in a case where frequency channels indicated by first light ON/OFF patterns of a plurality of other vehicles are different from each other, the controller sets the light state of the host vehicle to an ON state for each of the plurality of other vehicles by using the second light ON/OFF pattern.

16. The radar device according to claim 7, wherein the first light ON/OFF pattern indicates an identification number of a vehicle that requests the request for transmission;

an interference amount between the another vehicle and the host vehicle and an identification number of the another vehicle are associated with each other; and the controller sets the light state of the host vehicle to an ON state by using the second light ON/OFF pattern in a case where the interference amount associated with the identification number indicated by the first light ON/OFF pattern from the another vehicle is equal to or larger than a determined threshold value, and the controller sets the light state of the host vehicle to an OFF state by using the second light ON/OFF pattern in a case where the interference amount indicated by the first light ON/OFF pattern of the another vehicle is less than the determined threshold value.

17. The radar device according to claim 7, wherein in a situation in which the host vehicle is running at a first speed, the controller sets the transmission state of the radar signal to an ON state in a case where the second light ON/OFF pattern from the another vehicle is detected after the light state of the host vehicle is set by using the first light ON/OFF pattern; and in a situation in which the host vehicle is running at a second speed that is greater than the first speed, the controller sets the transmission state of the radar signal at a timing different from a transmission period of the another radar signal from the another vehicle that is synchronized with the light state of the another vehicle.

18. The radar device according to claim 1, wherein an ON state of the light state of the host vehicle includes a first period in which luminance of a light of the host vehicle is kept and a second period in which the light of the host vehicle is turned on and off in a manner indicating a control signal concerning transmission of the radar signal.

19. The radar device according to claim 1, further comprising:

an extractor, which, in operation, extracts a color of light emitted by the light of the another vehicle; and a frequency determiner, which, in operation, determines a frequency channel associated with the extracted color, wherein the controller sets the transmission state of the radar signal and the light state of the host vehicle in synchronization with the light state of the another vehicle in a case where a frequency channel used by the host vehicle is same as the determined frequency channel, and the controller sets the transmission state of the radar signal and the light state of the host vehicle independently of the light state of the another vehicle in a case where the frequency channel used by the host vehicle is different from the determined frequency channel.

20. The radar device according to claim 1, wherein the light state of the another vehicle indicates whether or not there is a transmission of another radar signal from the another radar device, and the transmission state is set to turn on a transmission of the radar signal when the light state of the another vehicle indicates that there is no transmission of another radar signal from the another radar device.

21. An ultrasonic device configured to be mounted on a host vehicle and to be used in cooperation with another ultrasonic device mounted on another vehicle, the ultrasonic device comprising:

an ultrasonic sensor, which, in operation, transmits an ultrasonic wave;

a light detector, which, in operation, detects a light state of the another vehicle, the light state of the another vehicle being detected as an ON state if a light of the another vehicle is detected, the light state of the another vehicle being detected as an OFF state if the light of the another vehicles is not detected; and a controller, which, in operation sets a transmission state of the ultrasonic wave and a light state of the host vehicle based on the detected light state of the another vehicle, wherein changes in the light state of the host vehicle are synchronized with changes in the transmission state of the ultrasonic wave.

22. An interference prevention method in a radar device configured to be mounted on a host vehicle and to be used in cooperation with another radar device mounted on another vehicle, the interference prevention method comprising:

detecting a light state of the another vehicle, the light state of the another vehicle being detected as an ON state if a light of the another vehicle is detected, the light state of the another vehicle being detected as an OFF state if the light of the another vehicle is not detected;

setting a transmission state of a radar signal and a light state of the host vehicle based on the detected light state of the another vehicle, wherein changes in the light state of the host vehicle are synchronized with changes in the transmission state of the radar signal; and transmitting the radar signal according to the transmission state.

* * * * *